(12) United States Patent
Connolly et al.

(10) Patent No.: US 12,737,714 B2
(45) Date of Patent: Sep. 15, 2026

(54) SYSTEMS AND METHODS OF AUTOMATED INDOOR GROWING

(71) Applicant: 80 Acres Urban Agriculture, Inc., Hamilton, OH (US)

(72) Inventors: Natalia Connolly, Cincinnati, OH (US); Kevin Bishop, Cincinnati, OH (US)

(73) Assignee: 80 Acres Urban Agriculture Inc., Hamilton, OH (US)

( * ) Notice: Subject to any disclaimer, the term of this patent is extended or adjusted under 35 U.S.C. 154(b) by 414 days.

(21) Appl. No.: 18/369,636

(22) Filed: Sep. 18, 2023

(65) Prior Publication Data

US 2024/0095652 A1 Mar. 21, 2024

Related U.S. Application Data

(60) Provisional application No. 63/407,486, filed on Sep. 16, 2022.

(51) Int. Cl.
*A01C 14/00* (2006.01)
*G06Q 10/0832* (2023.01)
*A01G 9/14* (2006.01)

(52) U.S. Cl.
CPC ......... *G06Q 10/0832* (2013.01); *A01C 14/00* (2013.01); *A01G 9/143* (2013.01)

(58) Field of Classification Search
CPC ......... G06Q 10/0832; G06Q 10/06315; G06Q 10/087; A01C 14/00; A01G 9/143; A01G 31/02
See application file for complete search history.

(56) References Cited

U.S. PATENT DOCUMENTS 4,292,762 A 10/1981 Fogg et al.
6,578,317 B1 6/2003 Ahm
(Continued)

FOREIGN PATENT DOCUMENTS

BE 901370 A 4/1985
CN 102528997 A 7/2012
(Continued)

OTHER PUBLICATIONS

International Search Report and Written Opinion in International Patent Application No. PCT/US20/32218, dated Jul. 30, 2020, in 11 pages.
(Continued)

*Primary Examiner* — Justin Holmes
(74) *Attorney, Agent, or Firm* — Duane Morris LLP

(57) ABSTRACT

Systems, methods and computer-readable media for optimizing indoor farming operations are provided, including the optimization of mixing and/or packaging a plurality of different harvested plant types for a plurality of different finished perishable good types, and/or the optimization of shipping a plurality of different packaged finished perishable goods to a plurality of different customers. Some finished perishable goods are a mix of two or more plant types, and some finished goods require overlapping plant types, and the optimization of a mix percentage of the two or more plant types is also provided. Systems, methods and computer-readable media for optimizing the respective time that seeds for each of a plurality of different plant species will be planted in an indoor farm facility in order to control a timing of unloading the plant species from two or more grow lanes in a grow-out zone of the facility are also provided.

20 Claims, 23 Drawing Sheets

(56) References Cited

U.S. PATENT DOCUMENTS 8,782,948 B2 7/2014 Harwood
D731,917 S 6/2015 Stroot
9,763,382 B2 9/2017 Stroot et al.
9,854,750 B2 1/2018 Brusatore
9,974,252 B2 5/2018 Aykroyd et al.
10,076,090 B2 9/2018 Joseph et al.
10,104,845 B2 10/2018 Cohen et al.
10,182,537 B1 1/2019 Buelow
10,306,847 B2 6/2019 Whitcher et al.
D853,886 S 7/2019 Galonska et al.
10,506,770 B2 12/2019 Galonska et al.
10,542,685 B2 1/2020 Buelow
10,750,672 B2 8/2020 Buelow
10,765,069 B2 9/2020 Werner et al.
10,801,147 B2 10/2020 Harwood
10,918,021 B1 2/2021 Chen et al.
10,939,623 B2 3/2021 Miyahara et al.
11,388,863 B2 7/2022 Hunter et al.
11,483,981 B1 11/2022 Lo et al.
11,483,988 B2 11/2022 Bertram et al.
2004/0163308 A1 8/2004 Uchiyama
2006/0272210 A1 12/2006 Bissonnette et al.
2007/0100900 A1 5/2007 Gibbins
2011/0041395 A1 2/2011 Newbold et al.
2011/0120002 A1 5/2011 Pettibone
2013/0255146 A1 10/2013 Lehman et al.
2013/0333286 A1 12/2013 Billingsley
2014/0137471 A1 5/2014 Harwood
2014/0231044 A1 8/2014 Duchesne et al.
2014/0326801 A1 11/2014 Upadhyaya et al.
2015/0005964 A1 1/2015 Liotta
2016/0000021 A1 1/2016 Sugimoto
2016/0050862 A1 2/2016 Walliser
2016/0288991 A1 10/2016 Richardson
2016/0360712 A1 12/2016 Yorio et al.
2017/0027112 A1 2/2017 Vail et al.
2017/0038749 A1 2/2017 Mewes et al.
2017/0118922 A1 5/2017 Sherertz
2017/0231175 A1 8/2017 Galonska et al.
2017/0300193 A1 10/2017 Ray et al.
2017/0332544 A1 11/2017 Conrad et al.
2017/0339846 A1 11/2017 Lawrence et al.
2018/0007845 A1 1/2018 Martin
2018/0014469 A1 1/2018 Buelow
2018/0014486 A1 1/2018 Creechley et al.
2018/0027282 A1 1/2018 Hirschfeld et al.
2018/0035625 A1 2/2018 Lindbo et al.
2018/0132441 A1 5/2018 Harker et al.
2018/0168111 A1 6/2018 Yasukuri
2018/0213735 A1 8/2018 Vail et al.
2018/0235156 A1 8/2018 Blair et al.
2018/0343810 A1 12/2018 Counne
2018/0359937 A1 12/2018 Millar
2018/0359947 A1 12/2018 Millar et al.
2019/0082620 A1 3/2019 Griffin
2019/0133026 A1 * 5/2019 Seaman ................ G06Q 10/06
2019/0259108 A1 8/2019 Bongartz et al.
2019/0335676 A1 11/2019 Solomon et al.
2019/0380283 A1 12/2019 Chong
2020/0037521 A1 2/2020 DeJamette et al.
2020/0214226 A1 7/2020 Yukawa
2020/0214228 A1 7/2020 Cho et al.
2020/0236871 A1 7/2020 Travaglini
2020/0260673 A1 8/2020 Travaglini
2020/0352113 A1 11/2020 Canipe et al.
2020/0359570 A1 11/2020 Portello et al.
2021/0100173 A1 4/2021 Khwaja et al.
2021/0137022 A1 5/2021 Fuse et al.
2021/0137028 A1 5/2021 Zelkind et al.
2022/0007589 A1 1/2022 Binney et al.
2022/0108441 A1 4/2022 Burgo et al.
2023/0232760 A1 7/2023 Deshpande
2023/0301254 A1 9/2023 Deshpande et al.

FOREIGN PATENT DOCUMENTS

CN 106561347 B 12/2019
CN 114186832 A * 3/2022 ............ G06Q 50/02
EP 3076782 A1 10/2016
EP 3326452 A1 5/2018
EP 3837967 A1 6/2021
GB 2152205 A 7/1985
JP H0672344 U 10/1994
JP H0923762 A 1/1997
JP H09262027 A 10/1997
JP 2001016981 A 1/2001
JP 3156190 B2 4/2001
JP 2001161185 A 6/2001
JP 2004065265 A 3/2004
JP 2006252105 A 9/2006
JP 2007209252 A 8/2007
JP 2015500040 A 1/2015
JP 2015501157 A 1/2015
JP 2015213491 A 12/2015
JP 2018023344 A 2/2018
JP 2019514145 A 5/2019
KR 101690113 B1 1/2017
KR 102069121 B1 1/2020
WO 2003041489 A1 5/2003
WO 2005079557 A1 9/2005
WO 2012005121 A1 1/2012
WO 2013113096 A1 8/2013
WO 2014128746 A1 8/2014
WO 2016166311 A1 10/2016
WO 2017062918 A1 10/2016
WO 2016205634 A1 12/2016
WO 2017024353 A1 2/2017
WO 2017026390 A1 2/2017
WO 2017191819 A1 11/2017
WO 2017205523 A1 11/2017
WO 2017208906 A1 12/2017
WO 2018010946 A1 1/2018
WO 2018035314 A1 2/2018
WO 2018136008 A1 7/2018
WO WO-2018136007 A1 * 7/2018 .............. B65G 1/04
WO 2019183734 A1 3/2019
WO 2019077569 A1 4/2019
WO 2019077571 A1 4/2019
WO 2019089800 A1 5/2019
WO 2019173876 A1 9/2019
WO 2019176070 A1 9/2019
WO 2019183244 A2 9/2019
WO 2020005317 A1 1/2020
WO 2020076735 A1 4/2020
WO 2020092503 A1 5/2020
WO 2020092506 A1 5/2020
WO 2020112610 A1 6/2020
WO 2020132634 A1 6/2020
WO 2021037901 A1 8/2020
WO 2021055257 A1 3/2021
WO 2021072550 A1 4/2021
WO 2021202827 A1 10/2021
WO 2021219837 A1 11/2021

OTHER PUBLICATIONS

U.S. Appl. No. 13/123,942, filed Apr. 13, 2011, Vangemert et al.

AVF+ Product Description, "AVF+ Vertical Farming," Artechno Growsystems, Pastoor Verburghlaan 20a, 2678 NE, De cier, The Netherlands, 2018, 8 pages.

International Search Report and Written Opinion in International Patent Application No. PCT/US20/32719, dated Sep. 1, 2020, in 15 pages.

International Search Report and Written Opinion in International Patent Application No. PCT/US20/60609, dated Feb. 11, 2021, in 14 pages.

Partial European Search Report for European Patent Application No. 20802692.2, dated Dec. 20, 2022, 16 pages.

Extended European Search Report for European Patent Application No. 20802692.2 dated Mar. 27, 2023, 14 pages.

Extended European Search Report for European Patent Application No. 20805584.8 issued Apr. 21, 2023, 7 pages.

(56) References Cited

OTHER PUBLICATIONS

International Search Report and Written Opinion for PCT/US22/78412 dated Feb. 2, 2023, 8 pages.
Extended Search Report for European Patent No. 20886324.1 issued Sep. 14, 2023.

* cited by examiner

600

SYSTEMS AND METHODS OF AUTOMATED INDOOR GROWING

CROSS-REFERENCE TO RELATED APPLICATIONS

This application is a non-provisional application and claims priority to U.S. provisional patent application Ser. No. 63/407,486, filed on Sep. 16, 2022, the entirety of which is herein incorporated by reference.

The present disclosure relates to improved systems and methods of automated indoor growing.

This section provides background information related to the present disclosure which is not necessarily prior art.

Global food production systems need to address significant challenges in the coming decades. Finding ways to feed a growing global population whilst reducing environmental impact of agricultural activities is of critical importance. Controlled environment agriculture (CEA), which includes greenhouses and indoor farming, offers a realistic alternative to conventional production for some crops. Indoor farming allows for faster, more controlled production, irrespective of season. Further, indoor farming is not vulnerable to other environmental variability such as pests, pollution, heavy metals, and pathogens. Indoor farming can also reduce environmental impact offering no loss of nutrient, reduced land requirement, better control of waste, less production loss, reduced transportation cost, and reduced clean water usage. Therefore, indoor farming can help to address the significant challenges.

Current methods and systems for indoor farming, however, are inefficient to implement due to inadequate and unsophisticated coordination between the seeding, growing, harvesting, mixing, packing, and shipping processes. Modern indoor farming operations grow dozens of different types of plants in parallel—all with different nutritional, environmental condition, and grow time requirements. Further, many products being produced and distributed by indoor farms combine a multitude of different plant varieties into a single finalized product to be shipped. The wide variation in environmental requirements coupled with the fact that most produce expires rapidly after harvest, results in the need for intricately coordinated procedures to efficiently and effectively produce and ship a diverse selection of heterogeneous finished products on time and with minimal waste.

There currently exists no method that addresses the above issue. No current indoor farming facility is able to develop, implement, and optimize the entirety of an indoor farming process to efficiently meet a dynamic demand for a variety of finished products with overlapping ingredients that have unique and disparate growing requirements. The lack of a solution in the prior art has led to inefficient allocation and processing of the raw resources resulting in higher costs and reduced yields.

This section provides a general summary of the disclosure, and is not a comprehensive disclosure of its full scope or all of its features.

The present disclosure provides systems and methods for the indoor growing and automated growing of plants and crops. The systems, methods and computer-readable media of the present disclosure provide improvements in efficiency, yield, and cost over existing or traditional methods and apparatuses. The systems, methods and computer-readable media of the present disclosure may result in less resources that are required to yield mature plants and require less space, land and manpower while providing improved traceability, transparency and sustainability over existing or traditional apparatuses and methods.

The systems and methods of the present disclosure optimize indoor farming operations. In various embodiments, a computer-implemented method includes receiving, for two or more of a plurality of different plant types, a respective plant perishability value input, and receiving, for two or more of a plurality of a finished perishable good types, a respective finished good perishability value input and a respective finished good specification input identifying at least the two or more different plant types. In some embodiments, each of the two or more finished perishable good types is a respective mix of at least the two or more different plant types. In some embodiments, at least one plant type in at least two of the plurality of finished perishable good types is the same plant type.

In various embodiments, the method also includes periodically receiving an inventory input including, for a specific time period, a respective harvested amount of each of the at least two or more different plant types. In some embodiments, the method also includes periodically receiving a customer demand input including, for the specific time period, a respective number of finished perishable good packages of each of the plurality of finished perishable good types, where each respective package is of a predetermined amount of the respective finished perishable good.

In various embodiments, the method includes periodically optimizing and adjusting a respective fractional amount of each of the respective at least two or more plant types in each of the two or more finished mixed perishable good types in order to control the allocation of the respective harvested amount of the at least two or more plant types during the specific time period and based on the received inputs. In various embodiments, the method also includes periodically optimizing and adjusting a mix/pack schedule, during the specific time period, in order to control the mixing and packing operations of the indoor farm facility to respectively finish each of the respective number of finished perishable good packages using the respective harvested amounts of each of the at least two or more different plant types, and based on the received inputs and the periodically optimized and adjusted respective fractional amounts.

In some embodiments, the method includes causing the respective harvested amounts of each of the at least two or more different plant types to be allocated, mixed and packed to finish the respective number of finished perishable good packages of each of the plurality of finished perishable good types pursuant to the periodically optimized and adjusted respective fractional amounts and, the periodically optimized and adjusted mix/pack schedule.

The systems, methods and computer-readable media of the present disclosure may optimize the efficiency of order fulfillment for a plurality of perishable product packages for a plurality of customers.

In various embodiments, a non-transitory computer readable storage medium encoded with program code is provided, where, when the program code is executed by a processor of a computing device, the processor performs a method for optimizing indoor farming operations. In various embodiments, the method includes receiving, for two or more different plant types, a respective plant perishability value input and receiving, for two or more finished perishable good types, a respective finished good specification input identifying at least the two or more different plant types. In some embodiments, each of the two or more finished perishable good types is a respective mix of at least the two or more different plant types. In some embodiments, at least one plant type in at least two of the plurality of finished perishable good types is the same plant type.

In various embodiments, the method includes periodically receiving an inventory input that includes, for a specific time period, a respective harvested amount of each of the at least two or more different plant types. In various embodiments, the method also includes periodically receiving a customer demand input that includes, for the specific time period and for each of a plurality of customers, a respective order for a respective number of finished perishable good packages of one or more of the plurality of finished perishable good types. In various embodiments, each respective finished perishable good package is of a predetermined amount of the respective finished perishable good. In some embodiments, the plurality of customer orders include respective customer orders for the two or more finished mixed perishable good types and customer orders for at least one other finished perishable good type.

In various embodiments, the method includes periodically optimizing and adjusting a mix/pack schedule, during the specific time period, in order to control the mixing and packing operations of the indoor farm facility. In various embodiments, the control of the mixing and packing operations is to respectively finish each of the respective number of finished perishable good packages using the respective harvested amounts of each of the at least two or more different plant types, and based on the received inputs.

In various embodiments, the method also includes periodically optimizing and adjusting a ship schedule, during the specific time period, in order to control the shipping operations of the indoor farm facility. In various embodiments, the control of the shipping operations is to respectively ship, to each of the plurality of customers, the respective number of finished perishable good packages corresponding to the respective customer order based on the received inputs and the periodically optimized and adjusted mix/pack schedule.

In various embodiments, the method includes causing the respective harvested amounts of each of the at least two or more different plant types to be mixed and packed to finish the respective number of finished perishable good packages of each of the plurality of finished perishable good types pursuant to the periodically optimized and adjusted mix/pack schedule. In various embodiments, the method also includes causing the respective number of finished perishable good packages corresponding to the respective customer order for each of the plurality of customers to be shipped pursuant to the periodically optimized and adjusted ship schedule.

In various embodiments, a system may include a harvester device configured to harvest a plurality of plants, a plurality of harvested plant bins, a plurality of mixed perishable good bins, a plurality of finished perishable good packages, a memory device, a processor, and a non-transitory computer readable medium comprising instructions executable by the processor to cause the system to perform operations.

In some embodiments, the processor is configured to receive and store, in the memory device, a respective specification for each of a plurality of finished perishable good types, wherein each finished perishable good type specification identifies a respective unique finished perishable good type identifier, at least one plant type of a plurality of plant types, a respective lower fractional amount, and a respective higher fractional amount, of the at least one plant type.

In some embodiments, each of two or more of the plurality of finished perishable good types is a respective mix of two or more of the plurality of plant types, wherein a respective fractional amount of each of the two or more plant types in each of the two or more finished mixed perishable good types is determined periodically and prior to mixing. Additionally, the respective at least one plant type in at least two of the plurality of finished perishable good types is the same plant type.

In some embodiments, the processor is further configured to receive and store, in the memory device, a respective perishability value for each of the plurality of plant types, wherein each plant perishability value is the respective time period between the respective plant's harvest date and the respective plant's must-finish date.

In some embodiments, the processor is further configured to receive and store, in the memory device, a respective perishability value for each of the plurality of finished perishable good types, wherein each finished good perishability value is the respective time period between the respective finished perishable good's pack date and the respective finished perishable good's expiration date.

In some embodiments, the processor is further configured to receive and store, in the memory device, a plurality of orders from a plurality of customers wherein each customer order includes a respective customer identifier, and a respective number of respective finished perishable good packages of one or more of the plurality of finished perishable good types, wherein each respective package is for a predetermined packaged amount of the respective finished perishable good wherein the received and stored plurality of orders from the plurality of customers comprises customer orders for the two or more finished mixed perishable good types and customer orders for at least one other finished perishable good type.

In some embodiments, the processor is further configured to determine, based on the plurality of received orders from the customers, a respective total amount of each finished perishable good type to fulfill all of the received and stored plurality of orders from the customers.

In some embodiments, the processor is further configured to, on a first harvest date, cause the harvest device to harvest each plant. The processor further may receive, from the harvest device, a respective harvested amount of each of the plurality of plants based on the received and stored plurality of orders from the plurality of customers, the determined respective total amount of each finished perishable good type, the stored plurality of perishable finished good type specifications, the stored plurality of finished good perishability values, and the stored plurality of plant perishability values for each of the two or more finished mixed perishable good types specified.

In some embodiments, the processor may further determine a respective fractional amount of each of the respective two or more identified plant types, wherein each respective determined plant fractional amount is between the respective identified lower fractional amount and the respective identified higher fractional amount for each of the plurality of finished perishable good types specified and is also based on the determined respective fractional amount of each of the respective two or more plants. The processor may allocate a respective subset amount of the respective plant harvested amount for each of the identified plant types for each of the two or more finished mixed perishable good types specified in the stored plurality of orders.

Additionally, the processor may further determine a respective mix date to mix together each of the respective allocated subset amounts into a respective mixed amount and determine a respective packing date to apportion and pack based on the respective predetermined packaged amount and the determined respective total amount of the respective finished mixed perishable good type, the respective mixed amount into a respective number of the finished perishable good packages for each of the other finished perishable good types specified in the stored plurality of orders. In various embodiments, the determined mix date and the determined packing date are the same date.

In some embodiments, the processor may be further configured to determine a respective packing date to apportion and pack based on the respective predetermined packaged amount of the respective perishable finished good and the determined respective total amount of the respective finished perishable good type, the respective allocated subset amounts into a respective number of the finished perishable good packages.

In some embodiments, the processor may be further configured to, on the respective determined mix date for each of the two or more perishable mixed finished good types specified in the stored plurality of orders, cause each of the respective allocated subset amounts to be transferred from a respective harvested plant bin to a respective mixed perishable good bin.

In some embodiments, the processor may be further configured to, on the respective determined packing date for each of the two or more finished mixed perishable good types specified in the stored plurality of orders, for each of the respective number of finished perishable good packages, transfer the respective predetermined packaged amount from the respective mixed perishable good bin to a respective finished perishable good package for the respective finished mixed perishable good type.

In some embodiments, the processor may be further configured to, on the respective determined packing date for each of the other finished perishable good types specified in the stored plurality of orders, cause, for each of the respective number of finished perishable good packages, the respective predetermined packaged amount to be transferred from a respective harvested plant bin to a respective finished perishable good package for the respective perishable mixed finished good type.

In various embodiments, the systems, methods and computer-readable media of the present disclosure include methods and computer-readable media for optimizing indoor farming operations. In various embodiments, a non-transitory computer readable storage medium encoded with program code is provided, where, when the program code is executed by a processor of a computing device, the processor performs a method for optimizing indoor farming operations.

In various embodiments, a method includes receiving a first input specifying that at least two of a plurality of grow lanes of a grow zone of an indoor farm facility are configured such that plants are loaded into the grow lane, and such that the loaded plants in the grow lane traverse two or more grow lane positions therein. In various embodiments, the method includes receiving a second input specifying that each of a plurality of different plant species requires a corresponding amount of growing time between when a plant is loaded into the grow lane and when it is unloaded from the grow lane to be harvested. In various embodiments, the method includes receiving a third input specifying respective assignments of a respective one of the plurality of plant species to at least two of the plurality of grow lanes. In some embodiments, the plurality of plant species-to-grow lane assignments include at least two different plant species of the plurality of plant species.

In various embodiments, the method also includes determining an optimized seeding schedule, including determining a time that seeds for the corresponding plurality of different plant species will respectively be planted in the indoor farm facility in order to control a timing of unloading the plant species from the respective plurality of grow lanes of the grow zone.

In various embodiments, a facility control system is provided. In various embodiments, the facility control system may includes a propagation space comprising a plurality of trays, a plurality of plant seeds of a plurality of different plant types, and a grow-out zone comprising a plurality of grow lanes. In some embodiments, the plurality of grow lanes each comprise a plurality of plots and a plurality of benches. In various embodiments, the facility control system may also include a memory device, a processor; and a non-transitory computer readable medium including instructions executable by the processor to cause the system to perform operations.

In some embodiments, the processor may be configured to store, in a memory device, a grow route for each grow lane, a number of plots for each grow lane, and a transplant time for each grow lane. In some embodiments, the processor may assign and store a plant type of the plurality of different plant types to each grow lane of the plurality of grow lanes. In some embodiments, the processor may also determine the grow route for each grow lane based on the respective assigned plant type. In some embodiments, the processor may also determine a number of trays in the propagation space.

In some embodiments, the processor may be further configured to determine the transplant time for each grow lane based on the associated grow route and the associated plurality of plots. In various embodiments, the processor may be configured to cause each seed to be removed from the at least one tray of the plurality of trays based on the respective plant type. In various embodiments, the processor may be configured to determine a seeding schedule offset to plant each seed of the plurality of seeds based on the number of trays in the propagation space and the determined transplant time for each grow row of the plurality of grow rows such that a difference between a total number of seeds of the plurality of seeds placed in the at least one tray of the plurality of trays at any two instances of the seeding schedule is minimized. In various embodiments, the processor may also be configured to update the seeding schedule to plant each seed of the plurality of seeds based on the determined schedule offset.

Further areas of applicability will become apparent to persons skilled in the relevant art from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure.

DETAILED DESCRIPTION

Figure 1:
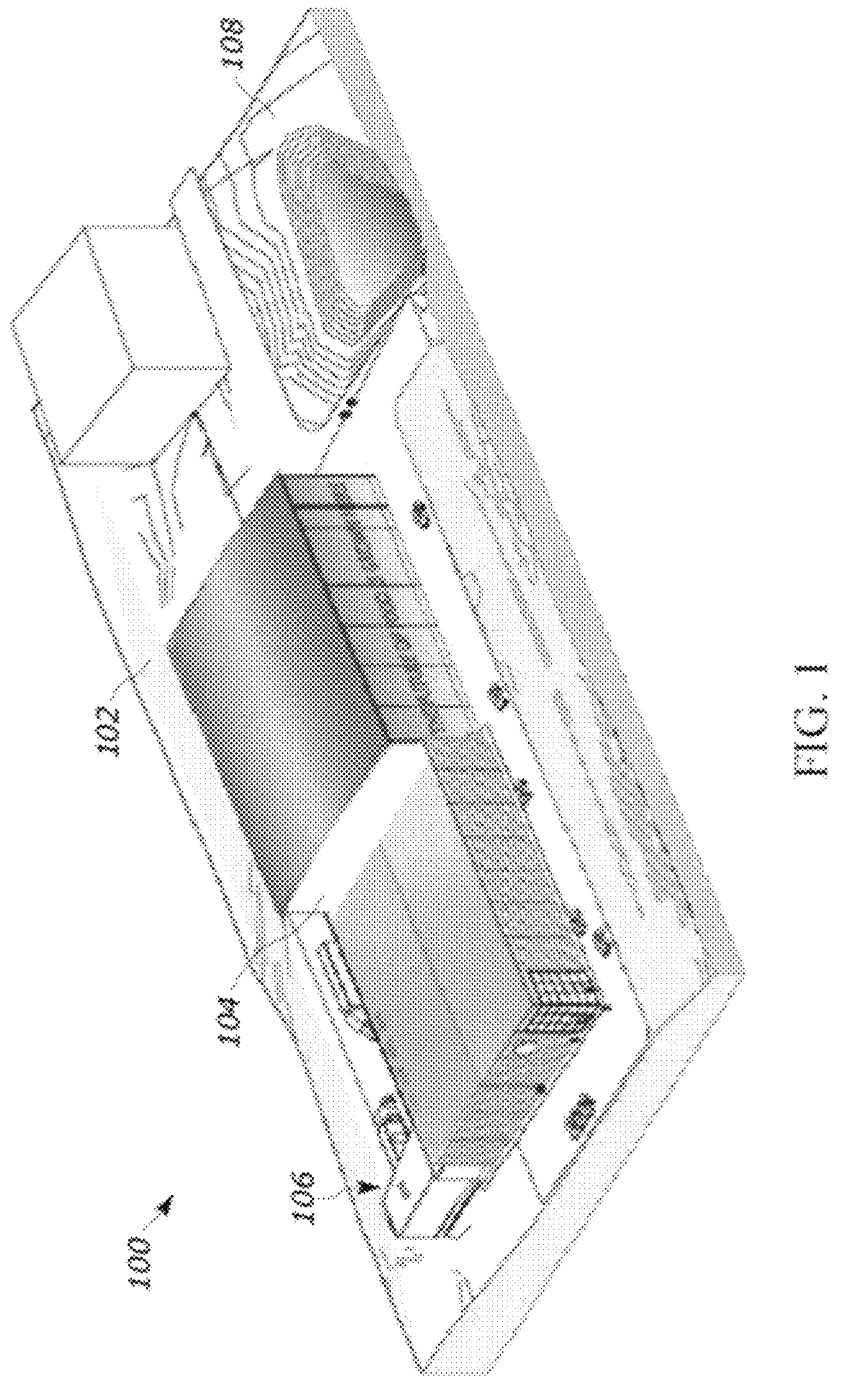
FIG. 1 is an isometric view of an example indoor growing facility in accordance with various embodiments of the present disclosure.

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The present disclosure is directed to indoor growing facilities, growing apparatuses and related methods. The facilities, apparatuses and methods of the present disclosure are improvements over existing or traditional growing and farming processes. As shown in FIG. 1, an example indoor growing facility 100 is shown. The growing facility 100 can be located on a suitable building site 102. The building site can be located in various suitable geographic locations and can have various sizes. The example facility 100 can include a footprint that includes an enclosed building 104 that can include floor space to allow for the delivery of finished plant products to be grown to maturity from seeds and packaged for delivery to a customer. As shown, the enclosed structure 104 can include a loading dock 106.

Raw materials such as seeds, growing medium, fertilizers and the like can be delivered to the loading dock 106. The entire growing process can be accomplished within the structure 104. When mature plants are grown, the plants can be harvested and packaged for delivery to a customer. The packaged finished plant goods can be delivered from the same loading dock 106 at which the raw materials are received. The growing process can be carefully monitored and controlled to allow each of the different varieties of plants to be grown to maturity using less resources than existing or traditional farming and growing methods. In addition, each of the different varieties of plants can be grown in less time that traditional farming techniques. Users of growing facility 100 may develop specific combinations of growing conditions and growing times for different varieties of plants (and at each particular stage—seeding, propagation, growing—in the growing process). Users of growing facility 100 may also be able to record growing conditions in the indoor growing facility 100 from seed to maturity, the quality and characteristics of the various plant varieties and may be able to trace the harvested plant back to a lot of seed. For example, the inventors have determined that particular plant varieties, in particular growing conditions, take particular, and different from each other, amounts of time (e.g., 8 days, 10 days, 28 days, 30 days, etc.) from seeding (202 below) to harvest (212 below) in indoor growing facility 100, and those particular seed-to-harvest times (and particular growing conditions at various points in time in this particular window) would be known to users of growing facility 100.

Figure 2:
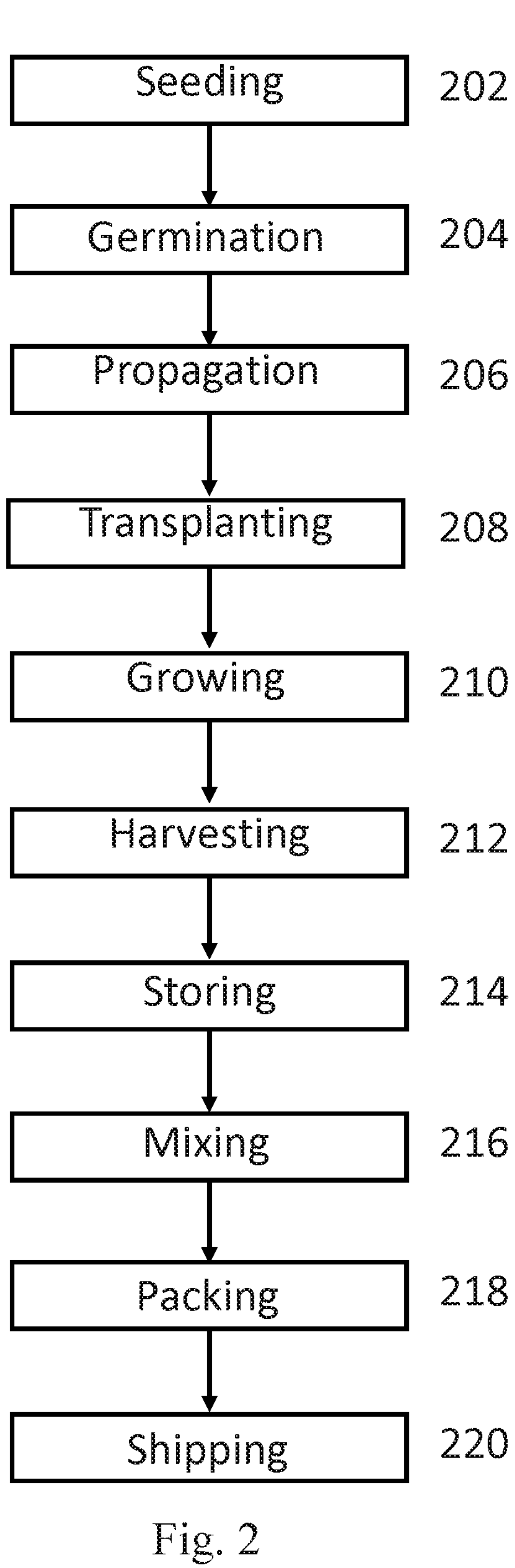
FIG. 2 is a flow chart showing an example method of growing plants in accordance with various embodiments of the present disclosure.

Turning now to FIG. 2, an example growing process 200 is shown. The growing process 200 may be used in the growing facility 100. The process 200 begins at step 202. At step 202, seeding occurs. At seeding, seeds of a plurality of predetermined plant varieties are respectively placed in a suitable growing medium. In one example, the seeds are placed in a suitable prepackaged growing medium. One such prepackaged growing medium is the Quick Plug tray. Such a medium provides for the healthy germination and growing of the plant varieties. The growing medium can also be prepared at the facility according to a specified recipe(s) and arranged on a tray at specific spaced distances. In some embodiments, the specific spaced distances are different for different plant varieties. At seeding 202, the plant medium may be placed in one or more openings in a tray (e.g., Quick Plug tray) that is configured to hold one or more seeds and/or plants.

In some embodiments of seeding step 202, the seeds are from a multitude of different predetermined plant varieties/types (e.g., green butter lettuce (GBL), green frill leaf lettuce (GFL), kale, red frill leaf lettuce (RFL), green crispy lettuce, red romaine lettuce, green romaine lettuce, red chard, arugula microgreens, broccoli microgreens, dijon microgreens, pea shoots, etc.), and each plant variety is placed in an appropriate grow medium for that variety of plant. In various embodiments, each plant variety is identified, and differentiated from the other plant varieties, with a plant identifier (Plant ID). In various embodiments, each plant variety that is grown in an indoor farm facility (e.g., 100, 300) according to a predetermined time-space-plant recipe that is specific to routings (e.g., a plant species/type (e.g., GFL, RFL, basil, etc.) is to grow for two (2) days in the germination zone (e.g., 308), then propagate for twelve (12) days in the propagation zone (e.g., 312), and then grow in the grow-out zone (e.g., 318) for eighteen (18) days), and at a specified density (e.g., how closely packed together are plants/seeds (e.g., 70 plants per propagation tray, 180 seeds per germination tray, 90 plants per float, etc.)).

In various embodiments, each plant variety that is grown in an indoor farm facility (e.g., 100, 300) according to a predetermined time-space-plant recipe is identified, and differentiated from other plant varieties grown according to other recipes, with a crop identifier (Crop ID). In various embodiments, the seeds in the grow medium are segregated into different trays based on their respective plant variety/type (e.g. respective plant ID) and/or respective crop variety (e.g., respective crop ID). In various embodiments, each predetermined crop recipe is defined by a plant scientist and technician with a predetermined goal(s) in mind such as, for example, maximizing yield and quality.

The respective date and time of seeding particular plant varietals within the indoor farm facility (e.g., 100, 300) is determined based on an overall seeding schedule, which is then periodically optimized and adjusted as described herein. In some embodiments, the inputs to a seeding schedule determination engine may incorporate information from orders from customers for finished perishable goods (e.g., for different packaged salad mixes, each with different plant varietal ingredients). In some embodiments, the amounts of and which variety of seeds, may be determined based on inputs including, for example, the ingredients of the finished product (e.g., salad mix of different plant varieties), the growing time of the particular plant varietal ingredients of the finished perishable good, packaging procedures, and the shipping/delivery date information, and this seed variety/amount information may be incorporated into inputs to a seeding schedule determination engine to provide an output of when (date/time) the respective seeds for each such plant varietal should be seeded. In various embodiments, the inputs to a seeding schedule determination engine may incorporate forecasted information, including, for example, the number of orders whose finished perishable goods and shipping dates are determined in part by historical sales of the finished perishable goods.

In various embodiments, and as explained in more detail below, users of growing facility 100 (e.g., supply planners and growers) may periodically determine which crops are assigned to which production lines (e.g., respective grow-out zone lanes 402), and the densities of the crops on those lines (e.g., density of corresponding plants on respective floats 501, density of corresponding plants on respective propagation trays 500, density of seeds on respective germination trays, etc.) based on the customer demand (forecasted and/or actual), which then specifies the germination, propagation, and grow-out zone space usage during that period (e.g., the daily usage of such space), and which may be provided to a seed scheduler optimizer as essentially fixed (or constant) inputs.

After seeding 202, the process 200 then moves to step 204, where germination occurs. At germination step 204, the seeds and growing medium are placed in an environment having specified germination conditions. Germination can occur in two (2) to three (3) days for example and for certain plant varieties/types, as defined in the respective recipe for a particular crop. For other plant varieties, as defined in the respective recipe for a particular crop, germination may take other periods of time (e.g., 1 day, 4 days). At germination, the seed husk breaks open and the plant begins to grow. After the seed husk breaks open, the process moves to step 206. In the indoor growing facility 100, a germination chamber may be provided in which the respective seeds are positioned in predetermined conditions, and at a specific density, and as may be defined in the respective recipe for each particular crop grown in the indoor farm facility (e.g., 100, 300).

At step 206, propagation occurs. Propagation involves the early stage of plant development. The plants during this early stage of growing may need somewhat different environmental or physical growing conditions than are required during later growing stages. In one example, the trays of germinated seeds can be loaded into benches and moved from the germination chamber to a propagation chamber. As will be described, the propagation chamber or zone may be combined with a grow-out zone in which the plants are grown from early stages to maturity. In other examples, the propagation chamber can be separate from the grow-out zone. Once in the propagation chamber, the plants are allowed to grow until the plants have predetermined characteristics that make the plants suitable for growing to maturity. In some examples, and for certain plant varieties/types, the stage of propagation can take about ten (10) to twelve (12) days. In other examples and for other plant varieties, the stage of propagation can take other lengths of time (e.g., 9 days, 14 days). In various embodiments, for each of the crops grown in the indoor farm facility (e.g., 100, 300), the respective plant propagation stage (206) time is included in the routing information defined in the respective recipe for a particular crop.

At step 208, transplanting occurs. The step of transplanting 208 may include a process of moving the plants from a tray (e.g., propagation tray 500) into a float (e.g., float 501). This process generally includes moving the plants from a dense arrangement of plants to an arrangement in which the plants are spaced further apart from one another. During germination (204) and propagation (206), the seedlings and plants can be positioned closer together because the plants are small enough such that they do not interfere with one another or inhibit the growth of neighboring plants. Once the plants reach a certain size at the conclusion of propagation 206, the plants need to be moved further apart to allow the plant to grow to reach a suitable mature size. Thus, the propagated plants are transplanted, at step 208, to a growing container that has suitable spacing to allow the plants to reach a mature size (e.g., a float (e.g., 501)). In order to transplant the plants, the trays may be removed from the propagation chamber. The plants and growing medium may be removed from the propagation trays (e.g., 500) and re-inserted or re-deposited into a float (e.g., 501). The float can have suitable spacing for the growing of the plants. In various embodiments, for each of the crops grown in the indoor farm facility (e.g., 100, 300), the respective density (e.g., how many plants per propagation tray, how closely packed together such plants are in a propagation tray, etc.) information is defined in the respective recipe for a particular crop.

The process 200 can be performed without step 208. In certain embodiments, seeds are placed in trays or growing media configurations that are spaced sufficiently to allow plants to grow to harvest without transplantation. In certain embodiments, varietals are grown in indoor farm facility 100 (300) that do not require transplantation as plants grow to maturity and harvest. For example, a plant or crop variety may be grown within indoor farm facility 100 (300) without the performance of transplanting step 208. In such embodiments that do not require transplantation, process 200 can proceed directly from step 206 to step 210.

The process 200 continues to step 210. At step 210, in embodiments including a separate propagation zone, the propagation-stage-grown plants may be further grown to maturity in a grow-out zone (e.g., 318). The growing step 210 may include the growing of the plants to a mature size at which time the mature plants are ready for harvesting. During step 210, the plants may be moved into a grow-out zone (e.g., 318), as will be further described, in which the environmental conditions can be controlled and monitored to efficiently grow the plants to a mature size. The grow-out zone may have suitable structures and elements to provide lighting, air flow, irrigation and the like to be provided.

The plants may be moved in their floats (e.g., 501) and positioned into benches (e.g., 602). In various embodiments, the float and bench assemblies may then be moved into the grow-out zone (e.g., 318) using automatic conveyance equipment such as, for example, the automatic conveyance equipment described in U.S. patent application Ser. No. 18/048,086, filed Oct. 20, 2022, entitled "Automated Indoor Growing Apparatus and Related Methods", the disclosure of which is incorporated by reference herein in its entirety. The plants in their floats (e.g., 501) may be transported and moved through the grow-out zone (e.g., 318). In the grow-out zone (e.g., 318), the plants may be subjected to various conditions that may be desirable according to the particular stage of growing or development. Once fully mature, the plants may be removed from the grow-out zone and, for example, harvested (as further discussed below). In various embodiments, for each of the crops grown in the indoor farm facility (e.g., 100, 300), the respective density (e.g., how many plants per float, how closely packed together such plants are in a float, etc.) information is defined in the respective recipe for a particular crop.

Figure 3:
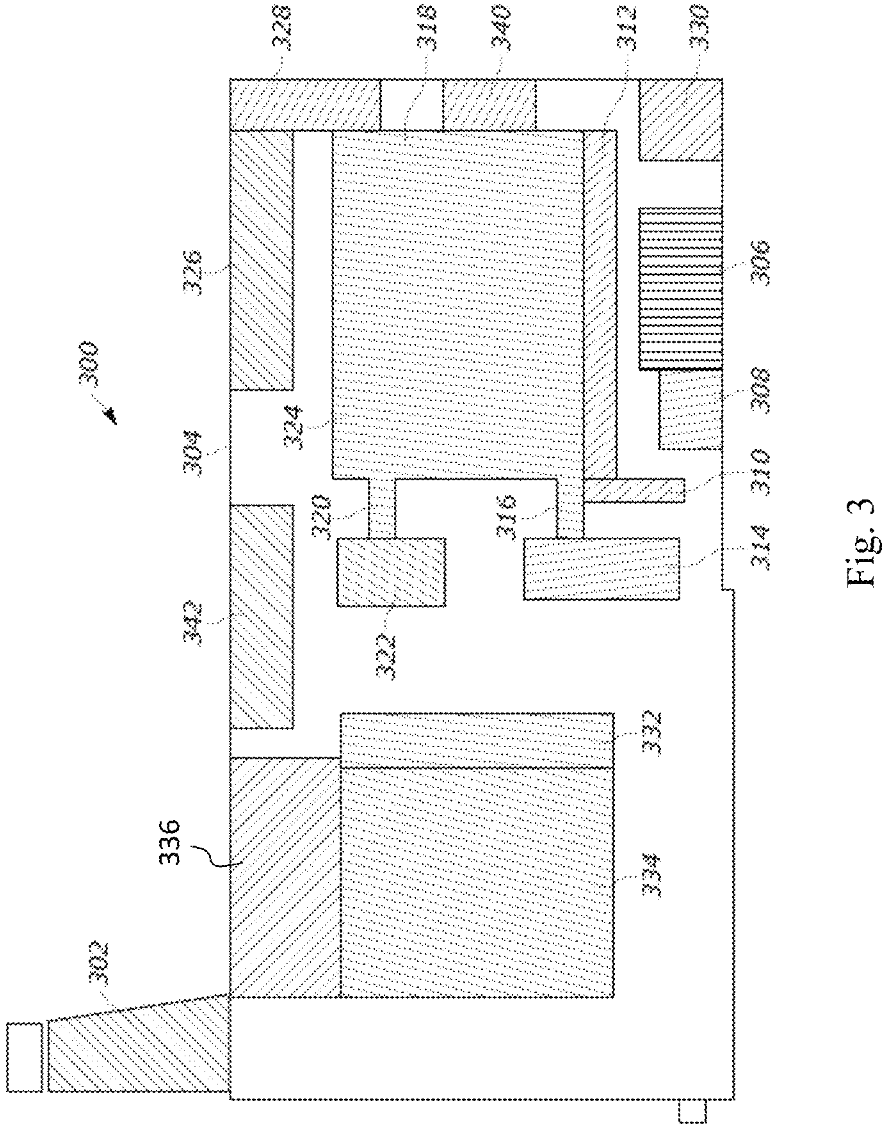
FIG. 3 is a plan view of an example floor layout for an example indoor growing facility according to various embodiments of the present disclosure.
Figure 4:
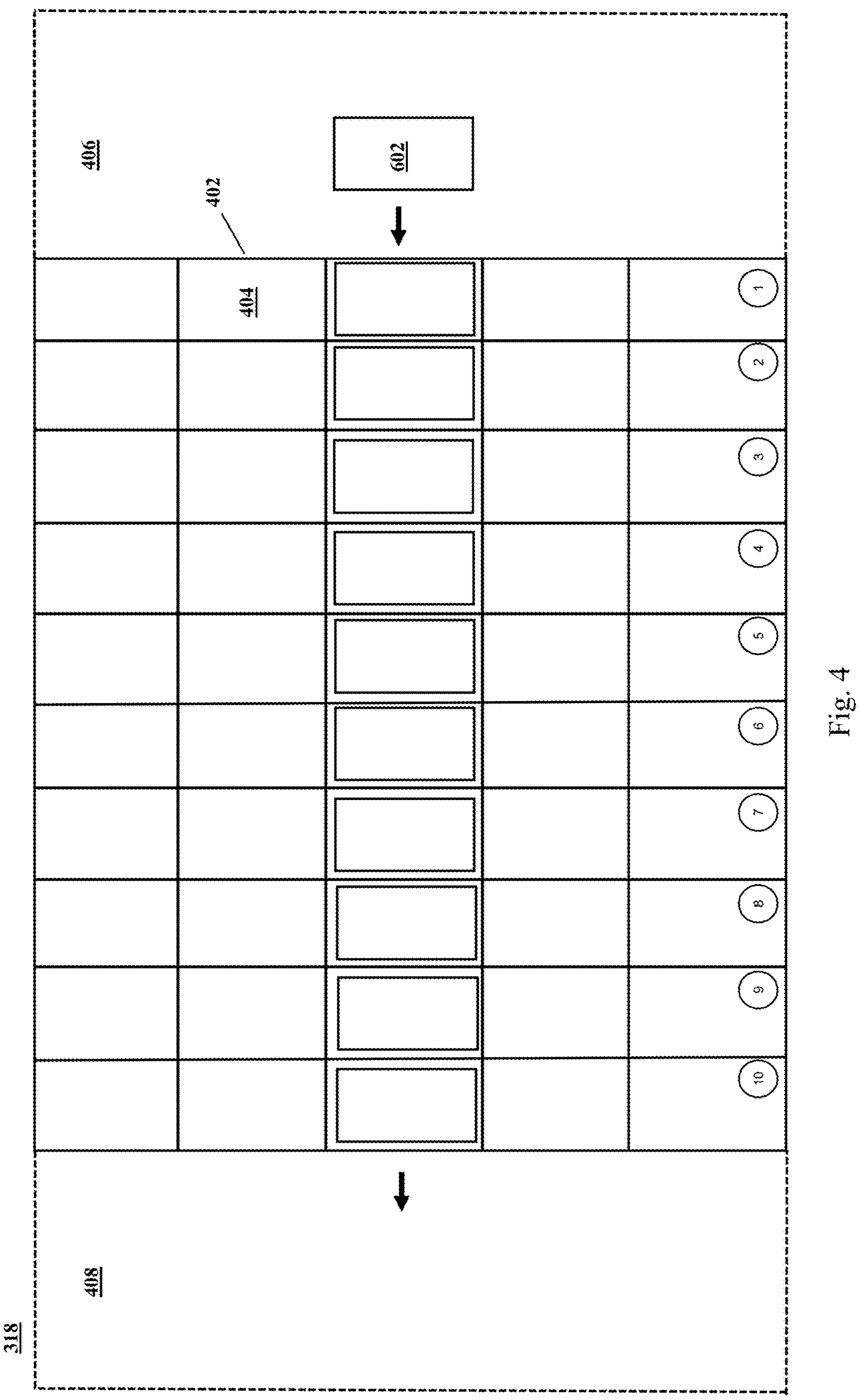
FIG. 4 is an enlarged top view of the grow-out zone of various embodiments of the present disclosure.

As shown in FIG. 4, the grow-out zone structure may comprise a plurality of grow lanes 402, each with a number of different positions 404 within the respective grow lane 402 (e.g., as numbered 1-10 in FIG. 4). In various embodiments, each grow lane 402, or groups of grow lanes 402, may have a distinct climate that may be individually controlled on a grow-lane-specific-basis or on a group-of-grow-lanes-specific basis. In certain embodiments, sections within the grow-out zone, may have unique climate that can be individually controlled. Although five (5) grow lanes 402, each with 10 different positions 404, are shown in FIG. 4, the grow-out zone structure is highly scalable and a person skilled in the relevant art would recognize that any number of grow lanes 402, each with different positions 404, is described herein. The grow-out zone structure (e.g., examples depicted in FIG. 4, 318 (FIG. 3, FIG. 7)), may include, for example, 10 grow lanes 402, each with 10 different positions 404.

In various embodiments, over a particular period of time during the overall growing process within the grow-out zone (e.g., 318) of the indoor growing facility 100, any grow lane 402 may be utilized for a specific plant variety/type (e.g., green butter lettuce (GBL), green frill leaf lettuce (GFL), kale, red frill leaf lettuce (RFL), green crispy lettuce, red romaine lettuce, green romaine lettuce, red chard, arugula microgreens, broccoli microgreens, dijon microgreens, pea shoots, etc.) such that the climate within the respective grow lane 402 is adjusted to meet the optimal growing demands during different periods of the specific plant variety's respective maturation process.

During the transplanting step 208, when the float (e.g., 501) and bench assemblies (e.g., 602) are moved into the grow-out zone (e.g., 318), the float and bench assemblies are moved into the respective first position (e.g., 404) of their respective grow lane (e.g., 402). In some embodiments, as the float and bench assembly is moved into the first position of a grow lane, the bench that is currently in the first position of the grow lane is moved to the second position and the float and bench assembly in the second position is moved to the third and so on for each position in the grow lane until the bench and float assembly in the last position is removed from the grow lane for harvesting 212. In some embodiments, the respective bench assemblies (e.g., 602) in the respective grow lane (e.g., 402) are all in contact with each other and pushing the first one into the first position causes all of the float bench assemblies in the respective grow lane to subsequently move one position. In some embodiments, this successive bench movement caused by the movement of a float and bench assembly into the first position of a grow lane may be referred to as the grow lane being configured to have first-in-first-out movement by the benches therein.

In some embodiments, each plant variety has a respective specific (e.g. predetermined) amount of time that it is required to be in a respective grow lane (e.g., 402). The specific amount of time may be, in part, based on the time it takes for the respective plant variety/type to reach maturity. Furthermore, the amount of time each bench assembly (e.g., 602) spends at a particular position in a respective grow lane (e.g., 402) may be based on the specific amount of time that must be spent in the respective grow lane divided by the number of positions in the respective grow lane. In various embodiments, for each of the crops grown in the indoor farm facility (e.g., 100, 300), the respective plant grow-out stage (210) time is included in the routing information defined in the respective recipe for a particular crop.

The inventors have determined that particular plant varieties, in particular growing conditions, may need to spend a specific amount of time in the grow-out zone (e.g., 318) prior to being harvested (e.g., 5 days, 15 days, 18 days, etc.), and the specific amount of time that a plant will spend at each position 404 within the grow lane 402 is determined by the users of growing facility 100. The inventors have also recognized that, in a given indoor farm facility (e.g., 100, 300), the germination zone (e.g., 308) space capacity, propagation zone (e.g., 312) space capacity, and/or grow-out zone (e.g., 324) space capacity (number of lanes, number of positions per lane, particular growing conditions currently established in a given grow lane and at a given grow lane position) are limiting (and fairly fixed) constraints, and the labor (and cost) associated with adding, for example, new transplanted, propagated (immature) plants into respective first grow-out zone lane positions and, accordingly, removing mature, ready for harvest (mature) plants from respective last grow-out zone lane positions, is also a constraint, that may be optimized across the seeding-propagation-growing periodic lifecycle of the indoor growing facility 100 (e.g., by optimizing the respective latest seed date/time input for each crop) so that the propagation zone operations and different grow lane operations in the grow-out zone (and the plant varieties in such grow lanes) are continually and efficiently sequenced (as described in more detail below).

Once the plants have grown to maturity, the process can move to step 212. At step 212, harvesting occurs. At harvesting 212 (e.g., in harvesting zone 322), the plants are removed from the growing medium and/or from the growing floats (e.g., 501). The desirable parts of the plants are removed for further processing and the undesirable parts can be disposed of, composted or otherwise recycled. In some examples, the plants can be harvested using automatic cutting, shearing or scraping equipment.

Figure 9:
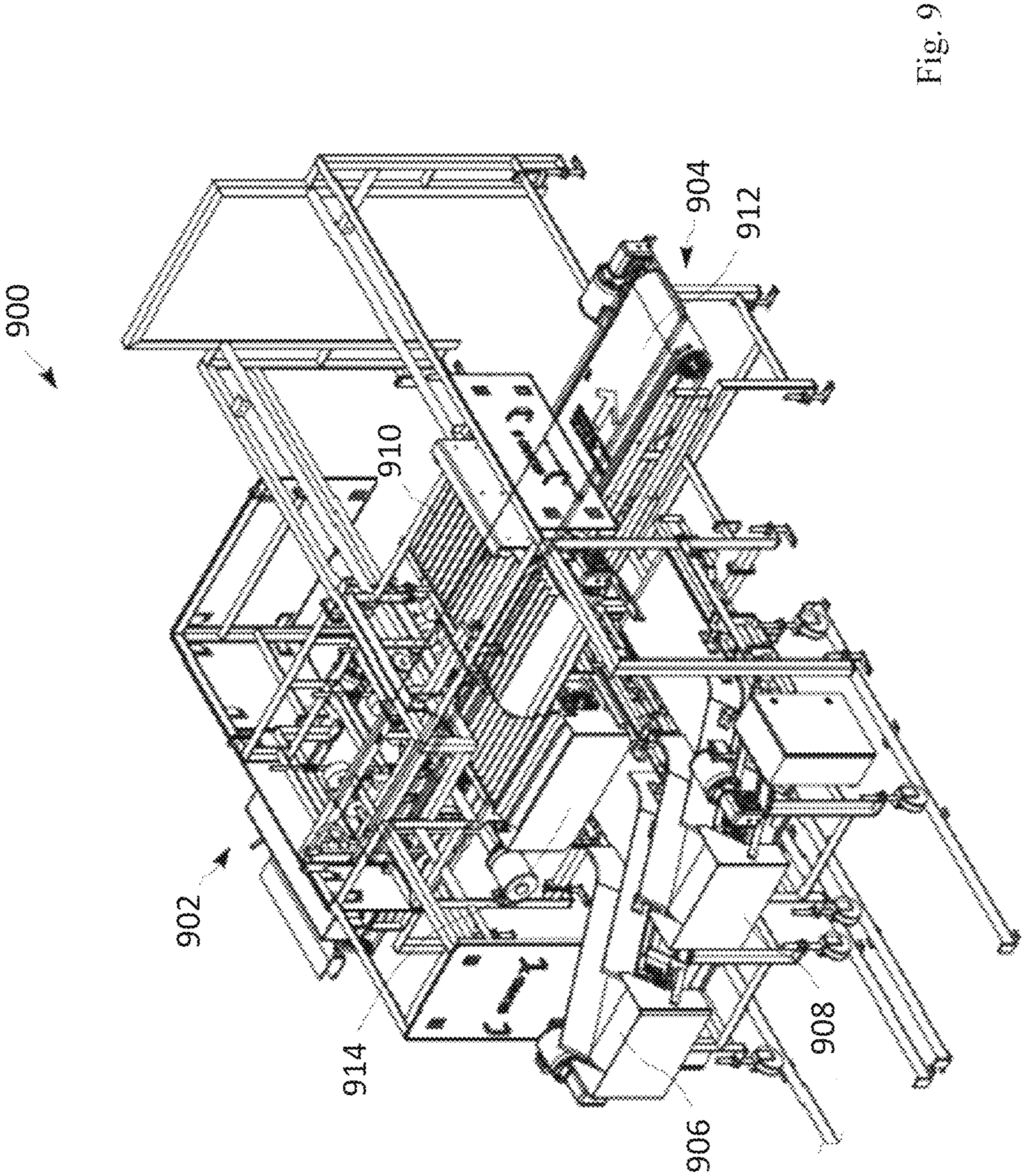
FIG. 9 is an isometric illustration of a harvester device in accordance with various embodiments of the present disclosure.

An example of a harvesting device 900 is shown in FIG. 9. The harvesting device 900 may operate to remove plants, growing medium or other materials from the floats (e.g., 501) after the floats are unloaded from the grow-out zone (e.g., 318). In various embodiments, the float (e.g., 501) may be inserted into the harvesting device 900 at the float input position 902. The float (e.g., 501) may be moved along the conveyor 912 to the float exit position 904. In various embodiments, the harvesting device 900 may include one or more scraping or removal devices such as blades or wiping belts that can move along surfaces of the float to scrape plants or roots that may be extending above or below the surfaces of the float. In the example shown, the harvesting device 900 may include a lower scraper 914 that can scrape the roots from the float (e.g., 501). In various embodiments, the harvesting device 900 may also include an upper scraper 910 that can remove the plant from the float. In various embodiments, a first hopper 906 may serve to convey the removed materials away from the conveyor 912 using a suitable conveyor or belt mechanism. In various embodiments, a second hopper 908 may serve to convey the materials removed by the upper scraper away from the conveyor 912 using a suitable conveyor or belt mechanism. While not shown, the growing containers, floats (e.g., 501), trays (e.g., 500), and/or benches (e.g., 602) can be cleaned and used to grow new plants using the same process.

At step 214, temporary storing of harvested plants may occur. After the plants have been harvested, in various embodiments, the plants may be either temporarily stored in a suitable storage bin (e.g., harvested plant bin in the harvesting zone (e.g., 322)) or placed in an active cooling area for cooling (e.g., 336). Any bin (e.g., box, container, tote) that can temporarily store plant material, and be closed and stacked, is suitable for use as a storage bin (e.g., harvested plant bin, mixed perishable good bin, etc.).

As discussed in more detail below, harvested plants can be mixed (e.g., in one or more mixed perishable good bins) to subsequently be apportioned and packaged for one or more finished mixed salad mix products (e.g., Salad Mix 'A'; Salad Mix 'B', and Salad Mix 'C'), and/or having respective predetermined packaged amounts of the respective harvested plants transferred to respective numbers of finished perishable good packages of finished non-mixed perishable good types (e.g., 4 ounce (oz.) Salad Package 'A', 9 ounce (oz.) Salad Package 'B', etc.). In some embodiments, the harvested plants are respectively allocated and/or transferred for mixing, and/or respectively apportioned and transferred for packaging, without being stored or placed in an active cooling area (e.g., 336). In various embodiments, harvested plants are temporarily stored in separate storage bins based on their respective plant variety (e.g., harvested green butter lettuce (GBL) is temporarily stored in a first harvested plant bin, red romaine is temporarily stored in a second harvested plant bin, broccoli microgreens are temporarily stored in a third harvested plant bin, etc.)

As is discussed herein, the decision to determine which harvested plants are placed in the storage bins (and which storage bins), which are placed in the active cooling area (e.g., 336), and/or which are mixed and/or packaged without being placed in a storage bin or active cooling area, is algorithmically determined based, in part, on a variety of factors, including but not limited to customer orders that have been forecasted and/or received. The storing step 214 may be performed using suitable conveyance devices such as robots, conveyors, pneumatics, manually assisted means, and the like that enable the storing process to segregate, allocate, apportion, and/or transfer the harvested plants to and/or from respective temporary storage bins in a manner that is algorithmically optimized (as described in more detail below) to achieve one or more objectives (e.g., 1748), for example, increased efficiency of post-harvest operations, minimization of perishable product waste (including by, for example, minimizing contact with post-harvested plants and optimal sequencing of particular harvested plants), efficient fulfillment of a plurality of different customer orders, etc.

At step 216, mixing of different harvested plant varieties may occur. At mixing step 216, the various types of plants stored in the storage bins (e.g., harvested plant bins) in step 214 may be mixed together in a specific manner (e.g., in a mixed perishable good bin) to create a plant mixture that corresponds to a mixed amount to create a plurality of finished perishable products to be subsequently packaged and shipped. In various embodiments, some finished perishable products may include a single plant varietal/type, and other finished perishable products may include a specific (e.g., predetermined) mixture of different plants for a particular salad and/or greens mix.

For example, a Salad Package 'A' finished perishable product may include a predetermined amount (e.g., 4 ounces (oz), 9 ounces (oz), 12 ounces (oz)) of green butter lettuce (GBL) per finished product package, a Salad Package 'B' finished perishable product may include a predetermined amount of green frill leaf lettuce (GFL) per finished product package, and a Microgreen Package 'A' finished perishable product may include a predetermined amount (e.g., 1 oz, 2 oz, etc.) of broccoli microgreens. In other words, these Salad Package 'A', Salad Package 'B', and Microgreen Package 'A' finished perishable good types are examples of finished perishable goods that do not require mixing prior to packaging. On the other hand, for example, a Salad Mix 'A' finished product may include a mix of GBL and GFL in a total predetermined finished product amount (e.g., 4 ounces (oz), 9 ounces (oz), 12 ounces (oz)) per finished product package, a Salad Mix 'B' finished product may include a mix of GFL and red frill leaf lettuce (RFL) in a total predetermined finished product amount per finished product package, a Salad Mix 'C' finished product may include a mix of RFL, kale, red chard, and broccoli microgreens in a total predetermined finished product amount per finished product package. In other words, these Salad Mix 'A', Salad Mix 'B', and Salad Mix 'C' finished commercial salad blends are examples of finished perishable goods that require mixing of different plant varietals/types prior to packaging.

As is illustrated in the above examples, to improve the efficiency of customer order fulfillment in vertical farm 300 environment, serving a multitude of customers with a multitude of finished perishable good types, requires a particularized solution to challenges associated with the perishability of the harvested plants (which can be exacerbated if there is unnecessary contact and/or transfer with such plants), perishability of the packaged finished products, some of these finished perishable good products being non-mixed crops, others of these finished perishable good products have a mix of harvested crops (and with varying respective fractional amounts of the same harvested plant varietals/types across these finished mixed perishable good products), and also with overlapping plant varietals between certain finished non-mixed perishable good products and certain finished mixed perishable good products.

The various plant varieties from different temporary storage bins (e.g., different harvested plant bins), from the active cooling area (e.g., 336), and/or from a harvesting device (e.g., 900), may be mixed together in a separate mixing storage container or storage location dedicated for mixing for a particular perishable finished good type (e.g., Salad Mix CA' mixed harvested good container or Salad Mix CB' mixed harvested good container, etc.), and temporarily stored to be subsequently apportioned and packed (e.g., into a respective predetermined number of finished good packages for each particular finished good type and size) at step 216. As is further described herein, the mixing step 216 may be performed using suitable conveyance devices such as robots, conveyors, pneumatics, manual labor and the like that enable the storing process to determine which harvested plant varieties, and how much (e.g., a respective allocated subset) of each respective harvested plant variety, will be moved from, for example, the respective, plant-variety specific storage bins, cooling area, and/or directly from plant harvesting equipment, and into a respective finished product-specific mixing bin (at step 216), and/or directly into a respective packing container (at step 218), such that the process is optimized (as described in more detail below) to minimize perishable product waste and efficiently fulfill a plurality of different customer orders.

At step 218, packaging may occur. The harvested plant products, either individually from the harvesting equipment of step 212, temporary storage bins or cooler of step 214, and/or from the mixed storage bins of step 216, as previously described, can be apportioned and packaged into containers, bags, boxes or other receptacles for shipping as finished perishable good products in step 220. As is further described herein, the packing step 218 may be performed using suitable conveyance devices such as robots, conveyors, pneumatics, manual labor and the like that enable the packing process to be performed. Additionally, which plant variety, how much of the plant variety, which mixed plant variety, and how much of the mixed plant variety (e.g., a respective predetermined apportioned amount (e.g., 1 oz, 4 oz, 9 oz, etc.) for the particular perishable good product type and/or customer orders, will be packed into respective finished perishable good product-specific packages may be algorithmically determined in various embodiments such that the process is optimized (as described in more detail below) to minimize perishable product waste, efficiently fulfill a plurality of different customer orders for different numbers and different types of finished perishable good products, and to, in some embodiments, prioritize certain orders and/or customers.

Once each of the finished plant products (e.g., finished mixed perishable good type products (e.g., Salad Mix CA', Salad Mix CB', Salad Mix 'C', etc.), single (non-mixed) perishable good type products (e.g., Salad Package A, Salad Package B, Microgreen Package A, Microgreen Package B, etc.) are respectively packaged, the finished plant product packages can be shipped or delivered to customers or other plant processing facilities at step 220. In various embodiments, prioritization is given to the finished product packages that are being delivered to particular orders. Special priority may be given, in some embodiments, based on the identity of the customer who ordered the finished product packages. In some embodiments, only a specific (e.g., predetermined) amount of priority orders can be shipped in a given day, and the rest of the orders being shipped would come from non-priority orders. Moving the packaged finished perishable good products to the mode of transport (e.g., truck, plane, train, etc.), within or in the vicinity of, for example, indoor farming facility 100, that will be transporting each respective order to its respective final destination (e.g., customer store, customer warehouse, etc.) may also be performed using suitable conveyance devices such as robots, conveyors, pneumatics, and the like that enable the shipping process, at or in the vicinity of, for example, indoor farming facility 100, to be automatically performed.

As can be appreciated, the process 200 can be continuously performed. In various embodiments, the process 200 is continuously performed using the facility 100 so that respective plants in various and respective stages of development are moving through the various zones and chambers from seeding 202 to packing 216. In this manner, the indoor farming facility 100 can continuously produce plants of various varieties/types, and finished perishable good products of various types, rather than being limited to specific growing seasons or by variations in weather or other external environmental conditions. Furthermore, since the process in performed indoors, the process can be performed in many different geographic locations and in closer proximity to urban areas or in areas that otherwise would not support farming of many plant varieties.

Figure 7:
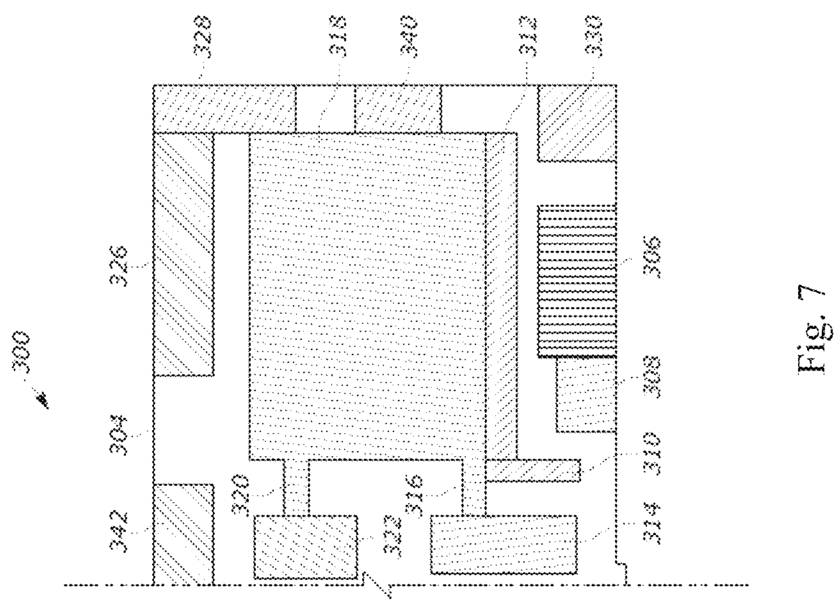
FIG. 7 is an enlarged plan view of a portion of the example floor layout of FIG. 3.

As shown in FIG. 3, an example layout of an indoor growing facility 300 is provided, with an enlarged plan view of a portion of this example floor layout provided in FIG. 7. The example layout illustrated in FIG. 3 is a plan view of the example indoor growing facility 100 shown in FIG. 1. The example layout of FIG. 3 illustrates the footprint of various rooms, chambers or zones in the indoor growing facility. The vertical farm 300 will be explained with reference to the growing process 200 previously described. It should be appreciated, however, that other layouts and other facilities can also be used.

The vertical farm 300 can be enclosed within one or more buildings and can include an external wall 304 that can be constructed to enclose the various zones of the indoor growing facility. The vertical farm 300 may include a seeding zone 306. The seeding zone 306 can be configured as an enclosed room in which the seeding step 202 can be performed. The germination zone 308 can be positioned adjacent or proximate to the seeding zone 306. The germination zone 308 can be an enclosed, environmentally controlled room in which the germination step 204 can be performed.

Figure 10:
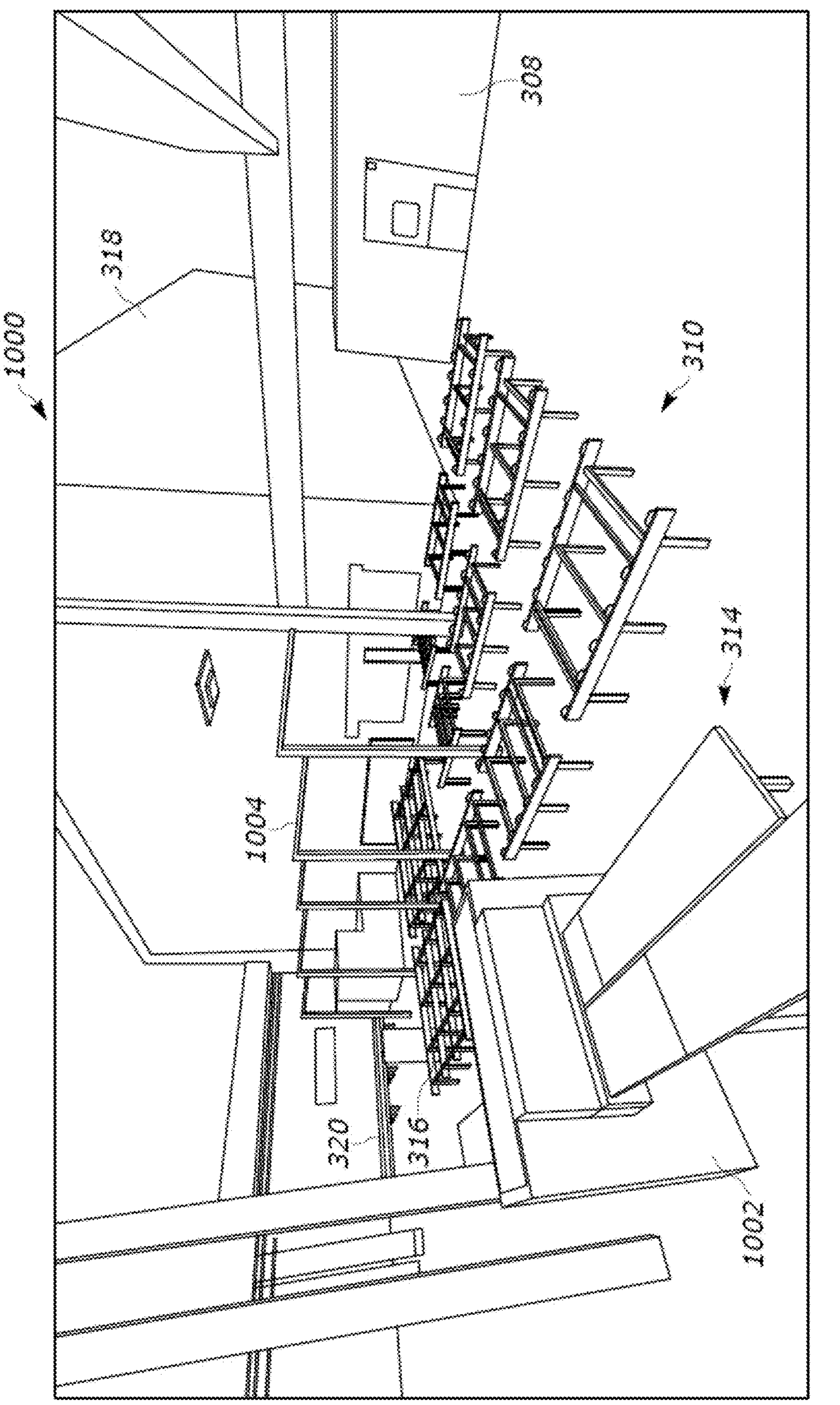
FIG. 10 is an illustration of portions of an example indoor growing facility in accordance with various embodiments of the present disclosure.

The vertical farm 300 may also include a propagation loading zone 310. The propagation loading zone 310 may include one or more conveyance assemblies such as conveyors, racks, or the like. The trays of plants from the germination zone 308 can be moved into or onto the propagation loading zone 310. The trays can then be moved from the propagation loading zone 310 into the propagation zone 312. As mentioned previously, this process can be performed automatically using suitable conveyance devices such as robots, conveyors, pneumatics, and the like. An illustration of portions of a growing facility 1000 are shown in FIG. 10. In this example, a germination zone 308, such as a germination room is positioned adjacent to the propagation loading zone 310. The propagation loading zone 310 can include one or more racks (not shown) that include wheels or rollers to allow the propagation trays (e.g., 500) to easily moved from the germination room and inserted into the propagation zone 312. The propagation zone 312 can be combined as part of the enclosure that makes up the grow-out zone 318. Thus, the propagation zone 312 can be environmentally controlled to have predetermined propagation characteristics such as humidity, air flow, temperature, lighting, irrigation and the like.

Figure 5A:
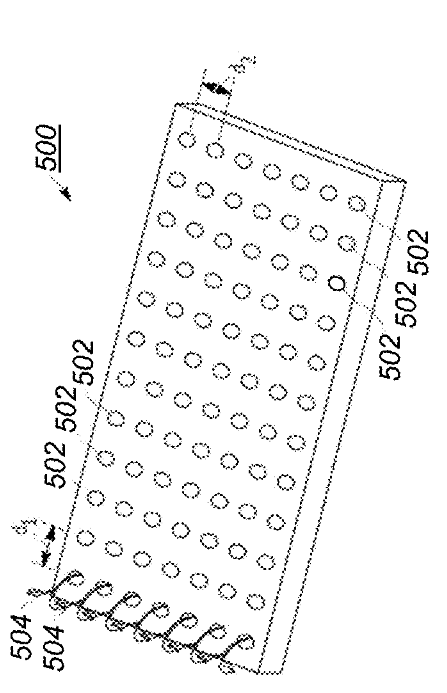
FIG. 5A is an isometric illustration of an example tray used during a germination and/or propagation stages of the growing processes of various embodiments of the present disclosure.
Figure 5B:
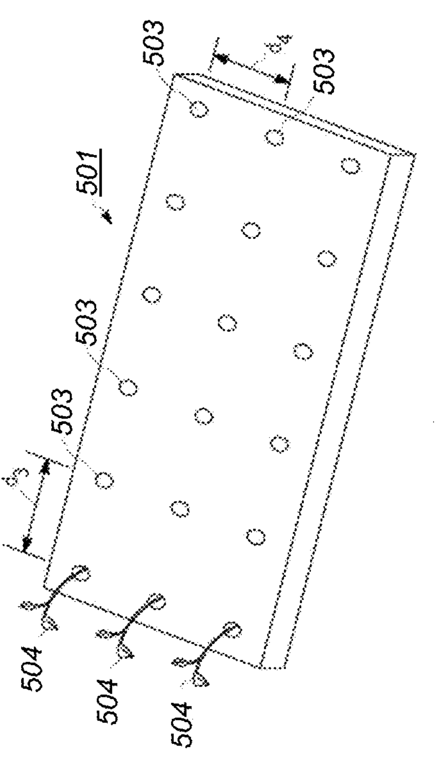
FIG. 5B is an isometric illustration of an example float used during a growing stage of the growing processes of various embodiments of the present disclosure.

The vertical farm 300 may also include a transplanting zone 314. The transplanting zone 314 may be located adjacent or proximate to the propagation loading zone 310. In this manner, the movement of the plants from the propagation zone 312 to the transplanting zone 314 is simple and does not require excessive movement of the propagated plants. The step 208 of transplanting can occur in the transplanting zone 314. The plants can be transplanted from a tray to a float in the transplanting zone 314. As mentioned above, the transplanting zone 314 may include an automatic transplanting apparatus that can remove plants from the propagation trays 500 and deposit the plants in the growing floats 501. An example propagation tray 500 and an example growing float 501 are shown in FIG. 5A and FIG. 5B, respectively. Referring to FIG. 10, the transplanting zone 314 can include a transplanting apparatus 1002 that can automatically transfer the plants from the propagation trays 500 to the floats 501.

The vertical farm 300 can also include a growing loading zone 316. The growing loading zone 316 is a region of the layout of the growing facility in which the floats of plants (e.g., 501) can be inserted or loaded into the grow-out zone 318. The growing loading zone 316 can include conveyors, racks, ramps, robots, automated moving systems, or other conveyance devices to move the floats into the grow-out zone 318. The loading equipment in growing loading zone 316 can be automatically controlled to deliver floats (e.g., 501) and/or plants into the proper first position 404 of a grow lane 402 of grow-out zone 318, as shown in FIG. 4. The floats that include the propagated plants may be installed or inserted into benches (e.g., 602) that can hold multiple floats. The benches (e.g., 602) may also be conveyed, moved or otherwise loaded in the growing loading zone 316 into the grow-out zone 318. The growing loading zone 316 can be positioned adjacent to the transplanting zone 314 and adjacent to the grow-out zone 318.

Referring to FIG. 10, the floats 501 may be positioned inside benches (e.g., 602) and moved into the grow-out zone 318 in growing loading zone 316. The benches (e.g., 602) may be placed near the growing loading zone 316 by an automated overhead crane 1004 after washing and then loaded with floats (e.g., 501). The floats (e.g., 501) and benches (e.g., 602) may be moved, for example, along a rail system into the growing loading zone 316. In other examples, the crane 1004 can also be used in the growing unloading zone 320 (described below) to move the floats (e.g., 501) and/or benches (e.g., 602) in the growing unloading zone 320. Any suitable rail system may be utilized in vertical farm 300 such as, for example, the rail system described in U.S. patent application Ser. No. 18/048,086, filed Oct. 20, 2022, entitled “Automated Indoor Growing Apparatus and Related Methods”, the disclosure of which is incorporated by reference herein in its entirety.

The grow-out zone 318 may be positioned to accept the plants that may be positioned in the respective floats and/or benches in each grow lane (e.g., 402). The grow-out zone 318 is a large enclosure that allows the growing plants to be subjected to environmentally controlled conditions. The controlled environment can improve the growth rate and health of the plants. The environmentally controlled conditions can also use less resources than traditional farming methods. The grow-out zone 318 includes a multitude of grow lanes 402 that create separate growing pathways or chambers within the grow-out zone 318 that can further optimize and improve the environmental characteristics such as light, humidity, air flow, temperature, irrigation and the like for a particular plant variety/type to allow for an optimized and more efficient growing process.

Figure 11:
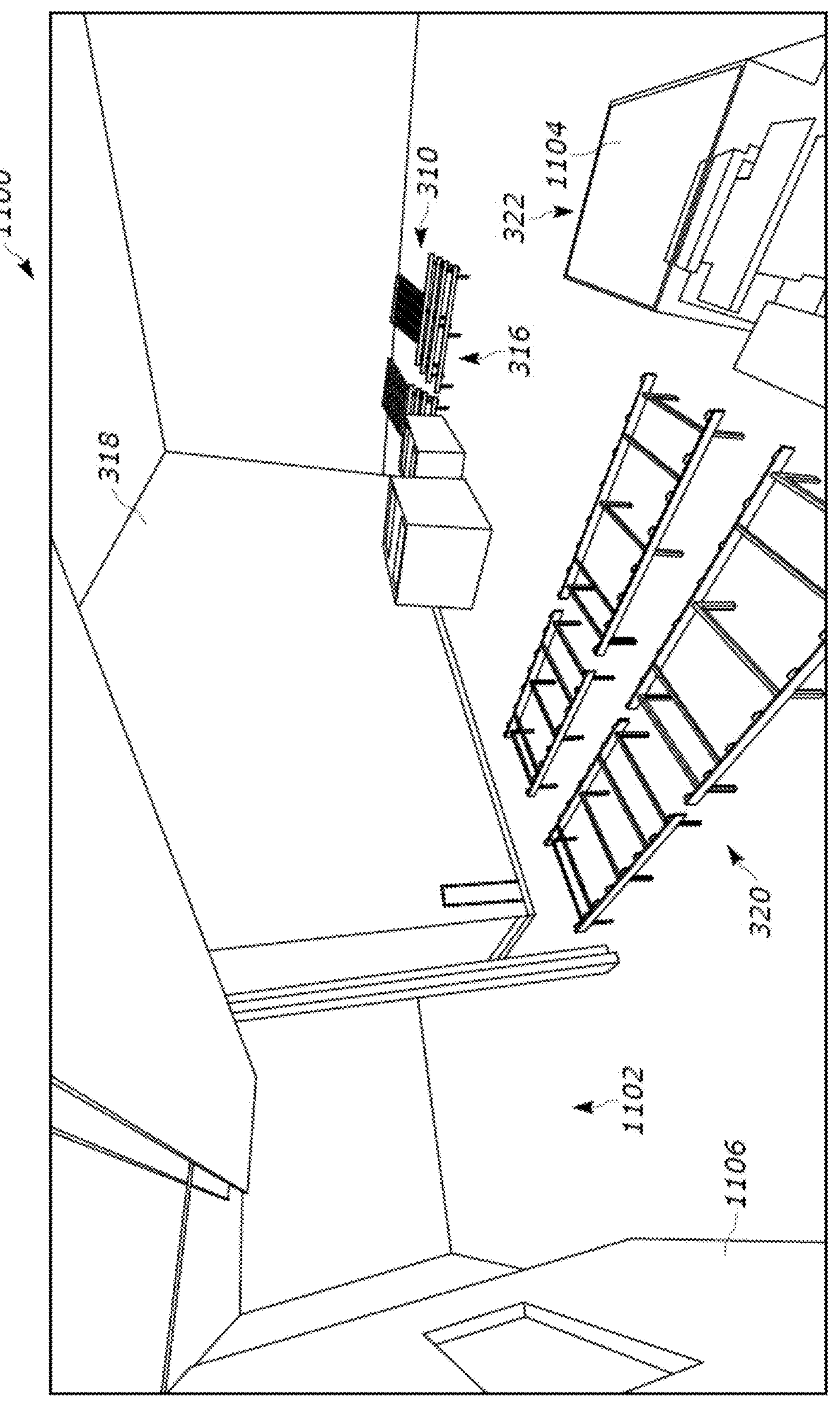
FIG. 11 is an illustration of further portions of an example indoor growing facility in accordance with various embodiments of the present disclosure.

The plants in the respective floats are respectively loaded into the grow lanes 402 of the grow-out zone 318 and move sequentially through each distinct position 404 in each grow lane 402 as they mature. In the example shown, the plants may move toward the growing unloading zone 320 as they mature. After the plants are fully matured, the plants can be unloaded from the grow-out zone 318. As previously described regarding FIG. 2, the growing unloading zone 320 can include conveyors, racks, elevators, robots, and the like that can unload the floats and/or benches of plants from the grow-out zone 318. Referring now to FIG. 11, another view of the indoor growing facility 1100 is provided from a different angle from that shown in FIG. 10. In this example view, the growing unloading zone 320 is shown to include one or more rail systems with rollers that can be used to move the floats (e.g., 501) and/or the benches (e.g., 602). In the background of this example, the growing loading zone 316 and the propagation loading zone 310 can be seen. The grow-out zone 318, which may be a modularized structure, may be enclosed in the building 1106 and, in some embodiments, may be separated from the exterior walls of the building 1106.

The unloaded plants may move from the growing unloading zone 320 to the harvesting zone 322. The harvesting step 212 of the process 200 previously described may be performed in the harvesting zone 322. For example, the mature plants may be removed from each of the respective floats (e.g., 501) at the respective last position in each grow lane 402, and the desirable portions of the plants that are used to produce plant products can be cut, trimmed, scraped or otherwise removed. The undesirable parts of the plants and/or the growing medium can be deposed of, composted, or otherwise recycled. The harvesting zone 322 may include, for example, a harvesting device for removing the usable portion of the plant from the float (e.g., 900). Referring back to FIG. 11, an example of a harvesting device 1104 is shown as being positioned in the harvesting zone 322.

The vertical farm 300 may also include a work-in-process (WIP) zone 332. The work-in-process zone 332 can be used for various tasks after harvesting. The work-in-process zone 332 can be used, for example, to perform the mixing step 216 previously described. In other examples, the work-in-process zone 332 can be used to perform other tasks. The vertical farm 300 may also include a product cooling area 336, which can be an active cooling area for cooling the harvested plants prior to mixing and/or packaging (e.g., as temporarily stored in harvested plant bins), and/or for cooling the mixed perishable goods prior to packaging (e.g., as temporarily stored in mixed perishable good bins).

The vertical farm 300 may also include the packing zone 334. The packing zone 334 may include various workstations and/or packing equipment that can be used to perform the packing step 218. In various examples, the packing zone 334 can include bagging, boxing, packaging, sealing, cooling or atmospheric modification equipment as may be desired to package, preserve and prepare the finished plant products for shipment in finished perishable good packages to customers or other processors.

The vertical farm 300 may also include washing zone 342. The washing zone 342 may include various pieces of equipment that can be used to wash the various pieces of equipment used in the growing process. Such elements that may need washing include the trays (e.g., 500), floats (e.g., 501), or benches (e.g., 602) used during propagation or growing or other growing equipment, and removable components of the harvesting equipment. As further shown in FIGS. 3 and 7, the vertical farm 300 may include other systems or equipment that may serve or provide inputs to the other zones in the vertical farm 300 such as, for example, air handler zone 324, one or more irrigation systems to provide water having predetermined characteristics to the various zones (e.g., first irrigation system 326, second irrigation system 328, propagation irrigation system 330), and/or fresh water system 340, each of which is described in U.S. patent application Ser. No. 18/048,086, filed Oct. 20, 2022, entitled "Automated Indoor Growing Apparatus and Related Methods", the disclosure of which is incorporated by reference herein in its entirety.

Figure 8:
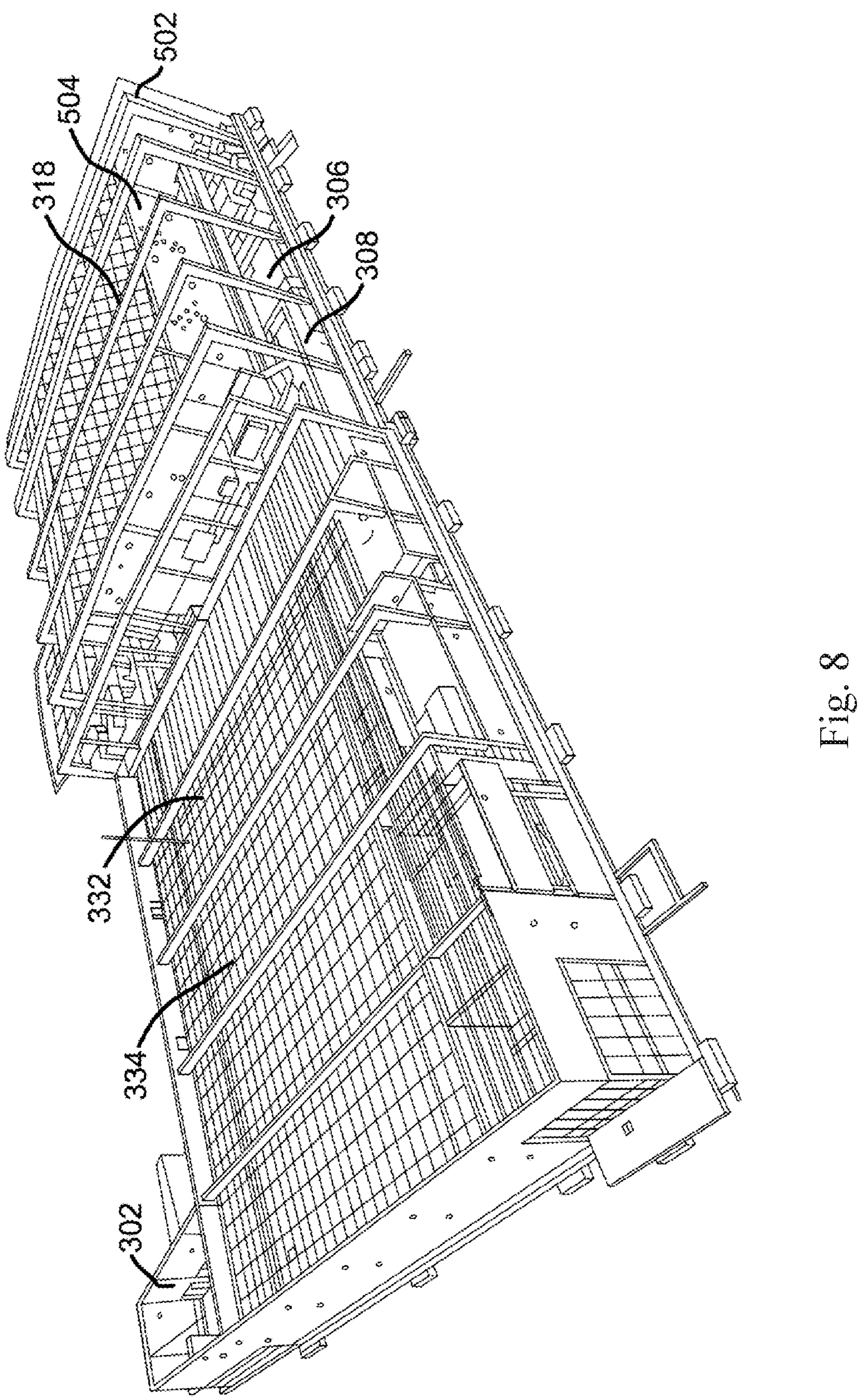
FIG. 8 is an isometric view of the example indoor growing facility with the floor layout of FIG. 7 and shown with portions of the walls and roof as transparent to illustrate the interior components and layout of the facility.

Referring now to FIG. 8, an illustration of the indoor growing facility 500 is provided. As shown in the illustrated example, indoor growing facility 500 may have a similar layout to the vertical farm 300 shown in FIGS. 3 and 7. In the figure, a portion of the roof of the facility 500 is removed to illustrate the location of the grow-out zone 318 inside the outer building 502, and with portions of the wall and roof as transparent to illustrate the interior components and layout of the farming facility. In the illustrated example, the grow-out zone 318 occupies the largest portion of the facility 500 and is located within a larger enclosed structure 502. It is understood however, that the facility 500 could have multiple grow zone modules within the enclosed structure 502 and that the grow-out zone 318 does not need to occupy the largest footprint in the facility. In this example, the grow-out zone 318 includes a growing shell or growing module 504, which is located within and enclosed by outer building 502. In various embodiments, climate control systems and equipment of vertical farm 300, examples of which are described in U.S. patent application Ser. No. 18/048,086, filed Oct. 20, 2022, entitled "Automated Indoor Growing Apparatus and Related Methods", the disclosure of which is incorporated by reference herein in its entirety, may be located inside a protected environment within outer building 502, but outside the grow-out zone 318. In some embodiments, such environmental control equipment may be located inside the grow zone.

Turning now to FIG. 5A, an example propagation tray 500 is shown. The tray 500 can include multiple openings 502 arranged with a predetermined spacing $d_1$ in a longitudinal direction along the tray 500. The openings 502 can also be spaced apart at a distance $d_2$ in a transverse direction across the tray 500. Any suitable distances $d_1$ and $d_2$ can be used. Since the propagation tray 500 is used during seeding, germination, and propagation, the distances $d_1$ and $d_2$ can be relatively small since the plants 504 that are growing during these stages of development are small (when compared to, for example, the growing stage of development). In various embodiments, the propagation tray distances $d_1$ and $d_2$ may be used in providing a Density input to the Seed Scheduling optimizer algorithm (described in more detail below).

FIG. 5B shows an example float 501 that may be used to retain the plants 504 during the growing stage of development (210) after propagation (206). The respective plants 504 can be retained in the respective floats 501 (in each grow lane (e.g., 402)) until the plants 504 reach maturity and are respectively harvested. As can be seen, the plants 504 are arranged in openings 503 in the floats 501 in less dense arrangement than that in the trays 500. The plants 504 become much larger during the growing stage of development and thus must be positioned further apart from each other (compared to during the propagation stage of development) to allow each plant 504 to grow to a mature size. The openings 503 can be arranged on the float 501 having a distance $d_3$ from each other along the longitudinal direction and having a distance $d_4$ from each along the transverse direction across the float 501. The distances $d_3$ and $d_4$ can be any suitable distance to accommodate the needs of the more mature plant in the plant life cycle. In various embodiments, the grow-out float distances $d_3$ and $d_4$ may be used in providing a Density input to the Seed Scheduling optimizer algorithm (described in more detail below).

Figure 6:
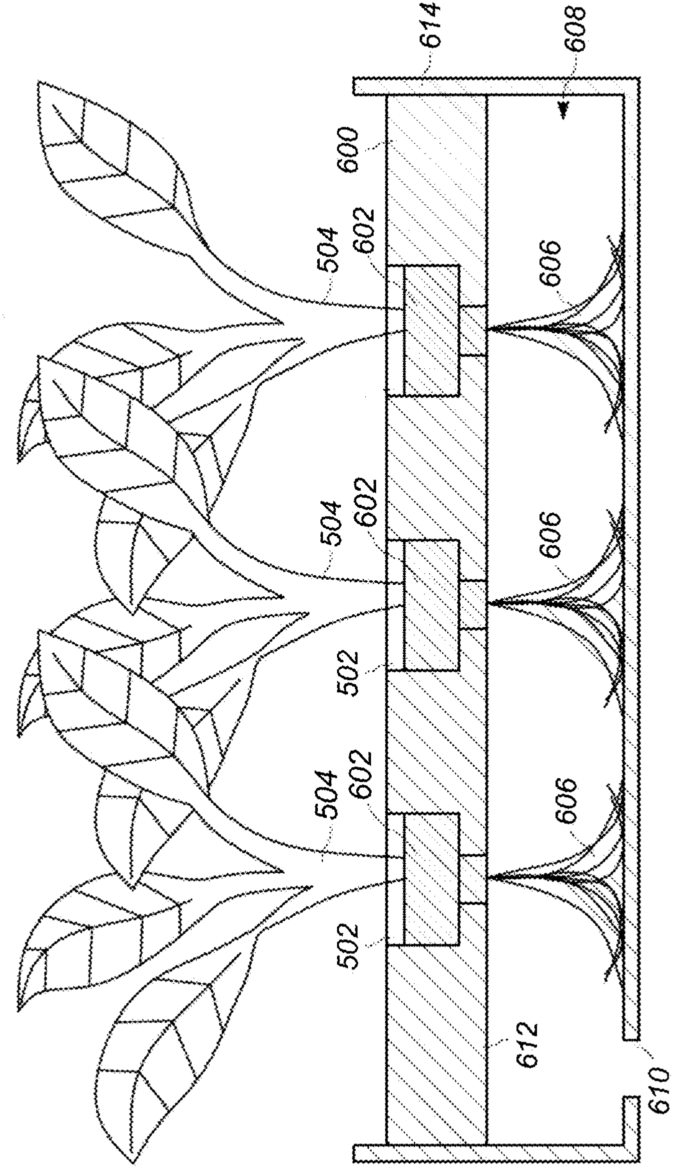
FIG. 6 is a cross-sectional illustration of an example of a float and bench assembly that may be used during the growing stage of various embodiments of the present disclosure.

FIG. 6 shows an example bench assembly 600 that includes a float 501 retained in a bench 602. After the plants 504 respectively exit propagation, the plants 504 are respectively transplanted from the tray 500 into the float 501 (e.g., in a respective first position in a respective one of the grow lanes 402). In certain examples of transplanting, the plants 504 and the growing medium 604 are removed from the trays 500 and are re-inserted into the openings 503 of the float 501. The openings 503 of the trays 500 and the opening 503 of the floats 501 may have the same or similar outer size or outer diameter. In this manner, the plants 504 and the growing medium 604 may be re-inserted into the floats 501 in the less dense arrangement as previously described.

As further shown, the float 501 may be inserted into a bench 600. The bench may be a rectangular box that can be sized so that the float 501 fits inside the internal volume defined by the walls of the bench 600. The float 501 may be positioned so that a lower surface 612 of the float 501 is positioned above a base 614 of the bench 602. This arrangement defines a cavity 608 between the lower surface 612 and the base 614. Base 614, also comprises an irrigation drain 610. The roots 606 of the plants 504 can extend from the float 501 into the cavity 608. In this arrangement, the roots 606 can grow to a suitable size to support a mature plant despite the growing medium 604 being relatively small for a mature plant. In various embodiments, each bench 600 may be sized to accommodate a plurality of floats 501 (e.g., 6 floats 501 per bench 60, 12 floats 501 per bench 600, etc.).

As previously described, in various embodiments, the grow-out zone 318 includes a plurality of grow lanes 402 that separate the grow-out zone 318 into a plurality of growing pathways. While the exact arrangement, such as the number of lanes or rows may vary, the relative arrangement of the grow-out zone, the propagation zone and other aspects as hereinafter described provide improved performance and growing conditions over that of other growing structures. As shown in FIG. 4, each single lane 402 may be sized to receive ten bench assemblies 602 positioned and aligned side by side in respective positions (e.g., 1, 2, 3 . . . 10). In some embodiments, each lane 402 can be respectively sized to allow for more than ten bench assemblies or to support less than ten assemblies. In various embodiments, this facility specific information (e.g., positions per line/lane, plants per tray/float/bench, space capacity) is respectively provided as inputs to the seed scheduling optimizer algorithm (described in more detail below) for an optimization determination every specific time period (e.g., every day at midnight).

In various embodiments, each lane 402 in the grow-out zone 318 may include a different plant variety/type, or may be on a different growing schedule and climate conditions, than an adjacent lane or row. As such, a newly propagated and transplanted bench assembly 602 of plants 504 may need to be inserted into the appropriate environmentally controlled grow lane 402. In various embodiments, this production line assignment information (e.g., Line ID, Crop ID, latest seed date/time) and crop recipe information (e.g., routing information in the germination zone, propagation zone, and/or grow-out zone; density in the germination zone, propagation zone, and/or grow-out zone; plant species) is respectively provided as inputs to the Seed Scheduling optimizer algorithm (described in more detail below) for an optimization determination every specific time period (e.g., every day at midnight).

In various embodiments, and as explained in more detail below, users of vertical farm 300 (e.g., supply planners and growers) may periodically determine which crops are assigned to which production lines (e.g., respective grow-out zone lanes 402) (Production Line Assignments 1505 Line ID 1501 and Crop ID 1502 inputs), and the densities of the crops on/for those lines (e.g., density of corresponding plants on respective floats 501, density of corresponding plants on respective propagation trays 500, density of corresponding seeds on respective germination trays, etc.) (Crop Information 1510 Density 1507 and Species 1508 inputs) based on the customer demand (forecasted and/or actual), which then specifies the germination, propagation, and grow-out zone space usage during that period (e.g., the daily usage of such space) (relative to Facility Information 1515 Positions per line 1511, Plants per tray 1512, and Space Capacity 1513 inputs), and which may be provided to a seed scheduler optimizer as essentially fixed (or constant) inputs for the period. In various embodiments, and as explained in more detail below, the output of the Seed Scheduling optimizer algorithm includes a respective latest seed date/time offset for each of the crops that is newly determined and optimally adjusted every specific time period (e.g., every day at midnight) and to meet a particular objective 1548.

A loading transportation lane 406 allows the bench assembly to be moved to the desired row 402. In one example, the bench assembly 602 may be moved into a desired row 402 by a pneumatic piston, or other automated device, to move the bench assembly 602 from the loading transportation lane 406 and into the respective first position, position 404, No. 1, of a particular row or grow lane 402. As the bench assembly 602 is moved into the respective first position of the particular grow lane 402, the bench assemblies 602 in the grow lane 402 push against one another to advance the bench assemblies along the grow lane 402 toward the unloading transportation lane 408. Thus, as one bench assembly is moved into the first position in a grow lane 402, the bench assembly 602 previously in the tenth position of the same grow lane 402 is pushed into the unloading transportation lane 408.

Despite the advantages of using grow lanes 402 in indoor farming, the inventors have identified that, in certain grow-out zone configurations, sequentially moving the bench assemblies 602 at predetermined intervals may result in a choke point in the propagation zone 312, between the propagation zone 312 and the grow-out zone 318 (e.g., transplanting zone, growing loading zone 316), in the grow-out zone 318 itself, and/or in growing unloading zone 320. These choke points occur, in part, as a downstream effect of a particular plant varietal in a propagation tray 500 needing to be transplanted and moved into a particular grow lane 402 for that particular plant varietal, but there is no room, at that time, at the respective first position 404 of that particular grow lane 402. Further exacerbating this problem, the inventors have identified that the particular plants in propagation trays 500 may be awaiting transplant while there are empty first positions 404 in other grow lanes 402 that do not align with the environmental conditions required by the particular plant varieties awaiting transplant.

As described above, the inventors have also recognized that, in a given indoor farm facility (e.g., 100, 300), the germination zone (e.g., 308) space capacity, propagation zone (e.g., 312) space capacity, and/or grow-out zone space capacity (number of lanes, number of positions per lane, particular growing conditions currently established in a given grow lane and at a given grow lane position) are limiting (and fairly fixed) constraints, and the labor (and cost) associated with adding new transplanted, propagated (immature) plants into respective first positions (in the transplanting zone 314 and growing loading zone 316) is also a constraint that may be optimized across the seeding-propagation-growing periodic lifecycle of the indoor growing facility 100 (e.g., by optimizing the respective latest seed date/time input for each crop) so that the propagation zone operations and different grow lane operations in the grow-out zone (and the plant varieties in such grow lanes) are continually and efficiently sequenced. With the exemplary embodiments described herein, operations in the germination zone, propagation zone, and/or grow-out zone can be continually and efficiently sequenced (as described in more detail below).

If, at a given indoor farm facility 300 where different crops are being grown within the same germination-propagation-grow-out zone spaces, an objective (e.g., 1548, FIGS. 15 and 16) of having substantial smoothness in supply on a specific period-to-specific period (e.g., day-to-day) basis (e.g., a substantially similar amount of each crop type in production to be unloaded from the grow-out zone every specific period (e.g., every unload day)) is not achievable without an optimized seeding schedule being periodically determined (e.g., without optimized, crop and line-specific seed date/times being computed every day). As discussed above, this objective cannot be achieved without periodic determination of an optimized seeding schedule (e.g., cannot be achieved without optimized crop-specific seed date/times being computed every specific period (e.g., every day)) because, assuming the facility space constraints are essentially fixed/constant on a specific period-to-specific period (e.g., day-to-day) basis, each different crop's recipe specifies different routing times (different times required in each of the germination, propagation and grow-out zones) and different density requirements in each of the germination, propagation and grow-out zones.

For example, every specific period (e.g., every day) in the indoor farm facility 300, all crop types are sharing the same (constrained) germination, propagation and grow-out space, but each crop's recipe (e.g., Crop Information 1510, Routing 1506, Density 1507, and Species 1508 inputs) requires a different amount of time and density in each of these spaces. Using the grow-out zone structure illustrated in FIG. 4 as an example, based on customer demand, the Production Line Assignments 1505 may be as follows: grow lanes 402*a* and 402*b* may be assigned to a particular crop recipe of GFL, grow lane 402*c* may be assigned to a particular crop recipe of GBL, grow lane 402*d* may be assigned to a particular crop recipe of RFL, and grow lane 402*e* may be assigned to a particular crop recipe of broccoli microgreens. As an example, the particular GFL recipe 1510 may define that its seeds spend two (2) days in the germination zone, its early stage plants spend four (4) days in the propagation zone, and its plants spend twenty five (25) days in the grow-out zone (Routing Input 1506), that its float 501 density is 64 plants, that it has a safety overseed of 15% (to account for plants that die in germination and propagation zones), and that its germination tray density is 130 seeds (Density input 1507). In this example, as each grow lane 402 has ten (10) respective positions 404 and this GFL crop recipe 1510 requires 25 days in the grow-out zone (where day 0 is a transplant 208 day and day 25 is a harvest 218 day), the transplant plot interval for each GFL-assigned grow lane 402 (time period between transplants 208) is 2.5 days (25 days/10 plot positions) or approximately 60 hours. In various embodiments, for example, this may result in a daily cadence (e.g., pattern of timing of certain events) for transplanting 208 operations for this line of day 1 (transplant), day 2 (no transplant), day 3 (transplant), day 4 (no transplant), day 5 (no transplant), day 6 (transplant), day 7 (no transplant), day 8 (transplant), day 9 (no transplant), and so on (example depicted in the table below with "1" referring to a day where the operations personnel are transplanting, and "0" referring to a day where they are not transplanting, for these GFL-assigned grow lanes):

| Day | 1 | 2 | 3 | 4 | 5 | 6 | 7 | 8 | 9 |
|---|---|---|---|---|---|---|---|---|---|
| Transplant | 1 | 0 | 1 | 0 | 0 | 1 | 0 | 1 | 0 |

In addition to the transplant 208 cadence (e.g., daily (or other specific period) pattern of timing of transplanting and no transplanting events) for these particular GFL-assigned grow lanes 402*a* and 402*b* resulting from the recipe 1510 and grow-out zone constraints 1515, a particular seed 202 cadence (e.g., daily (or other specific period) pattern of timing of seeding and no seeding events), a particular propagation 206 cadence (e.g., daily (or other specific period) pattern of timing for moving trays from the germination zone to the propagation zone) for the seeds/plants that will ultimately result in the GFL-plants being transplanted per the transplant cadence into the particular GFL-assigned grow lanes 402*a* and 402*b* also results from the GFL-crop recipe 1510 and germination zone and propagation zone constraints 1515.

Additionally, in this example, each of the respective GBL, RFL, and broccoli microgreens recipes 1510—respectively assigned to grow lane 402*c*, grow lane 402*d*, and grow lane 402*e* (Production Line Assignments 1505)—will specify a different amount of time and density requirements for the shared germination, propagation and grow-out space (with respective constraints specified in Facility Information 1515 inputs). Accordingly, the respective transplant 208 cadence, seed 202 cadence, and propagation 206 cadence in and for the GBL-assigned grow lane 402*c*, RFL-assigned grow lane 402*d*, and broccoli microgreens-assigned grow lane 402*e* will differ from each other, and will also each differ from those respective cadences for the GFL-assigned grow lanes 402*a* and 402*b*. These varying cadences between the particular production lines may result in bottle necking problems (e.g., some plants are ready to be transplanted but cannot because of spatial or resource constraints), large fluctuations in the required number of propagation trays 500 in the propagation space on a specific period-to-specific period (e.g., day-to-day) basis, and a large amount of wasted warehouse space that must be allocated to the propagation space such that it is large enough to handle very large peaks in propagation tray population.

Figure 15:
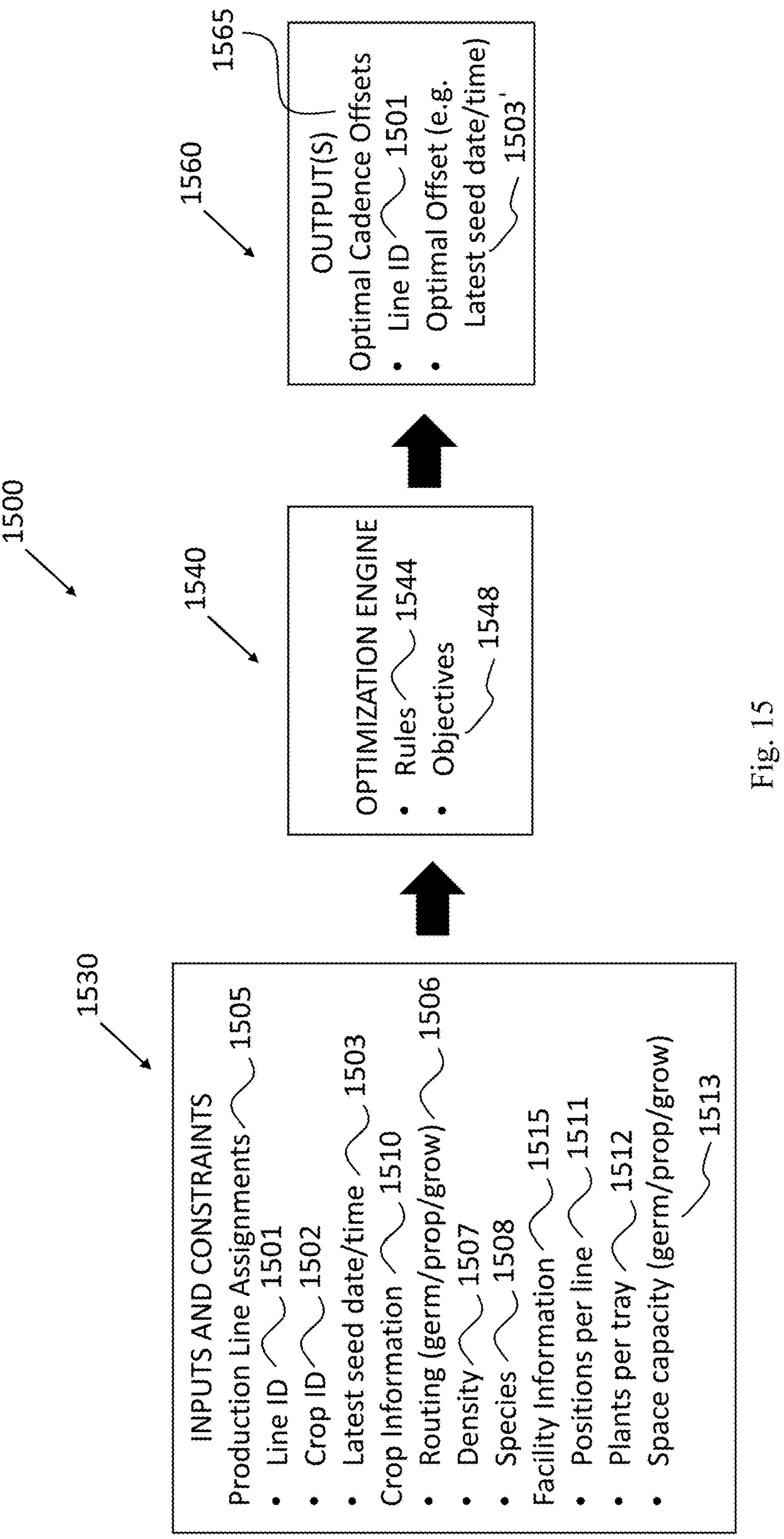
FIG. 15 is a flow chart showing an example of a seeding schedule optimization algorithm according to various embodiments of the present disclosure.

Referring now to FIG. 15, a flow chart showing an example of a seeding schedule optimization algorithm 1500 according to various embodiments of the present disclosure is provided. In various embodiments, and as discussed in the examples above, the seeding schedule optimization algorithm may receive Production Line Assignment inputs 1505 (e.g., Line ID 1501, Crop ID 1502, Latest seed date/time 1503 inputs), Crop Information/Recipe inputs 1510 (e.g., Routing (germination, propagation, and/or grow-out zone) time 1506 inputs, Density (germination, propagation, and/or grow-out zone) 1507 inputs, plant Species 1508 inputs), and Facility Information 1515 inputs (e.g., Positions per line 1515 (e.g., per grow-out zone lane 402), Plants per tray/float/bench 1512 (e.g., germination, propagation, and/or grow-out zone), and/or Space capacity 1513 (e.g., germination, propagation, and/or grow-out zone) inputs).

In various embodiments, users of vertical farm 300 (e.g., supply planners and growers) may periodically determine which crops are assigned to which production lines (e.g., respective grow-out zone lanes 402) (Production Line Assignments 1505 Line ID 1501 and Crop ID 1502 inputs), and the densities of the crops on/for those lines (e.g., density of corresponding plants on respective floats 501, density of corresponding plants on respective propagation trays 500, density of corresponding seeds on respective germination trays, etc.) (Crop Information 1510 Density 1507 and Species 1508 inputs) based on the customer demand (forecasted and/or actual), which then specifies the germination, propagation, and grow-out zone space usage during that period (e.g., the daily usage of such space) (relative to Facility Information 1515 Positions per line 1511, Plants per tray 1512, and Space Capacity 1513 inputs), and which may be provided to a seed scheduler optimizer as essentially fixed (or constant) inputs for the period.

In various embodiments, users of indoor farm facility 300 may also have an objective 1548 of having substantial smoothness in supply on a specific-period-to-specific period (e.g., day-to-day) basis (e.g., a substantially similar amount of each crop type (e.g., GFL, GBL, RFL, broccoli microgreens in the above example) in production lines to be transplanted into the grow-out zone every transplant day), or of avoiding, for example, having large variations in the amount of plants required to be transplanted between different transplant days. In multi-crop species, and facility constrained scenarios (such as the example described above)—where the different grow lanes 402 have distinct transplant cadences (and possibly distinct seed and/or propagation cadences), such an objective is not achievable in this indoor farm facility 300 without an optimized seeding schedule being periodically determined (e.g., without optimized, crop and line-specific seed date/times 1565 being periodically determined).

Figure 13A:
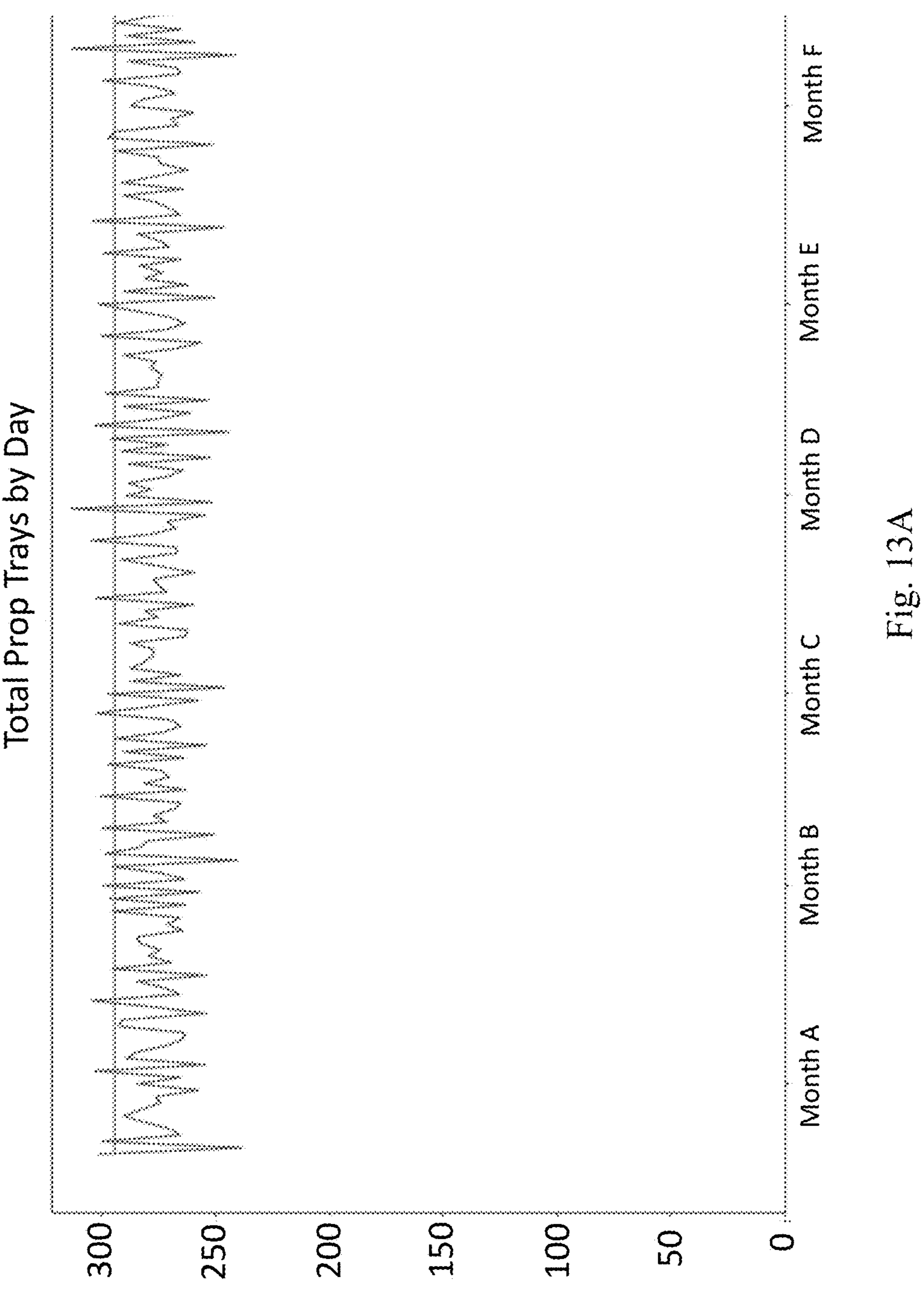
FIG. 13A is an illustration of an example of propagation tray population over time without using a seeding schedule optimizer algorithm of various embodiments of the present disclosure.

Referring now to FIG. 13A, an example of how, in multi-crop species, and facility constrained scenarios (such as the example described above), peak variations (and the number of propagation trays (e.g., 500) required), and the size of such variations from specific period-to-specific period (e.g., day-to-day)) may periodically exceed the maximum capacity of the propagation space if an optimized Latest seed date/time 1503' Output for each production line (Line ID 1501) is not periodically determined using a seed schedule optimizer as described herein and then utilized as an Input to update each production line's seed date/time in the indoor farm facility 300.

Figure 13B:
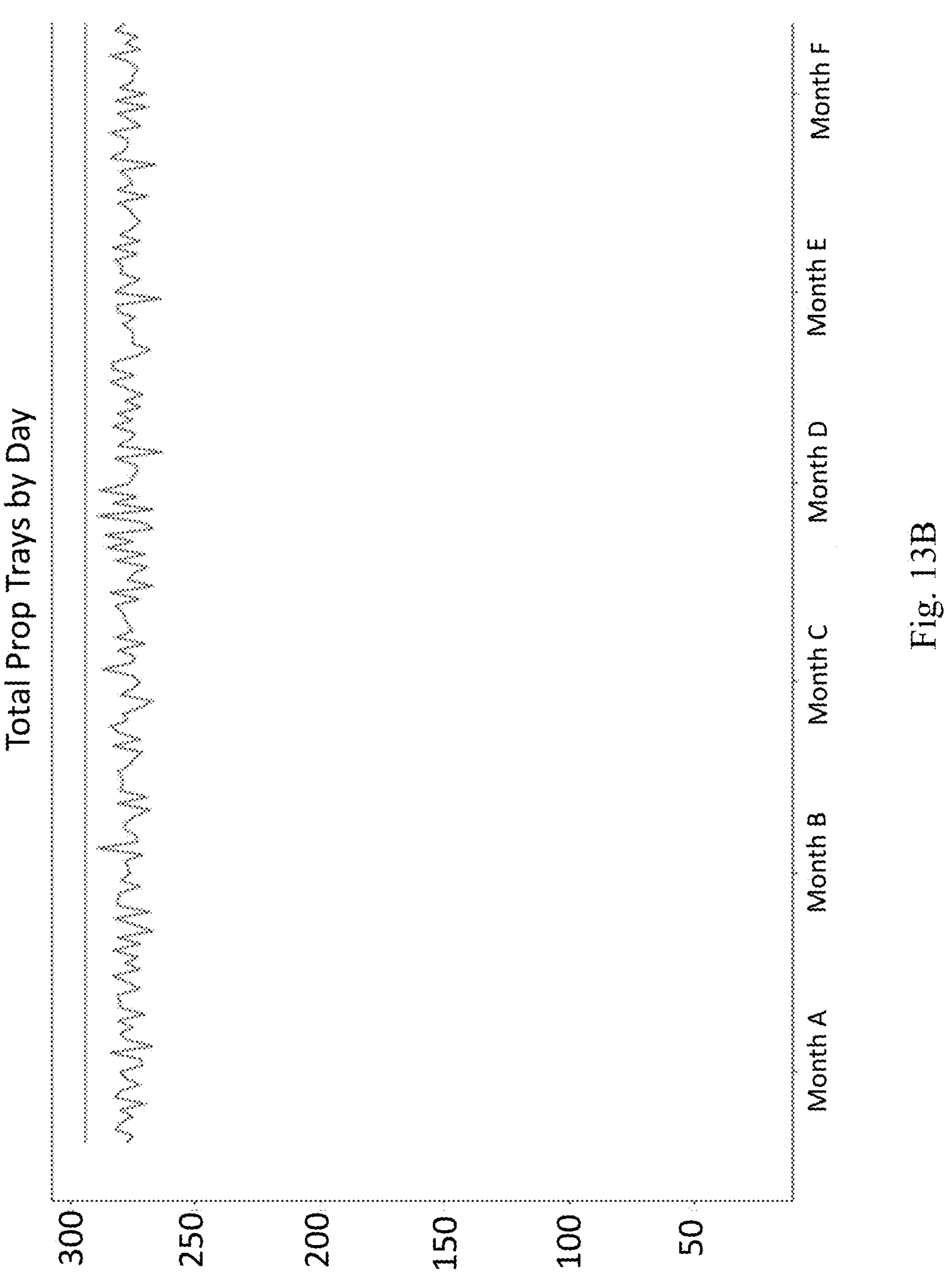
FIG. 13B is an illustration of an example of propagation tray population over time when using a seeding schedule optimizer algorithm of various embodiments of the present disclosure.

Referring now to FIG. 13B, an example of how, in these same multi-crop species, and facility constrained scenarios (such as the example described above), and objective 1548 of far smaller variation swings in propagation tray requirements from specific period-to-specific period (e.g., day-to-day), as well as with no peaks exceeding the propagation tray capacity within the propagation space, may be achieved by periodically determining a respective optimized Latest seed date/time 1503' output for each production line (Line ID 1501) using a seed schedule optimizer as described herein. Furthermore, these respective outputs 1503' are utilized as an input to update each production line's seed date/time in the indoor farm facility 300.

In various embodiments, given these inputs and constraints 1530, objective(s) 1548, and known desired variable to optimize (e.g., latest seed date/time 1503 to 1503'), the optimization engine 1540 may use any suitable optimization technique or metaheuristic (e.g., genetic algorithm) to generate optimal cadence offsets 1565 (e.g., latest seed date/time 1503' for each Line ID 1501). In implementing this objective 1548 using the seeding schedule optimizer, rules 1544 may also be input to the optimizer engine 1540 such as, for example, a rule 1544 to determine the number of required seeds per grow-out bench 702 (e.g., (# of floats 501 per bench 702)*(Crop Float Density)*(1+% of safety overseed), a rule 1544 to determine the total number of seeds required for this Crop based on the 1$^{st}$ rule (e.g., (rule #1 determined # of seeds per grow-out bench 702)*(# of grow benches 702)), a rule 1544 to determine the number of required propagation trays based on the 1$^{st}$ and 2$^{nd}$ rules (e.g., round up to the closest positive integer of (rule #2 determined total # of required seeds)/(Crop Seed Tray Density)), a rule 1544 to calculate per production line transplant cadence, seed cadence, and/or propagation cadence from inputs 1530, a rule 1544 to determine grow-out zone plot interval from Routing 1506 input and Positions per Line 1511 input and to round up as suitable for facility operations (e.g., to the nearest hour, shift, day, etc.), etc. In various embodiments, rule 1544 specifies that the number of seeds per bench is determined based on the number of floats per bench (e.g., 12), a float density that is determined by the number of plants 504 that can be transplanted per unit area on the float 501 (e.g., based on $d_3$ and $d_4$ of float 501), and an over seed safety factor (e.g., 5%) to account for plants that die in the germination step 204 and propagation step 206.

In various embodiments, optimization engine 1540 creates an optimal cadence offset 1565 for each production line (Line ID 1501) that includes an optimal seeding date/time 1503' for use in the seeding schedule to optimize the indoor farming process 200 to achieve desired objectives 1548 of the users of the indoor farming facility 300 such as, for example, objectives of decreased perishable product waste, reduced peak propagation tray population, reduced labor demands, and/or reduced variation in harvested plant supply as it applies to plant variety. In various embodiments, the seeding schedule utilized at seeding step 202 is modified, in part, by using each production line-specific (Line ID 1501) optimal seeding date/time output 1503' to update each production line's seed date/time (e.g., by overriding and replacing the latest seed date/time input 1503) in the seed schedule used by the indoor farm facility 300.

Figure 12A:
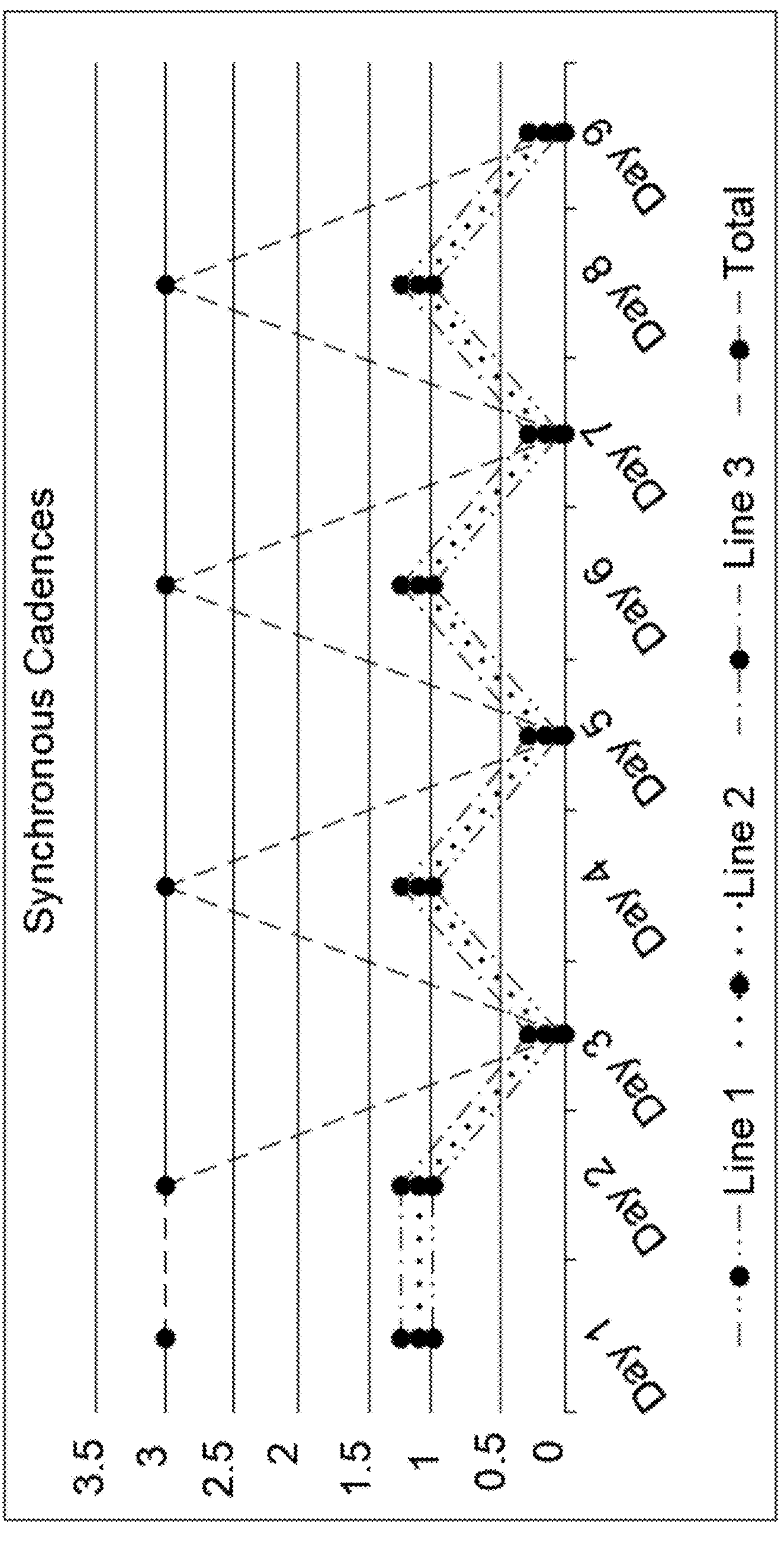
FIG. 12A is an illustration of an example of production line cadences without using a seeding schedule optimizer algorithm to achieve a smooth supply objective to/from the grow-out zone of various embodiments of the present disclosure.

As discussed above, the inventors have determined that, in multi-crop species, and facility constrained scenarios (such as the example described above)—where the different grow lanes 402 have distinct transplant cadences (and possibly distinct seed and/or propagation cadences)—and where a seed scheduling optimizer algorithm (e.g., FIGS. 15, 16) is not utilized to determine production line-specific optimal seeding date/time output 1503', this variation in cadences across the various production lines (Line IDs 1501) would often result in a synchronized super cadence (e.g., a synchronized sum of the respective production line cadences), such as in the example shown in FIG. 12A. As reflected in the FIG. 12A example, a synchronous super cadence across production lines means, for example, a higher number of grow-out zone benches 702 are added to each grow lane 402 on the same day (and approximately the same time), while, on other days, no grow-out zone benches 702 are added to any grow lane 402. As discussed above, this results in more inefficient use of the limited grow-out zone, germination zone, and propagation zone spaces (e.g., as specified in Facility Information inputs 1515), inefficient labor demand, difficulties forecasting supply needs, and exceeding capacity constraints 1513 in the propagation zone, grow-out zone, and/or germination zone.

Figure 12B:
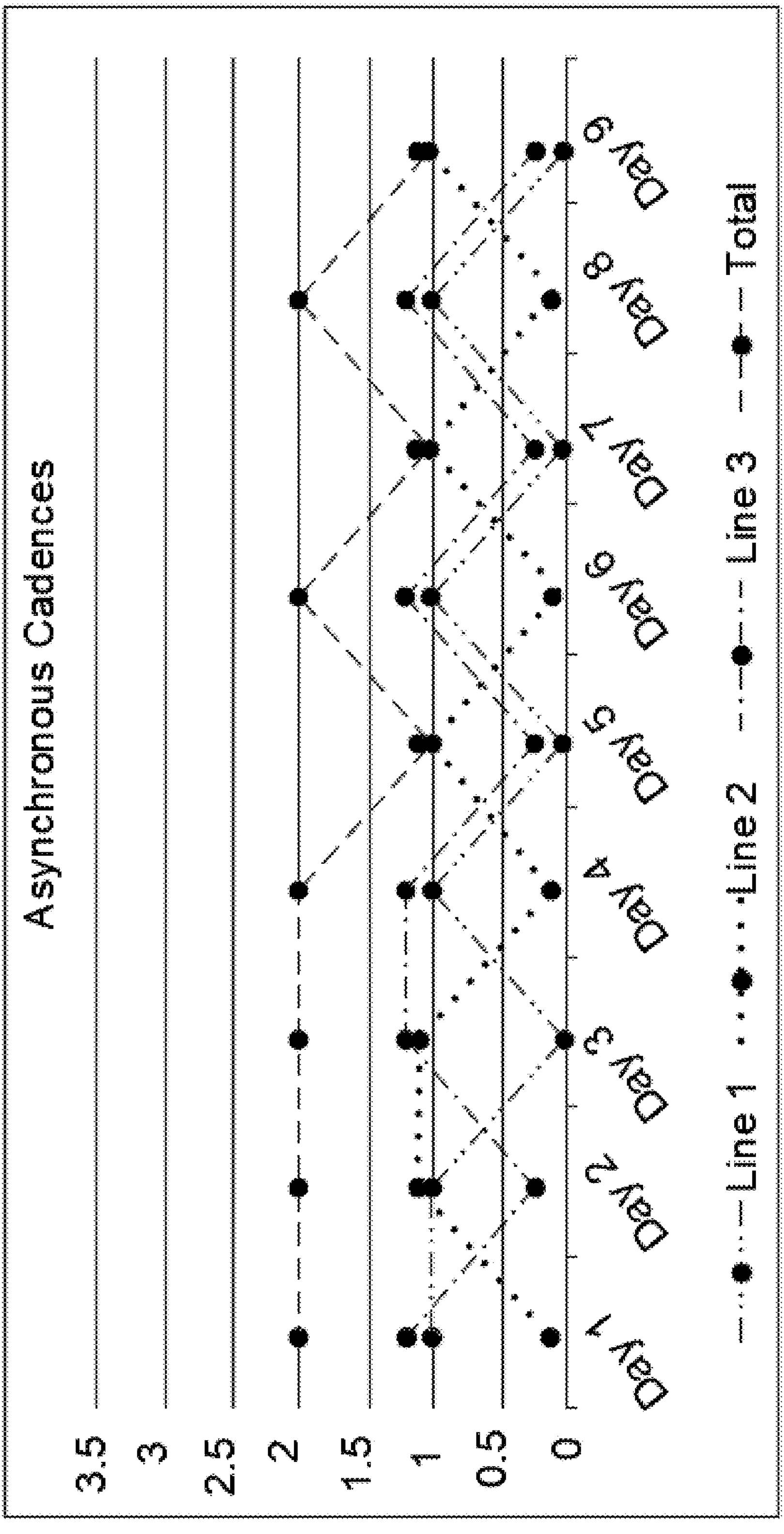
FIG. 12B is an illustration of an example of production line cadences when a seeding schedule optimizer algorithm is used to achieve a smooth supply objective to/from the grow-out zone of various embodiments of the present disclosure.

Referring now to FIG. 12B, the objective 1548 of having substantial smoothness in supply on a specific period-to-specific period (e.g., day-to-day) basis (e.g., a substantially similar amount of each crop type in production to be unloaded from the grow-out zone every day) is provided to optimization engine 1640, and the optimization engine 1640 outputs production line-specific (Line ID 1501) optimal seeding date/time outputs 1503' to update each production line's seed date/time and which, when implemented, increases the difference in synchronization between the production line cadences by the optimal cadence offset 1565 and results in a smoother super cadence a shown in FIG. 12B.

The difference in synchronization between two cadences (examples of which are shown in FIGS. 12A and 12B) may be referred to as a cadence offset. The simplified illustration in the examples in FIGS. 12A and 12B shows how introducing a determined optimized cadence offset 1565 (e.g., 1503') for each of an indoor farm facility's (100, 300) production lines (e.g., Line ID 1501) may achieve an objective 1548 of smoothing out farm operations by, for example, reducing the number of lines of growing plants that need to be transplanted and/or harvested at the same time, e.g., on the same day.

The inventors have identified that, by using a seed scheduling optimizer algorithm (e.g., 1500, 1600) to determine a respective optimal cadence offset (e.g., 1565) for each of an indoor farm facility's (e.g., 100, 300) production lines (e.g., Line ID 1501), and specifically implementing it by using a determined optimized Latest seed date/time (e.g., 1503') for each of these production lines (e.g., Line ID 1501), an objective 1548 of a optimally asynchronous super cadence, such that the variance is reduced significantly, may be achieved as shown in the contrast between the examples in FIG. 12A and FIG. 12B. The resulting super cadence shown in the example in FIG. 12B causes a reduced demand on the indoor farm facility's (e.g., 100, 300) operations on any given specific period (e.g., on any given day) (e.g., by having the total number of grow-out zone benches 702 being added into the grow-out zone be substantially similar on a specific period-to-specific period (e.g., day-to-day) basis, by having the total number of grow-out zone benches 702 being unloaded from the grow-out zone be substantially similar on a specific period-to-specific period (e.g., day-to-day) basis, by having the total number of propagation trays 500 in use be substantially similar on a specific period-to-specific period (e.g., day-to-day) basis, etc.) and increases the efficiency of the automated plant movement though the germination zone, grow-out zone, transplanter, harvester, and/or propagation zone. Thus, the limited space within the germination zone, grow-out zone, and/or propagation zone (as input in Facility Information 1515) is used more efficiently and bottlenecks in the germination zone, grow-out zone, propagation zone, transplanter, and harvester can be minimized.

Figure 16:
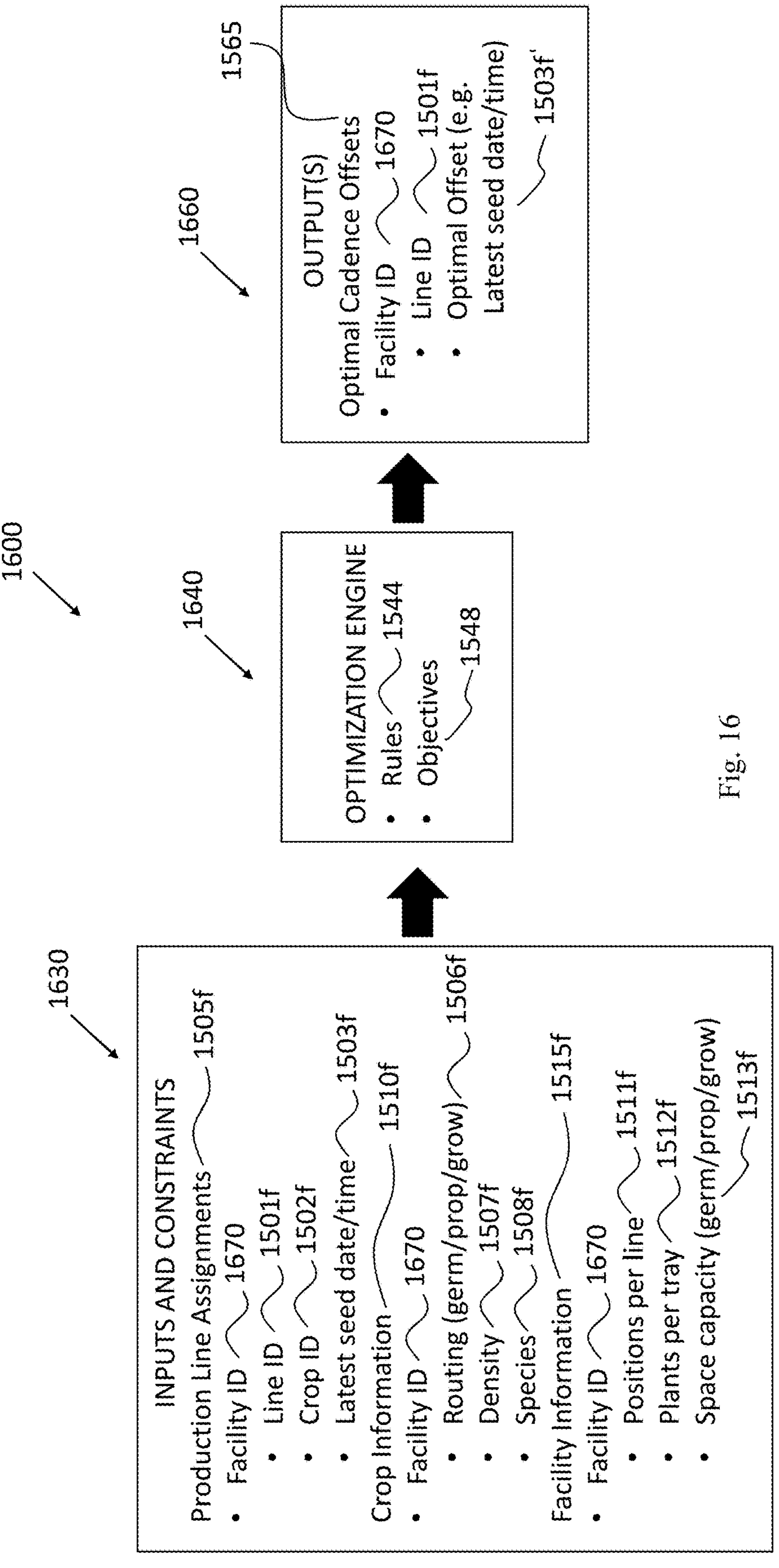
FIG. 16 is a flow chart showing an example of a seeding schedule optimization algorithm according to various embodiments of the present disclosure.

In various embodiments, and as shown in the example of FIG. 16, a user of a seed scheduling optimizer algorithm (e.g., 1600) may oversee a plurality of indoor farm facilities (e.g., 100, 300), each of which has its own Facility Information **1515*f*, Crop Information 1510*f*, Production Line Assignments 1505*f*, and the user may use the algorithm to achieve similar or varying objectives 1548 at each indoor farm facility (e.g., 100, 300). As shown in the FIG. 16 example, the user would provide facility-specific (e.g., labeled/tagged with respective Facility IDs 1670) inputs and constraints 1630 to the seed scheduling optimizer algorithm 1600 (e.g., facility-specific (e.g., labeled/tagged with respective Facility IDs 1670) Facility Information 1515*f* (e.g., Line ID 1501*f*, Crop ID 1502*f*, Latest seed date/time 1503*f*), Crop Information 1510*f* (e.g., Routing 1506*f*, Density 1507*f*, Species 1508*f*), Production Line Assignments 1515*f* (e.g., Positions per Line 1511*f*, Plants per tray/float/bench 1512*f*, Space capacity 1513*f*), etc.). And, in this example, the seed scheduling optimizer algorithm 1600 may output facility-specific (e.g., labeled/tagged with respective Facility IDs 1670) optimal cadence offsets 1565 for each respective production line of each respective facility (e.g., facility-specific latest seed/date time 1503*f*' for the respective Line IDs 1501*f* of each facility 1670). For example, at a first indoor farm facility (Facility ID 1670*a*), a user may seek to achieve an objective 1548 of having a substantially similar amount of each crop type (e.g., GFL, GBL, RFL, broccoli microgreens, etc.) (Crop ID in production lines (Line ID 1501*f*) to be transplanted into the grow-out zone every transplant day), and, at a second indoor farm facility (Facility ID 1670*b*), a user may seek to achieve an objective 1548 of having, for labor reasons, to harvest only certain crops (e.g., only GBL, GFL) on certain days and, on other days, harvest only different crops (e.g., only RFL, only microgreens). For the first indoor farm facility (Facility ID 1670*a*), the seed scheduling optimizer algorithm 1600 would provide a positive weighting factor to the facility-specific latest seed date/time 1503*f*' with the result being an asynchronous (smoother) super cadence similar to the example shown in FIG. 12B, while, for the second indoor farm facility (Facility ID 1670*b*), the seed scheduling optimizer algorithm 1600 would provide a negative weighting factor to the facility-specific latest seed date/time 1503*f*' with the result being a more synchronous (less smooth) super cadence similar to the example shown in FIG. 12A. In various embodiments, given these facility-specific inputs and constraints 1630, facility-specific objective(s) 1548, and known desired facility-specific variable to optimize (e.g., facility-specific Latest seed date/times 1503*f* to 1503*f*'), the optimization engine 1640 may use any suitable optimization technique or metaheuristic (e.g., genetic algorithm) to generate facility-specific optimal cadence offsets 1565 (e.g., facility-specific Latest seed date/times 1503*f*' for each Line ID 1501*f* in each facility 1670**).

FIG. 13B illustrates an example of an impact of a smoother super cadence (e.g., FIG. 12B) across multi-crop species production lines on propagation zone (e.g., 312) capacity of an indoor farm facility (100, 300) (with this objective 1548 obtained via a seed scheduling optimizing algorithm (e.g., 1500, 1600)). In contrast, FIG. 13A illustrates an example of an impact of an uneven super cadence (e.g., FIG. 12A) across multi-crop species production lines on propagation zone (e.g., 312) capacity of an indoor farm facility (100, 300) where each production line was seeded without using a seed scheduling optimizing algorithm (e.g., 1500, 1600). As reflected in FIGS. 13A and 13B, the use of a seed scheduling optimizing algorithm (e.g., 1500, 1600) in multi-crop species, facility-constrained scenarios, may optimize variation in propagation tray 500 population that, without such optimization, would cause the propagation tray 500 population to periodically exceed the capacity of the propagation zone 312 (which is provided, for example, in facility information inputs and constraints 1515 to the seed schedule optimization algorithm 1500 (1600)).

In various embodiments, the optimal cadence offsets (e.g., 1565) (e.g., latest seed date/time 1503' for each production line 1501) are generated by the seed schedule optimization algorithm (e.g., 1500, 1600) receiving inputs and constraints (e.g., 1530, 1630) specific to the multitude of plant varieties (e.g., 1510) and the physical constraints of, and production line assignments in, the indoor farm facility (e.g., 1505, 1515), and the optimization engine (e.g., 1540, 1640) applying a suitable optimization technique or metaheuristic (e.g., genetic algorithm) with rules 1544 and objectives 1548. In various embodiments, the optimal cadence offsets (e.g., 1565) (e.g., latest seed date/time 1503' for each production line 1501) are then used to implement an optimal seeding schedule for the seeding step 202. In some embodiments, based on the objective 1548, the generated offsets 1565 include positive weighting factors for smoothness. In some embodiments, based on the objective 1548, the generated offsets 1565 include negative weighting factors for smoothness. In various embodiments, the seed schedule optimization algorithm (e.g., 1500, 1600) is run each time there is a change to the inputs or constraints (e.g., 1730, 1830), the rules (e.g., 1744) or the objectives (e.g., 1748). In various embodiments, since the cadences are deterministic, once the seed schedule optimization algorithm is used to optimizes respective offsets for the various cadences, the seed schedule optimization algorithm does not need to be run there is no further need for running the algorithm unless the inputs or constraints (e.g., 1730, 1830), the rules (e.g., 1744), or the objectives (e.g., 1748) changes.

Figure 14:
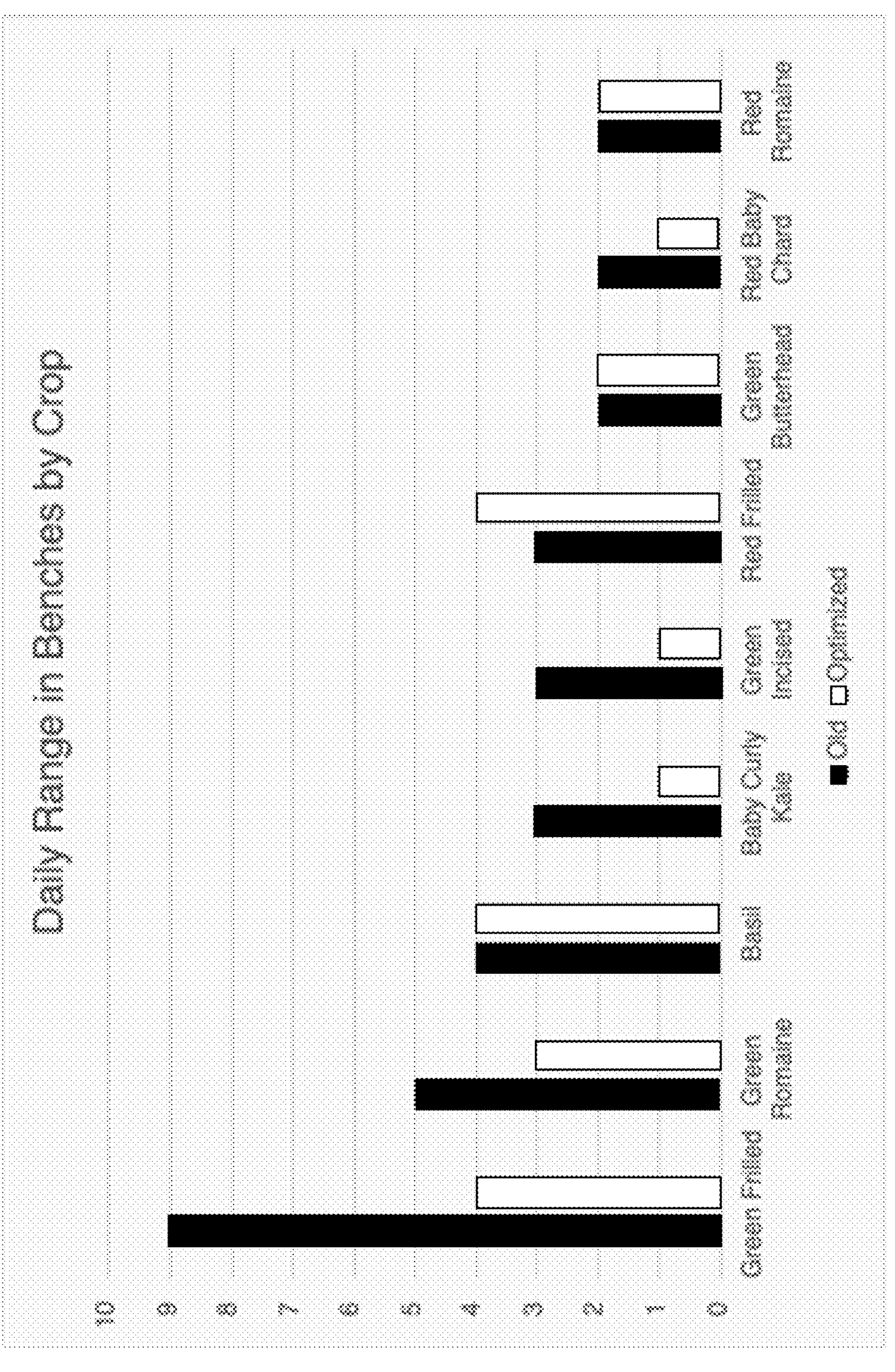
FIG. 14 is an illustration of an example of daily plant variety distribution when a seeding schedule optimizer algorithm is used to achieve a smooth supply objective to/from the grow-out zone according to various embodiments of the present disclosure.

In some embodiments, the computation speed and accuracy of the optimization engine (e.g., 1540, 1640) is increased by implementing the optimization technique or metaheuristic hierarchically. In various embodiments, the inputs and constraints (e.g., 1530, 1630) may include grouped plant variety information (e.g., 1510, **1510*f*) by routing time (e.g., 1506, 1506*f*), and then using the seeding schedule optimization algorithm (e.g., 1500, 1600) to generate plant variety group-specific optimal cadence offsets (e.g., 1565). Then, in various embodiments, the plant variety group-specific optimal cadence offsets (e.g., 1565) are then used as inputs to the seed schedule optimization algorithm (e.g., 1500, 1600), and optimized further. In some embodiments, an objective 1548 is to minimize the variation between grown/transplanted/harvested plant varieties, as shown in the example in FIG. 14 (showing "Optimized" Daily Range in Benches (e.g., 702) by Crop (e.g., Crop ID 1502**) compared to the "Old" Daily Range (with a larger daily variation between plant varieties shown)).

In various embodiments, once the seeding schedule optimization algorithm (e.g., 1500, 1600) outputs the optimal cadence offsets (e.g., 1565) (e.g., latest seed date/time 1503' for each production line 1501 of an indoor farm facility (100, 300)), the seeding schedule of the indoor farm facility (100, 300) is updated with the optimal cadence offsets (e.g., 1565) (e.g., latest seed date/time 1503' for each production line 1501 using transition optimizer rules 1544 with the objective 1548 of minimizing impact on the throughput of the indoor farming process (FIG. 2).

For example, pushing a latest seed date/time off by three (3) days for a given production line(s) (Line ID 1501) may delay the movement of transplanted plants into the associated grow lane(s) 402 in the grow-out zone by three (3) days for all of the benches 702 currently in the row(s) 402. In various embodiments, the transition optimizer rules 1544 may be created to achieve the objective 1548 of minimizing the impact of switching from the old seed schedule to the new one for a given production line(s) by, for example, rounding up or rounding down to minimize how long the associated grow lane(s) 402 should remain idle (e.g., without receiving transplanted plants).

In various embodiments, once the plants 504 exit their respective rows 402 (e.g., in a respectively optimized asynchronous cadence (e.g., FIG. 12B, 13B, 14)), the plants are harvested at step 212 such that the finished perishable products can be shipped at step 220. In various embodiments, the objective at this stage of indoor farm facility operations is to fulfill as many customer orders for finished perishable goods as possible, and as efficiently as possible, given the existing supply of harvested plants. The inventors have also developed improved methods and systems of storing, mixing, packing, and shipping to optimally allocate the raw perishable resources (e.g., respective harvested plants) for each ordered finished perishable product across multiple days using a pack out optimizer. The inventors have identified optimization techniques to allocate the harvested plants 504 by balancing objectives (e.g., 1748) of, for example, maximizing order fulfillment, minimizing plant expiration, minimizing the variance between cases packed across days, maximizing batching (e.g., the number of cases packed before packing a different finished perishable product/good), etc., by appropriately weighting various inputs (e.g., 1730) to, and/or weighting factors within rules (e.g., 1744) of, a pack-out optimization algorithm (e.g., 1700, 1800). In various embodiments, defined objectives (e.g., 1748) of a pack out optimization algorithm (e.g., 1700, 1800) are to minimize waste of harvested plants and to periodically optimize the storing, mixing, packing, and shipping processes to also fulfill customer orders for finished perishable goods in the most efficient way possible.

In various embodiments, the most important objective (e.g., 1748) may be to maximize order fulfillment (e.g., measured in ounces or revenue generated), and corresponding inputs (e.g., 1730) to, and/or weighting factors within rules (e.g., 1744) of, a pack-out optimization algorithm (e.g., 1700, 1800) may be weighted higher or lower. In some embodiments, each customer order forecasted and/or actually received (e.g., 1727, 1729) may have a respective priority (e.g., 1728) and non-priority component to it. In some embodiments, each customer, for instance, may be assigned their own priority multiplier (e.g., customer ID 1728) that determines how valuable a priority order is relative to a non-priority order or a priority order for another customer (e.g., customer ID 1728). For example, rules (e.g., 1744) of a pack-out optimization algorithm (e.g., 1700, 1800) may specify that, if the priority multiplier for a customer (e.g., ABC Company 1728) is 1.5, then each ounce of priority order fulfilled is worth 1.5 times a non-priority ounce. In some embodiments, rules (e.g., 1744) of a pack-out optimization algorithm (e.g., 1700, 1800) may specify that the number of priority orders (e.g., 1727, 1729) that may be associated with a customer identifier (ID) (e.g., 1728) in a specific amount of time (e.g., 1705) (e.g., a customer ID may have the number of priority orders restricted to a percent of their total order to be packed and shipped across multiple days, or a percent of all orders packed on a particular day). In some embodiments, a pack out optimization algorithm may include a rule(s) (e.g., 1744) to diminish the overall priority of a finished perishable product being packed based on the number of packages of that particular finished perishable product that has already been packed for the day (e.g., the first 10 finished products, A, that are packed have a coefficient of 3 and the next 10 finished products, A, have a coefficient of 2). The inventors have identified that using such a rule may achieve an objective (e.g., 1748) of encouraging variation in the finished perishable products that are packed to ensure fulfillment maximization of the plurality of customer orders.

In various embodiments, having an objective (e.g., 1748) of maximizing the ounces filled of finished perishable product orders causes the pack out optimizer algorithm (e.g., 1700, 1800) to search through various ways of allocating and mixing resources in steps 214 through 220. The inventors have identified that maximizing ounces filled of finished perishable product orders may also be achieved through periodic finished perishable good mix optimization (e.g., periodically optimizing which harvested plants to mix together to create a finished perishable product and at what optimum ratio) and the amount of order fulfillment over time.

The inventors have identified that, in scenarios in which an indoor farm facility (e.g., 100, 300) grows a plurality of distinct plant types to be used in fulfilling customer orders for a plurality of distinct types of finished perishable products, where multiple of these distinct finished perishable product types are a respective mix of two or more of the distinct plant types, where the distinct plant types have varying expiration times (e.g., respective plant perishability values), and where the distinct finished perishable product types have varying shelf lives (e.g., respective finished product perishability values), these and other objectives are not achievable in such facility without an optimized pack-out schedule and product mix percentage being periodically determined (e.g., without periodically (e.g., daily) determining optimized respective finished good mix percentages 1715', optimized customer orders being mixed and packed 1765, and/or optimized customer orders being shipped 1767).

Figure 17:
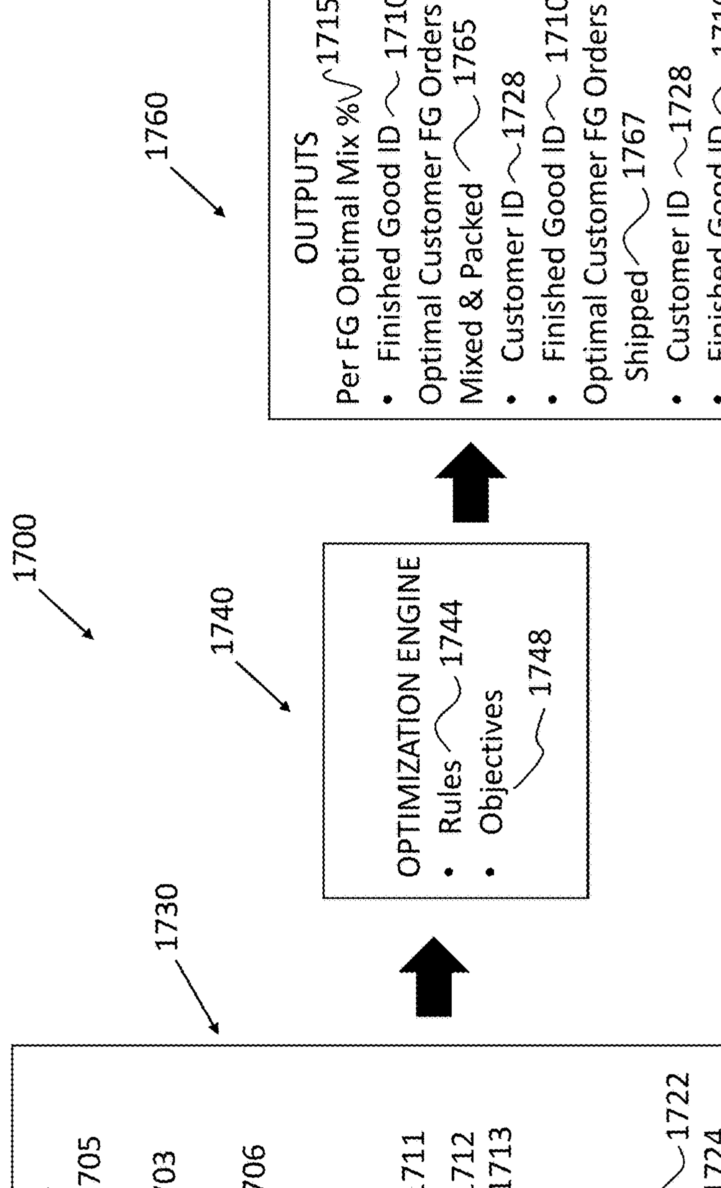
FIG. 17 is a flow chart showing an example of a pack out optimization algorithm according to various embodiments of the present disclosure.

Referring now to FIG. 17, a flow chart showing an example of a pack-out optimization algorithm 1700 according to various embodiments of the present disclosure is provided. In various embodiments, pack-out optimization algorithm 1700 may receive as an input 1730, for each of a plurality of plant types grown at the indoor farming facility (100, 300), a respective plant identifier (e.g., plant ID 1702) and a respective perishability value 1703 (e.g., the time between the plant's harvest and the plant's expiration (when it is no longer suitable to be used in a finished perishable product)). In various embodiments, pack-out optimization algorithm 1700 may receive as an input 1730, for each of a plurality of finished perishable product types 1710 made (from the grown, harvested plant types 1702) and packaged at, and shipped from, the indoor farming facility (100, 300), a respective finished perishable product identifier (e.g., finished good ID 1710), a respective finished product perishability value 1706 (e.g., the time between the finished product being packaged and the product's expiration (when it is no longer suitable to be sold to the consumer customer of the faming facility's customer)), for each of the finished perishable product types 1710, one or more respective package weights that the product is packed, shipped and sold to consumer customers of the faming facility's customers, and for each of the finished perishable product types 1710, a respective finished good specification 1708.

In various embodiments, the respective finished good specification 1708 input for each of the finished perishable product types 1710 includes respective identifiers of each the plants **1702*i* used to make the finished perishable product 1710. In various embodiments, each finished perishable good's specification 1708 input includes a latest mix percentage 1715 (e.g., identifying the latest ratio of the various plant 1702*i* ingredients in the product). In various embodiments, the respective finished good specification 1708 input for each finished perishable product type 1710 includes a respective upper bound percentage 1711 in the mix for each of the plant 1702*i* ingredients in the product and a respective lower bound percentage 1712 in the mix for each of the plant 1702*i* ingredients in the product. In some embodiments, the respective finished good specification 1708 input for each finished perishable product type 1710 includes a respective preferred mix percentage 1713 (e.g., specifying a preferred ratio of the various plant 1702*i* ingredients in the product). In various embodiments, the respective finished good specification 1708 input for each finished perishable product type 1710 includes a respective micro mix flag (e.g., a 1 or 0) which indicates whether the particular product type 1710** includes (e.g., "1") or does not include (e.g., "0") one or more micro-greens in the respective mix.

In various embodiments, users of indoor farm facility (100, 300) (e.g., planners and growers) may periodically determine, on a plant-by-plant **1702*i* and time-period 1705 specific (e.g., day-by-day) basis, the forecasted inventory 1722 of plants (e.g., types 1702 and quantity) that will be harvested during such specific time period and which may be provided to a pack-out optimizer algorithm (e.g., 1700) as a supply 1720 input for the period 1705. In various embodiments, users of indoor farm facility (100, 300) (e.g., operators) may periodically provide, on a plant-by-plant 1702*i* and time-period 1705 specific (e.g., day-by-day) basis, the actual inventory of plants 1724 (e.g., types 1702 and quantity) that have been harvested during/for such specific time period and which may be provided to a pack-out optimizer algorithm (e.g., 1700) as a supply 1720 input for the period 1705. In various embodiments, the per plant actual inventory input 1724 may be used, in the pack-out optimizer algorithm (e.g., 1700), to correct the per plant forecasted inventory 1722** input.

In various embodiments, users of indoor farm facility (100, 300) (e.g., planners, growers, product managers) may periodically provide, on a finished good-by-finished good **1710*i*, package weight 1709*i*, and time-period 1705 specific (e.g., requested fulfillment day window) basis, the forecasted orders 1727 of finished perishable products (e.g., types 1710*i*, weight 1709*i*, customer identifier 1728) that will be ordered and requested to be fulfilled during a time period 1705 as a demand 1725 input to the pack-out optimizer algorithm (e.g., 1700). In various embodiments, users of indoor farm facility (100, 300) (e.g., planners, growers, product managers) may periodically provide, on a finished good-by-finished good 1710*i*, package weight 1709*i*, and time-period 1705 specific (e.g., requested fulfillment day window) basis, the actual orders 1729 of finished perishable products (e.g., types 1710*i*, weight 1709*i*, customer identifier 1728) that will be ordered and requested to be fulfilled during a time period 1705 as a demand 1725 input to the pack-out optimizer algorithm (e.g., 1700). In various embodiments, the per finished product actual demand input 1729** may be used, in the pack-out optimizer algorithm (e.g.,

1700), to correct the per finished product forecasted demand input 1727. In various embodiments, and as explained in more detail below, the pack-out optimizer algorithm (e.g., 1700) may receive customer identifiers, each of which may have one or more respective priority weight factors, 1728 as an input.

In various embodiments, an output of the pack-out optimization algorithm 1700 is, for each finished perishable product type 1710 that is to be mixed and packed, and/or shipped, during a specific time period 1705 (e.g., a day), a respective optimal mix percentage 1715' that is used to update the allocation of harvested plants (e.g., at steps 216 and 218) for each of the finished perishable product types 1710 being mixed and packed during that time period 1705 (e.g., by overriding and replacing the latest finished good mix percentage input 1715) in the operations schedule used by the indoor farm facility (100, 300). In various embodiments, an output of the pack-out optimization algorithm 1700 is, on a specific time period 1705 basis (e.g., daily), a specification of the optimal customer finished perishable good orders to be mixed and packed in that period (e.g., on that day), and where that specification identifies the respective customers (e.g., by customer ID 1728), respective finished perishable good type identifiers (e.g., 1710), respective quantity and respective package weights 1709 for each finished perishable good type to be mixed and packed. In various embodiments, an output of the pack-out optimization algorithm 1700 is, on a specific time period 1705 basis (e.g., daily), a specification of the optimal customer finished perishable good orders to be shipped in that period (e.g., on that day), and where that specification identifies the respective customers (e.g., by customer ID 1728), respective finished perishable good type identifiers (e.g., 1710), respective quantity and respective package weights 1709 for each finished perishable good type to be shipped.

In various embodiments, given these inputs and constraints 1730, objective(s) 1748, rules 1744, and known desired variable(s) to optimize (e.g., Latest, per finished good, mix percentage 1715 to 1715', customer finished perishable good orders to be mixed and packed 1765 during the specific time period 1705, customer finished perishable good orders to be shipped 1767 during the specific time period 1705, etc.), the optimization engine 1740 may use any suitable optimization technique (e.g., mixed integer programming engine, simplex interior point method, etc.) to generate these optimized outputs 1760.

Figure 18:
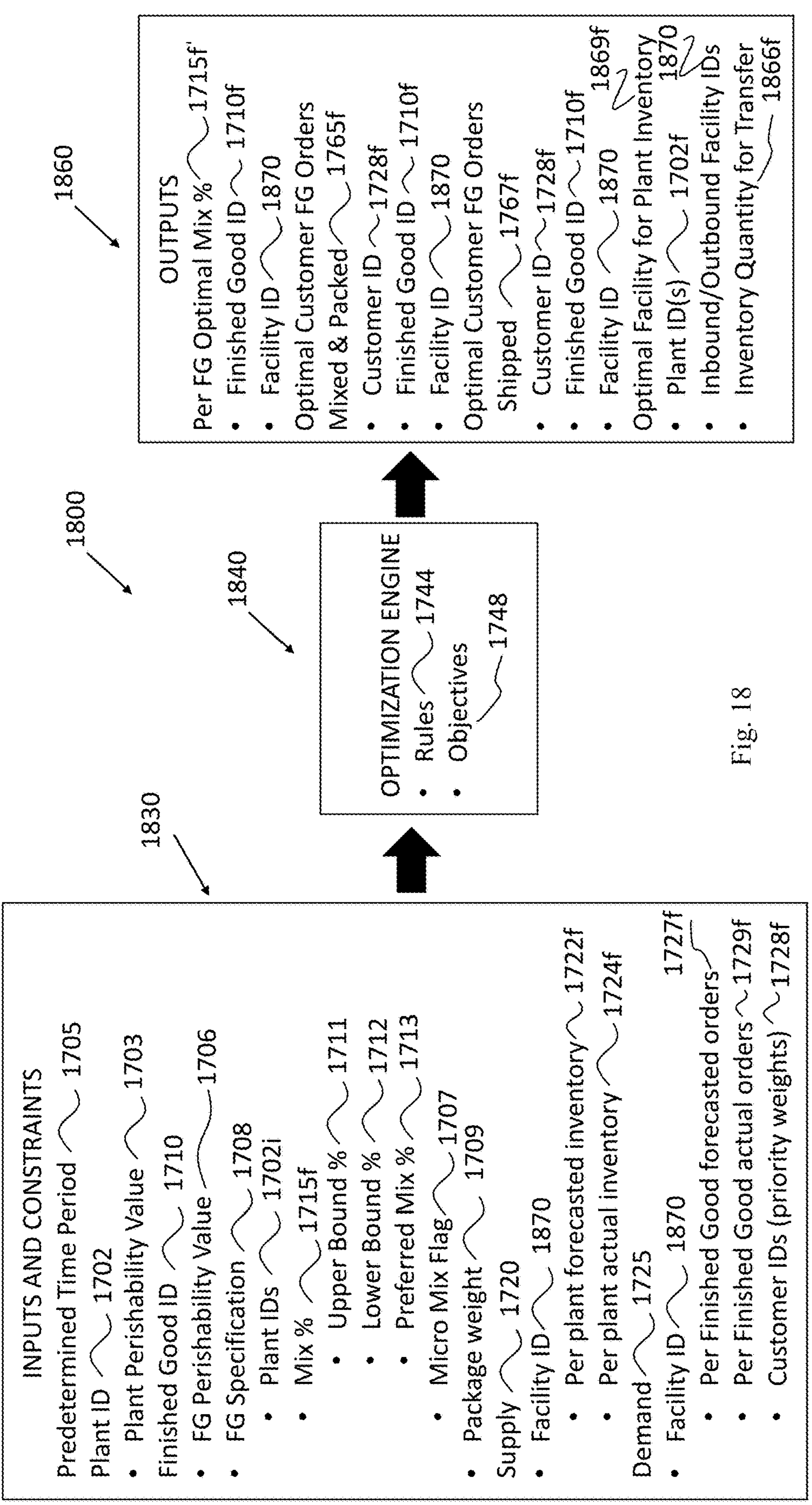
FIG. 18 is a flow chart showing an example of a pack out optimization algorithm according to various embodiments of the present disclosure.

In various embodiments, and as shown in the example of FIG. 18, a user of a pack-out optimizer algorithm (e.g., 1800) may oversee a plurality of indoor farm facilities (e.g., 100, 300), each of which may have its (as differentiated with respective facility identifiers 1870) own respective supply 1720 inputs, and/or demand 1725 inputs to the pack-out optimizer algorithm, For example, a first indoor farm facility (e.g., 1870*a*) may be assigned to grow different plant types 1702, or may have a superior mixing zone and packing zone 334 operators, or may have a more convenient shipping location to ship particular finished products to particular customers, than other indoor farm facilities (e.g., 1870*b*, . . . 1870*n*). In various embodiments, a pack-out optimizer algorithm (e.g., 1800) may utilize each facility's (e.g., 1870) respective supply inventory (e.g., 1722*f*, 1724*f*), and/or each facility's (e.g., 1870) respective finished perishable product orders, in determining outputs 1860 such as, for example, facility-specific, finished perishable product-specific optimal mix percentages 1715*f*', each optimal facility (1870) to respectively mix and pack the respective optimal customer finished perishable good orders 1765*f* in that period (e.g., on that day), each optimal facility (1870) to respectively ship the respective optimal customer finished perishable good orders 1767*f* in that period (e.g., on that day), and/or each optimal facility to respectively store optimal plant inventory 1869*f* of the overall inventory of the facilities (and which specifies the respective plant IDs 1720*f*, the respective inventory quantity of each such plants to be transferred between facilities 1866*f*, and the respective inbound facility ID 1870 and outbound facility ID 1870 for each such transfer).

For example, when a first indoor farm facility (e.g., 1870*a*) harvests a certain quantity of GFL, the pack-out optimizer algorithm 1800 outputs may include a first optimal quantity of GFL inventory to be mixed/packed at this first facility (e.g., 1870*a*) and a second optimal quantity 1866*f* of the GFL inventory to be transferred to a second indoor farm facility (e.g., 1870*b*) to be mixed/packed at this second facility (e.g., 1870*b*). Additionally, for example, when a first indoor farm facility (e.g., 1870*a*) mixes and packs a certain quantity of Salad Mix A of finished perishable products, the pack-out optimizer algorithm 1800 outputs may include a first optimal quantity of such finished products to be shipped 1767*f* to corresponding customers 1728*f* from this first facility (e.g., 1870*a*) and a second optimal quantity 1866*f* of such finished products to be transferred to a second indoor farm facility (e.g., 1870*b*) to be shipped 1767*f* to corresponding customers 1728*f* from this second facility (e.g., 1870*b*).

In various embodiments, for a multi-facility use of a pack-out optimizer algorithm 1800, the optimization engine 1840 may receive additional rules 1744*f* and/or objectives 1748. For example, rules 1744 may include a rule that, before harvested plant (e.g., WIP) may be harvested at one indoor farm facility (1870*a*) and mixed/packed at another indoor farm facility (1870*b*), this quantity of harvested plant (e.g., WIP) inventory must be transferred to the another indoor farm facility (1870*b*). In some embodiments, rules 1744 may include, for example, a rule that, before finished perishable products may be packed at one indoor farm facility (1870*a*) and shipped from another indoor farm facility (1870*b*), this quantity of finished perishable products must be transferred to the another indoor farm facility (1870*b*). In some embodiments, rules 1744 may include, for example, a rule that limits the amount of particular plant 1702*i* inventory, and/or the amount of particular finished perishable goods 1710*i*, that may be transferred per day (e.g., based on truck size, and availability). In various embodiments, rules 1744 may include, for example, a rule that restricts a particular plant 1702*i*, or a particular finished good 1710*i*, from being transferred from one facility to another (e.g., where a user of the pack-out optimizer algorithm 1800 (e.g., a planner) decides that all harvested basil must remain at one indoor farm facility (e.g., 1870*a*), or that all orders for a certain customer must be shipped to them from one indoor farm facility (e.g., 1870*a*), etc.). In various embodiments, rules 1744 may include, for example, rules that assign weighting factors such that finished goods are preferably transferred before harvested plants.

In some embodiments, a pack out optimizer algorithm (e.g., 1700) determines resource (e.g., plant 1702*i*) allocation based, in part, on an objective 1748 of, and/or rules 1744 for, minimizing the amount of resources that are wasted through expiration (e.g., beyond their plant perishability value 1703). The inventors have identified that a harvested plant typically becomes expired for several reasons. For example, there is not enough demand at the right time for that the harvested plant or there is an imbalance of one plant variety such that an amount is left over after mixing the various plant varieties together to create the finished product. The inventors have also identified that an objective 1748 of maximizing ounces filled is highly correlated with an objective 1748 of minimizing expired plants, however, they also determined that explicitly constraining a pack out optimizer (e.g., 1800) to minimize plant expiration as an objective 1748 increases efficiency in the event that two (2) resource allocation plans have the same order fulfillment rate but different plant expiration rates (e.g., 1703). For example, if the specification 1708 for a finished mixed perishable product type 1710 identified that it included a mix of plant variety A and plant variety B (1702), but most of the harvested plant variety A is older than B at a particular point in time, in various embodiments, a user can decrease plant expiration by making the mix percentage 1715 for this finished mixed perishable product type 1710 have, at this particular point in time 1705, more of plant variety A, within an allowable ratio threshold (1711, 1712) for the associated finished product 1710 and/or within respective high allowable fractional amounts 1711, and respective low allowable fractional amounts 1712, for each plant variety 1702 identified in the finished mixed perishable product type specification 1708 (as discussed below).

The inventors have identified that labor constraints are also a major problem in the indoor farming process at steps 210 through 220 and, for example, that it is generally impractical to attempt to design a process where a user packs four thousand (4,000) cases of finished product one subset time period of a specific time window (e.g., one day) and two thousand (2,000) finished product cases the next subset time period of the specific time window (e.g., the next day). Typically, the most efficient and cost effective method would pack three thousand (3,000) finished product cases on both packing subset time periods (e.g., both packing days). To accomplish this, in some embodiments, the pack out optimizer is constrained (e.g., with objectives 1748 and/or rules 1744) to consider the largest pack out subset time period (e.g., pack out day) and the smallest pack out subset time period (e.g., pack out day) and minimize the difference between these two. The inventors have identified that this constraint encourages reducing the largest pack subset time period (e.g., largest pack day) and increasing the smallest pack subset time period (e.g., smallest pack day). In some embodiments, the constraint is based on a weight differential specified in one or more rules 1744.

The inventors have also identified that it takes time for packing machinery to change from packing one finished product 1710*a* to another finished product 1710*b* (e.g., changing labels in the machine, adjusting the machines for new package sizes, etc.), and the inventors have determined that this changeover produces inefficiencies, and increases cost, due to workers and machinery being idle during this time. Therefore, in some embodiments, the pack out optimizer algorithm is constrained (e.g., with objectives 1748 and/or rules 1744) to minimize the number of changeovers. In various embodiments, this constraint may be achieved by using rules 1744 to batch or consolidate when respective finished perishable products are packed. For example, an output 1765 of pack out optimizer algorithm (e.g., 1700) may be, when constrained by rules 1744 to achieve this objective 1748, that all of finished perishable product A may be packed on day 1, and then all of finished perishable product B may be packed on day 2, etc. In various embodiments, this constraint (e.g., implemented with objectives 1748 and/or rules 1744) allows orders to be filled timely while minimizing changeovers. In some embodiments, a fixed cost is assigned (with rules 1744) to packing a finished perishable good once per day to cause the pack out optimizer algorithm (e.g., 1700) to achieve the objective 1748 of consolidating packing of the same finished perishable good in one day rather than in two days in order to minimize the total fixed cost. In various embodiments, rules 1744 are included in the pack out optimizer algorithm (e.g., 1700) to achieve the objective 1748 of maximizing a consolidation benefit.

In various embodiments, the pack out optimizer algorithm receives, in part, customer order inputs (1727, 1729) on a computer server that stores the information for reference. Customer orders may include actual 1729 and/or forecasted 1727 orders. In various embodiments, actual orders 1729 are orders that are received from real customers and forecasted orders 1727 are algorithmically determined such as, for example, based on past order histories and sales data. In some embodiments, forecasted demand 1727 is used as an input to the pack out optimizer algorithm. In some embodiments, the actual demand 1729 is used as an input for a first specific (e.g., predetermined) number of days from the current date (1705) and the forecasted demand 1727 is used for a second number of specific days (1705). In various embodiments, the number of orders forecasted 1727 is updated based on the actual orders 1729 (e.g., if the forecast is 100 cases on day 3 and actual orders are 80 cases on day 3, the forecast is reduced to 20 cases)—the assumption is the forecast is correct, but not all the orders have been received yet.

In various embodiments, each order (1727, 1729) may have some or all of the following data fields: a Requested Delivery Date, a Customer ID 1728 (e.g., actual orders may each include a respective customer ID of the respective actual customer (e.g., "The ABC Company"), forecasted orders 1727 may each have a respective generated forecast customer ID such as, for example, "ABC Forecast"), one or more finished good IDs 1710 that each correspond to a respective inventory item for a particular finished perishable good type and size/weight 1709 (e.g. Salad Mix 'A' 4 oz. finished and packaged product); and/or an Order Quantity that corresponds to, for example, the total amount of finished perishable good packages ordered, or a respective amount of respective finished perishable good packages of the one or more identified finished perishable good types, and may be adjusted (via rules 1744) by a pack loss amount that may vary based on plant variety 1702 and harvest facility 1860.

Furthermore, in various embodiments, each respective unique finished perishable good type 1710 and size/weight 1709 identifier (e.g., finished good ID) may include, or be associated with, a respective perishability value 1706 such as a respective best by offset value, which each may represent the respective number of days that may pass after the respective finished perishable good is packaged and before the respective packaged finished perishable good expires, and/or a respective minimum shelf life requirement (e.g., a particular customer may require that the packaged finished perishable products be delivered at least x days prior to an expiration date of the respective packaged finished perishable good). In some embodiments, each respective unique finished perishable good type 1710 and size/weight 1709 identifier (e.g., finished good ID) may include, or be associated with, a respective case weight. In various embodiments, each finished perishable good type 1710 may have a respective finished perishable good type specification 1708 which may be received and stored, and each of which may respectively identify, for example, a respective unique finished perishable good type 1710 and size/weight 1709 identifier (e.g., finished good ID), a respective unique finished perishable good type identifier (e.g., Mix ID) 1710, at least one respective plant type of the plurality of plant types 1702*i* and that identifies the respective underlying plant types included in the finished perishable good type, a respective lower fractional amount 1712, and a respective higher fractional amount 1711, of each of the respective underlying plant types included in the finished perishable good type, and/or a respective preferred ratio 1713 between the respective fractional amounts of each of the respective underlying plant types included in the finished perishable good type.

In some embodiments, each finished good ID (1710 and 1709) may be identified in a respective finished perishable good type specification 1708. In various embodiments, each finished good ID (1710 and 1709) may also correspond to, or be associated with, a unique finished perishable good type identifier (e.g., Mix ID) 1710. Each Mix ID (e.g., Salad Mix ‘C’) 1710 may correspond to, among other things, various works in progress (WIP) item IDs 1702*i*, each of which may correspond to a respective plant variety contained in the finished perishable product, a respective lower bound 1712 that determines the lowest acceptable fraction of the relevant WIP item ID that goes into the finished perishable product, a respective preferred mix ratio 1713 that determines the preferred fraction for each of the relevant WIP item IDs 1702*i* that goes into this finished perishable product, a respective upper bound 1711 that determines the highest acceptable fraction of the relevant WIP that goes into this finished perishable product, a respective minimum varietal count that determines the minimum number of distinct plant varieties 1702 that must go into the finished perishable product, and/or a respective true/false flag 1707 indicating whether the finished perishable product includes microgreens (e.g., is a micro mix) or does not include microgreens (e.g., is a non-micro mix). In some embodiments, the finished perishable good type includes a single plant type 1702, the identified lower bound 1712 is 100%, the identified upper bound 1711 is 100%, and/or the identified preferred mix ratio 1713 is 1.

In various embodiments, using the ratio bounds (1711, 1712) associated with each unique finished perishable good type identifier (e.g., Mix ID) (1710) for the finished perishable good types including two or more of a plurality of plant types 1702*i*, the pack out optimizer (e.g., 1700) may optimize the amount of each harvested plant (respectively stored or not stored) assigned to a plant variety mixture 1715'. There are an infinite number of potential amounts of a plant variety that could be assigned with the upper 1711 and lower 1712 bound, however, in various embodiments, the pack out optimizer algorithm limits the number of potential plant variety amounts to a specific number that is periodically determined and prior to mixing. In various embodiments, the pack out optimizer algorithm determines the specific ratio 1715' that most efficiently allocates the harvested plants prior to mixing. In some embodiments, the pack out optimizer performs the same functionality for the micro mix ratios.

In various embodiments, the pack out optimizer algorithm (e.g., 1700, 1800) also receives, in part, the supply or starting inventory of harvested plant varieties as inputs 1720. In various embodiments, the supply inputs 1720 are determined based on forecasted data 1722 and/or actual data 1724 received and stored in the server system to track the status of each plant 504 during the indoor farming process, which may include, for example: a Harvest Date that may correspond to the date the respective plant was harvested by a harvest device (e.g., FIG. 2, step 212); a WIP item ID 1702 which may correspond to a plant variety such as, for example, green frill leaf lettuce (“GFL”); and a Saleable Ounce 1709 which may correspond to the total weight reduced by a pack loss weight that depends on the plant variety 1702 and the harvest facility 1860. In various embodiments, each WIP item ID 1702 may identify, or be associated with, a respective perishability value for the respective plant type 1703 (e.g., finish by offset, pack by offset, etc.) which may represent the respective time period (e.g., number of days) that are allowed to pass after the respective plant has been harvested and before the respective harvested plant must be packed/finished in a finished perishable good (e.g., FIG. 2, step 218).

Figure 19:
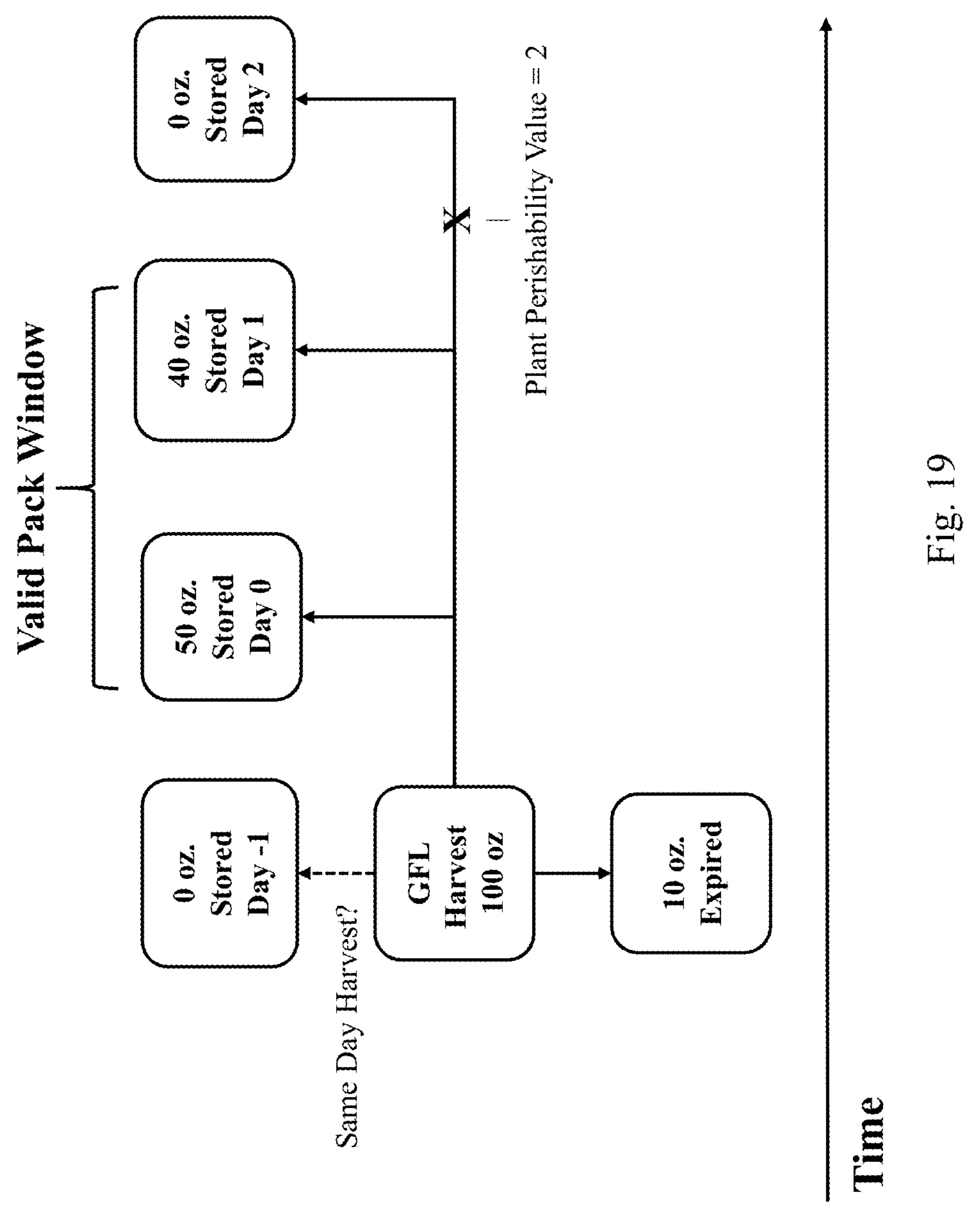
FIG. 19 is an illustration of an example of a portion of a pack out flow diagram according to various embodiments of the present disclosure.
Figure 20:
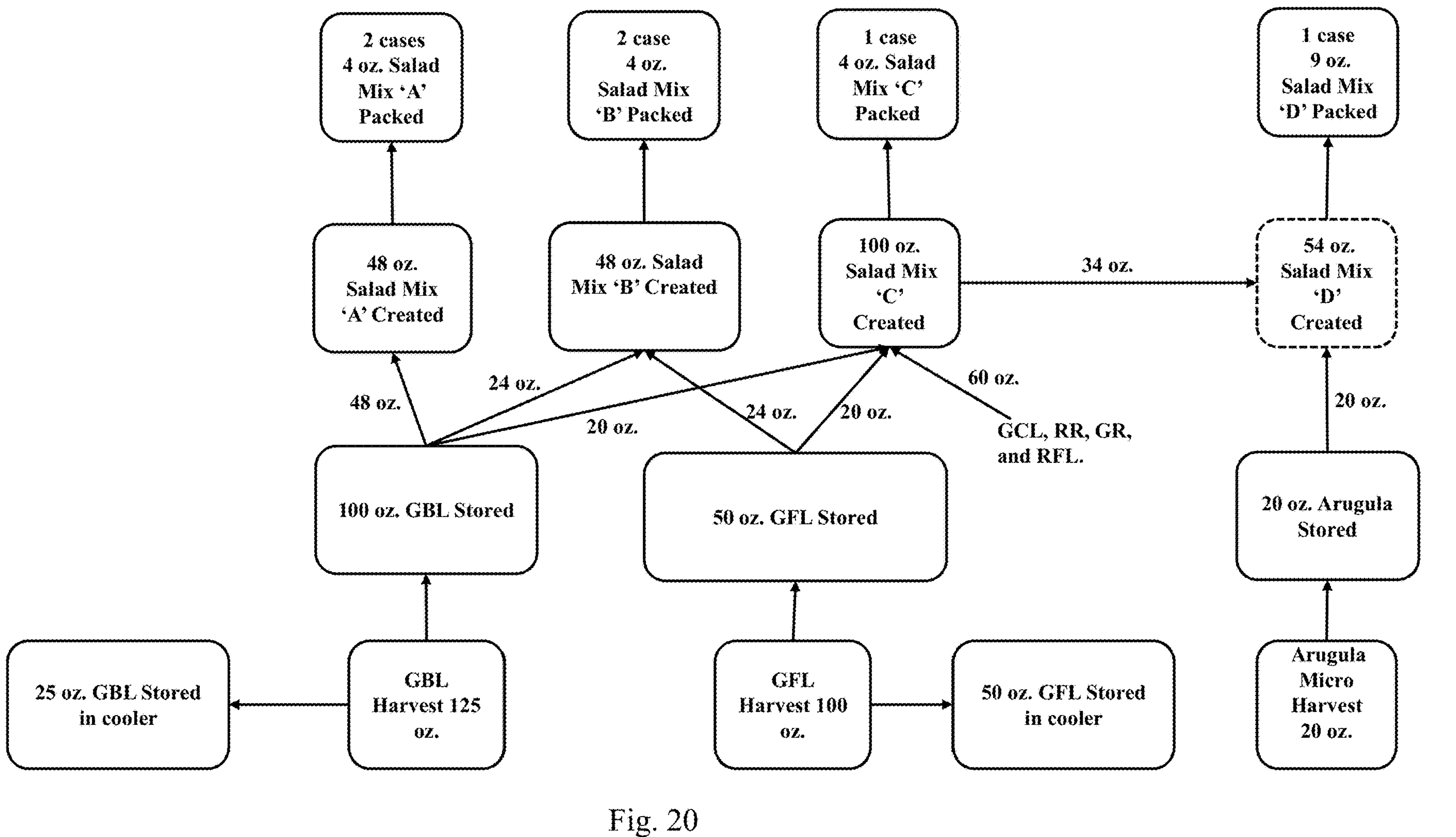
FIG. 20 is an illustration of further portions of the example of a pack out flow diagram according to various embodiments of the present disclosure.
Figure 21:
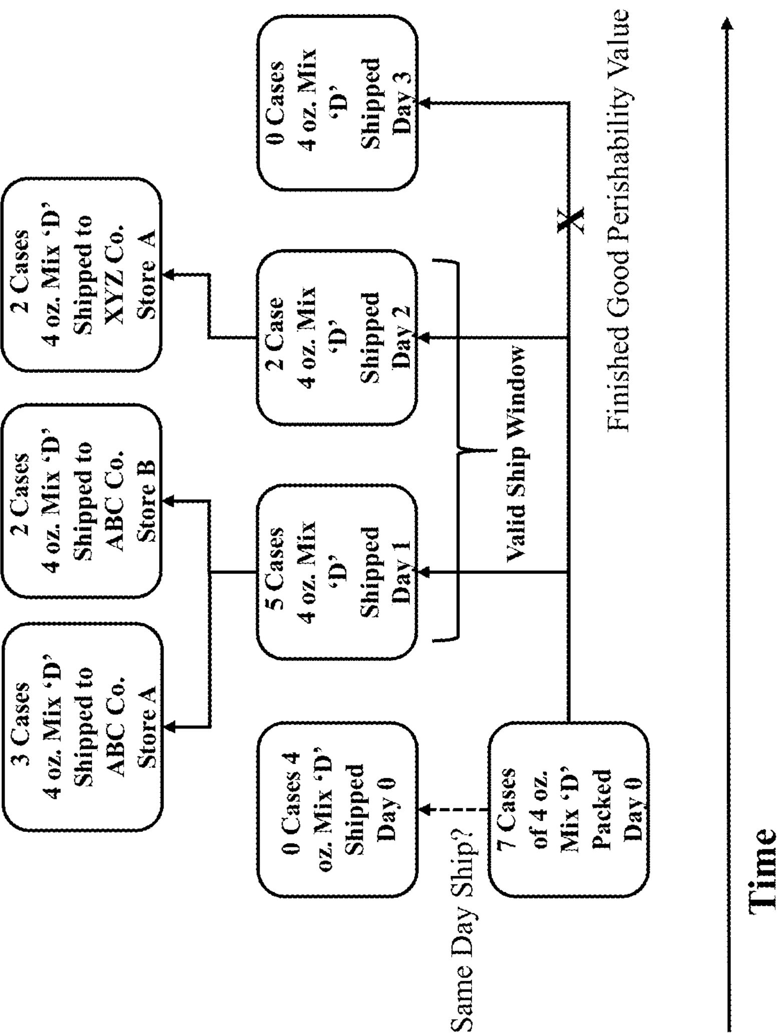
FIG. 21 is an illustration of an example of further portions of a pack out flow diagram according to various embodiments of the present disclosure.

In FIGS. 19-21, various embodiments of a storing, mixing, packing, and shipping indoor farming process as modified by the pack out optimizer algorithm (e.g., 1700, 1800) are illustrated. In FIG. 19, various embodiments of the storing process (e.g., FIG. 2, step 214) are shown. In the illustrated example of FIG. 19, 100 oz. of a plant variety with a WIP item ID 1702 of GFL has been harvested on the harvest date by a harvest device (e.g., FIG. 2, step 212). In the illustrated example of FIG. 19, the GFL WIP item ID 1702 has a pack by offset 1703 of 2 days. In the illustrated example of FIG. 19, the harvest date is identified by “Day ‘−1’” and entirety of the harvested GFL plants can be packed (e.g., FIG. 2, step 218), in respective finished perishable good packages of one or more perishable good types, on Days ‘0’ or ‘1,’ but not Day 2, since that date is past the Pack By Offset 1703 for this particular plant type (GFL) 1702 (for which such constraints may be included in rules 1744). In some embodiments, as illustrated in the example of FIG. 19, the respective harvested plant variety (e.g., harvested GFL) 1702 may be packed on the Harvest Date, if same day harvest is set to be allowed (for which such constraints may be included in rules 1744). In various embodiments, the pack out optimizer algorithm may be set (via rules 1744) so that none of the respective plant perishability values 1703 are exceeded for each of the harvested plants 1702 (e.g., respectively allocates 0 oz. for each WIP item ID to be packed in a finished perishable good package outside the valid window as any harvested plants not allocated within the valid pack window would be considered expired).

In FIG. 20, various embodiments of the mixing and packing process at steps 216 and 218, respectively, are shown. In this illustrated example, 125 oz. of Green Butter Lettuce (“GBL”), in addition to 100 oz. of GFL, has been harvested. In various embodiments, and as described above, the pack out optimizer (e.g., 1700, 1800) may determine how much of each harvested plant variety 1702 to respectively allocate to a respective harvested plant storage bin, how much to respectively allocate to be same day mixed and/or packaged for one or more finished perishable good types 1710, how much to respectively allocate to a cooler to be stored for mixing and/or packing on later days for one or more finished perishable goods 1710. In the illustrated example, 100 oz. of GBL (of the harvested 125 oz of GBL) and 50 oz. of GFL (of the harvested 100 oz of GBL) is respectively allocated to be temporarily stored (e.g., placed in respective harvested plant bins) for use in mixing and then packing of three finished mixed perishable products on the current day. In the illustrated example, the respective appropriate amounts of each plant variety 1702 that are respectively allocated for mixing and/or packing on later days for one or more finished perishable goods 1710 (e.g., 25 oz of GBL of 125 oz of harvested GBL, 50 oz of GFL of 100 oz of harvested GFL) are respectively placed in their assigned cooler (e.g., in zone 336).

In various embodiments, on this harvest date, for each of the finished mixed perishable good types 1710 specified in a received and stored plurality of orders (1727, 1729), the pack out optimizer algorithm may determine a respective optimal fractional amount 1715' of each of the respective two or more identified plant types in each finished mixed perishable good type specification 1708. In various embodiments, each respective determined optimal plant fractional amount 1715' is between the respective identified lower fractional amount 1712 and the respective identified higher fractional amount 1711 in each finished mixed perishable good type specification 1708. In various embodiments, the determined respective optimal fractional amount of each of the respective two or more identified plant types 1715' is different than the respective preferred mix ratio 1713 identified in each finished mixed perishable good type specification 1708. In the illustrated example, the pack out optimizer algorithm allocates respective subset amounts of GFL (of the 50 oz. of GFL allocated to the GFL harvested plant bin) and respective subset amounts of GBL (of the 100 oz. of GBL allocated to the GBL harvested plant bin) to be respectively mixed (e.g., in respective mixed perishable good bins) for each of a plurality of finished mixed perishable good types 1710 in a received and stored plurality of orders (e.g., Salad Mix 'A', Salad Mix 'B', and Salad Mix 'C') 1765. In the illustrated example, the Salad Mix 'C' product 1710 also requires Green Crisp Lettuce, Red Romaine, Green Romaine, and Red Leaf Lettuce. In the illustrated example, each of the mixes for subsequently packaging a determined optimal number 1765 of these finished mixed perishable good types in a received and stored plurality of orders is created by placing the allocated respective subset amounts in respective mixing bins based on Mix IDs, as described previously, such that the respective ratio of the various plant varieties 1715' for each of the finished mixed perishable good types 1710 (which, as described herein, may be periodically determined, including just prior to performing the mixing) is respectively optimized 1715' between the respective identified upper bounds 1711 and the respective identified lower bounds 1712.

In the example shown in FIG. 20, from the 100 oz of allocated GBL temporarily stored in a harvested GBL plant bin, 48 oz. is allocated to the Salad Mix 'A', 24 oz. is allocated to the Salad Mix 'B', and 20 oz. is allocated to Salad Mix 'C'. In this illustrative example, from the 50 oz of allocated GFL temporarily stored in a harvested GFL plant location, 24 oz. is allocated to Salad Mix 'B' and 20 oz. is allocated to the Salad Mix 'C' (with 60 further ounces coming from prior respectively allocated harvested GCL, RR, GR, and RFL). In various embodiments, once each of the plant varieties 1702 have been properly mixed in the respective mixing storage containers for each of the finished mixed perishable good types 1710, each of the mixes are respectively assigned to be packed into respective finished mixed perishable good packages (per 1765).

In the illustrated example shown in FIG. 20, 20 oz. of Arugula microgreens are harvested and transferred for temporary storage in a harvested Arugula microgreen bin. In various embodiments, Arugula is an example of a micro mix that may provide for added flavor in a salad mix and that, if identified in a respective finished good type specification 1708, would be added to one or more of the respective plant variety mixes for one or more finished mixed good types 1710 as previously described. In this illustrated example, each Salad Mix 'D' 9 oz. packaged finished perishable good in a plurality of received and stored customer orders is respectively created by first respectively transferring 20 oz. of the harvested Arugula and 34 oz. of the mixed 100 oz of Salad Mix 'C' into a Salad Mix 'D' perishable good bin, and then transferring respective predetermined package amounts (9 oz) of the mixed 54 oz to respective finished perishable good packages (per 1765). In various embodiments, the optimal ratio 1715' between the plant variety mixes and the micro mixes is constrained analogously to the Mix IDs ratios previously described, may be periodically determined, including just prior to performing the mixing, and may be respectively optimized between the respective identified upper bounds 1711 and the respective identified lower bounds 1712, which may be different than the respective identified preferred ratio 1713. In some embodiments, the predetermined amount of micro mix is added to the finished product containers rather than to the mixing bin.

In the illustrated example shown in FIG. 21, various embodiments of the shipping process as modified by the pack out optimizer (e.g., 1700, 1800) are provided. In various embodiments, once each of the finished perishable goods have been packed for a number of received and stored customer orders (per 1765), they may be shipped across multiple days (and as optimized (per 1767) by the pack out optimizer (e.g., 1700, 1800). In various embodiments, this optimization process may be analogous to how respective subsets of each of a plurality of harvested plant varieties 1702 are respectively allocated for storing, mixing, and/or packing over multiple days, which, as described above, may be limited by the respective plant perishability values (e.g., respective pack by offset) 1703 (via rules 1744). In various embodiments, each of the packed finished perishable products may be shipped (per 1765) within a respective valid perishability-based window 1706 (with an example annotated in FIG. 21), such as, for example, between the respective pack day of the finished perishable products and the respective shelf life limit. In various embodiments, the respective shelf life limit 1706 may be determined, in part, by a respective customer ID 1728 and a respective finished good ID (1710 and 1709). In various embodiments, once the packed finished products are designated for a shipping day by the pack out optimizer algorithm (e.g., 1700, 1800), they can be allocated across multiple customers (per 1767). In the illustrated example of FIG. 21, 7 cases of 4 oz. Salad Mix 'D' salad mix are allocated as follows: 3 cases to ABC Co. Store 'A' Day 1, 2 cases to ABC Co. Store 'B' Day 1, and 2 cases to XYZ Company ("XYZ") Day 2. In some embodiments, the packaged finished perishable goods can be shipped the same day that they are packed if the packaged finished goods are allocated to do so by the pack out optimizer (per 1765, 1767).

The example methods and apparatuses described herein may be at least partially embodied in the form of computer-implemented processes, logic flows and/or apparatus for practicing those processes, logic flows and/or the described functionality. The disclosed methods, computer-implemented processes and/or logic flows may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing one or more steps of the method and the computer-implemented processes. One or more steps of the methods may also be at least partially embodied in the form of a computer into which computer program code is loaded and/or executed, such that, the computer becomes an apparatus for practicing the methods. In some embodiments, one or more steps of the methods can be implemented by a general purpose computer programmed in accordance with the principals discussed herein. In various embodiments, the general computer processor programmed in accordance with the principles described herein may be provided in the cloud of a cloud computing environment. When implemented on a general-purpose processor, the computer program code segments may configure the processor to create specific logic circuits. One or more steps of the methods may alternatively be at least partially embodied in a digital signal processor formed of special purpose logic circuitry, e.g., an FPGA (field programmable gate array), or an application specific integrated circuit (ASIC) for performing one or more steps of the methods.

Various embodiments can be implemented in a cloud computing system that includes a back end component, e.g., as a data server, or that includes a middleware component, e.g., an application server, or that includes a front end component, e.g., a computer having a GUI or a Web browser through which an operator can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. For example, certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that certain of the described program components and systems can generally be integrated together in a single software product being executed, or packaged into multiple software products for execution. Such variations are not to be regarded as a departure from the disclosure, and all such modifications are intended to be included within the scope of the disclosure.

What is claimed is:

1. A computer-implemented method for optimizing indoor farming operations, the method comprising:

receiving, for two or more of a plurality of different plant types, a respective plant perishability value input;

receiving, for two or more of a plurality of a finished perishable good types, a respective finished good perishability value input and a respective finished good specification input identifying at least the two or more different plant types, wherein each of the two or more finished perishable good types is a respective mix of at least the two or more different plant types; and wherein at least one plant type in at least two of the plurality of finished perishable good types is the same plant type;

receiving an inventory input comprising, for a specific time period, a respective harvested amount of each of the at least two or more different plant types;

receiving a customer demand input comprising, for the specific time period, a respective number of finished perishable good packages of each of the plurality of finished perishable good types, wherein each respective package is of a predetermined amount of the respective finished perishable good;

optimizing and adjusting a respective fractional amount of each of the respective at least two or more plant types in each of the two or more finished mixed perishable good types in order to control the allocation of the respective harvested amount of the at least two or more plant types during the specific time period and based on the received inputs;

optimizing and adjusting a mix/pack schedule, during the specific time period, in order to control the mixing and packing operations of the indoor farm facility to respectively finish each of the respective number of finished perishable good packages using the respective harvested amounts of each of the at least two or more different plant types, and based on the received inputs and the optimized and adjusted respective fractional amounts; and causing the respective harvested amounts of each of the at least two or more different plant types to be allocated, mixed and packed to finish the respective number of finished perishable good packages of each of the plurality of finished perishable good types pursuant to the optimized and adjusted respective fractional amounts and, the optimized and adjusted mix/pack schedule.

2. The computer-implemented method of claim 1, wherein the controlled allocation, and the controlled mixing and packing operations, is to achieve a received objective of performing these operations during the specific time period such that none of the respective plant perishability values are exceeded.

3. The computer-implemented method of claim 1, wherein the specific time period comprises a plurality of subset time periods of equivalent length, and wherein the controlled allocation, and the controlled mixing and packing operations, is to achieve a received objective of performing these operations such that, during the specific time period, a difference between a maximum number of finished perishable good packages mixed and packed in one of the subset time periods and a minimum number of finished perishable good packages mixed and packed in another one of the subset time periods is minimized.

4. The computer-implemented method of claim 1, wherein the specific time period comprises a plurality of subset time periods of equivalent length, and wherein the controlled allocation, and the controlled mixing and packing operations, is to achieve a received objective of performing these operations such that, during the specific time period, a total number of instances of two successively packed finished perishable good packages of the same finished perishable good type is maximized.

5. The computer-implemented method of claim 1, wherein the specific time period comprises a plurality of subset time periods of equivalent length, and wherein the controlled allocation, and the controlled mixing and packing operations, is to achieve a received objective of performing these operations such that a total sum of a weight, multiplied by an associated priority factor, of each finished perishable good package packed during a specific number of the subset time periods is maximized.

6. The computer-implemented method of claim 1, wherein the customer demand input comprises finished perishable good package orders from a plurality of customers, the method further comprising:

optimizing and adjusting a ship schedule, during the specific time period, in order to control the shipping operations of the indoor farm facility to respectively ship, to each of the plurality of customers, a respective subset of the respective number of finished perishable good packages corresponding to the respective customer order based on the received inputs and the optimized and adjusted mix/pack schedule; and causing the respective subset of the respective number of finished perishable good packages corresponding to each of the plurality of customer orders to be shipped pursuant to the optimized and adjusted ship schedule.

7. The computer-implemented method of claim 6, wherein the controlled allocation, the controlled mixing and packing operations, and the controlled shipping operations, is to achieve a received objective of performing these operations during the specific time period such that none of the respective plant perishability values, and none of the respective finished good perishability values, are exceeded.

8. The computer-implemented method of claim 7, wherein each of the respective finished good perishability values are customer-specific for at least two of the plurality of customers and wherein the respective finished good perishability values specific to a first of the at least two customers are shorter than the respective finished good perishability values specific to a second of the at least two customers.

9. The computer-implemented method of claim 6, the method further comprising:

receiving a respective priority multiplier for each of the plurality of customers, wherein the mixing and packing operations, and the controlled shipping operations, is to achieve a received objective of performing these operations during the specific time period such that a total number of instances of packing or shipping higher priority finished perishable good packages before lower priority finished perishable good packages is maximized.

10. The computer-implemented method of claim 1, wherein the respective finished good specification for each of the two or more finished mixed perishable good types further comprises a respective lower fractional bound amount, and a respective higher fractional bound amount, of each of the respective two or more plant types, and wherein the controlled allocation is to achieve a received objective of performing this operation during the specific time period such that none of the optimized and adjusted respective fractional amounts exceed a respective higher fractional bound amount, or is lower than a respective lower fractional bound amount, for any of the respective two or more plant types.

11. The computer-implemented method of claim 1, wherein the method is performed for a plurality of indoor farm facilities, wherein the inventory input and the customer demand input each comprise a respective input for each of the plurality of indoor farm facilities, wherein the optimizing and adjusting the respective fractional amount step, and the optimizing and adjusting the mix/pack schedule step, are respectively performed for each of the plurality of indoor farm facilities, and wherein the causing step is respectively performed for each of the plurality of indoor farm facilities.

12. A non-transitory computer readable storage medium encoded with program code, wherein, when the program code is executed by a processor of a computing device, the processor performs a method for optimizing indoor farming operations comprising:

receiving, for two or more of a plurality of different plant types, a respective plant perishability value input;

receiving, for two or more of a plurality of a finished perishable good types, a respective finished good specification input identifying at least the two or more different plant types, wherein each of the two or more finished perishable good types is a respective mix of at least the two or more different plant types; and wherein at least one plant type in at least two of the plurality of finished perishable good types is the same plant type;

receiving an inventory input comprising, for a specific time period, a respective harvested amount of each of the at least two or more different plant types;

receiving a customer demand input comprising, for the specific time period and for each of a plurality of customers, a respective order for a respective number of finished perishable good packages of one or more of the plurality of finished perishable good types, wherein each respective package is of a predetermined amount of the respective finished perishable good, and wherein the plurality of customer orders comprise respective customer orders for the two or more finished mixed perishable good types and customer orders for at least one other finished perishable good type;

optimizing and adjusting a mix/pack schedule, during the specific time period, in order to control the mixing and packing operations of the indoor farm facility to respectively finish each of the respective number of finished perishable good packages using the respective harvested amounts of each of the at least two or more different plant types, and based on the received inputs;

optimizing and adjusting a ship schedule, during the specific time period, in order to control the shipping operations of the indoor farm facility to respectively ship, to each of the plurality of customers, the respective number of finished perishable good packages corresponding to the respective customer order based on the received inputs and the optimized and adjusted mix/pack schedule; and causing the respective harvested amounts of each of the at least two or more different plant types to be mixed and packed to finish the respective number of finished perishable good packages of each of the plurality of finished perishable good types pursuant to the optimized and adjusted mix/pack schedule; and causing the respective number of finished perishable good packages corresponding to the respective customer order for each of the plurality of customers to be shipped pursuant to the optimized and adjusted ship schedule.

13. A non-transitory computer readable storage medium encoded with program code, wherein, when the program code is executed by a processor of a computing device, the processor performs a method for optimizing indoor farming operations comprising:

receiving a first input specifying that at least two of a plurality of grow lanes of a grow zone of an indoor farm facility are configured such that plants are loaded into the grow lane, and such that the loaded plants in the grow lane traverse two or more grow lane positions therein;

receiving a second input specifying that each of a plurality of different plant species requires a corresponding amount of growing time between when a plant is loaded into the grow lane and when it is unloaded from the grow lane to be harvested;

receiving a third input specifying respective assignments of a respective one of the plurality of plant species to at least two of the plurality of grow lanes, wherein the plurality of plant species-to-grow lane assignments include at least two different plant species of the plurality of plant species;

determining an optimized seeding schedule, including determining a time that seeds for the corresponding plurality of different plant species will respectively be planted in the indoor farm facility in order to control a timing of unloading the plant species from the respective plurality of grow lanes of the grow zone; and generating instructions for planting the corresponding plurality of different plant species in the indoor farm facility in accordance with the determined optimized seeding schedule.

14. The non-transitory computer readable storage medium of claim 13, wherein, when the program code is further executed by the processor of the computing device, the processor performs the method further comprising:

receiving a fourth input, for each of the at least two grow lanes, specifying the respective density of plants of the assigned plant species that will be on each float that is respectively loaded into, and unloaded from, the respective grow lane;

receiving a fifth input, corresponding to the respective plant density inputs for each of the at least two grow lanes, specifying the respective density of seeds of the respective assigned plant species that will be in each corresponding germination tray.

15. The non-transitory computer readable storage medium of claim 14, wherein the controlled timing is to achieve an objective of having a substantially similar amount of each of the at least two different plant species be unloaded every unload period.

16. The non-transitory computer readable storage method of claim 14, wherein the respective seed density inputs corresponding to the respective plant density inputs for each of the at least two grow lanes further comprise a safety overseed factor.

17. The non-transitory computer readable storage method of claim 14, wherein the second input further specifies, for each of the plurality of plant species, respective growing times in each of a germination zone, a propagation zone, and the grow zone, and wherein, when the program code is further executed by the processor of the computing device, the processor performs the method further comprising:

receiving a sixth input, corresponding to the respective plant density inputs for each of the at least two grow lanes, specifying the respective density of plants of the assigned plant species that will be in each corresponding propagation tray.

18. The non-transitory computer readable storage medium of claim 17, wherein the controlled timing is to achieve an objective of having a substantially similar amount of required propagation trays on a day-to-day basis, and no periods exceeding the propagation tray capacity within the propagation zone.

19. The non-transitory computer readable storage method of claim 13, wherein two or more of the inputs are received from a memory device of the computing device.

20. The non-transitory computer readable storage method of claim 13, wherein the method is performed for a plurality of indoor farm facilities, wherein the first input and the third input each comprise a respective input for each of the plurality of indoor farm facilities, and wherein the determining the optimized seeding schedule step is respectively performed for each of the plurality of indoor farm facilities.

* * * * *